US011136801B2

(12) United States Patent
Kellum et al.

(10) Patent No.: US 11,136,801 B2
(45) Date of Patent: Oct. 5, 2021

(54) INVERTED CONSTANT FORCE WINDOW BALANCE

(71) Applicant: Amesbury Group, Inc., Amesbury, MA (US)

(72) Inventors: Wilbur J. Kellum, Garretson, SD (US); Chad Swier, Sioux Falls, SD (US); Travis Steen, Sioux Falls, SD (US); Tyler Welbig, Harrisburg, SD (US)

(73) Assignee: Amesbury Group, Inc., Edina, MN (US)

( * ) Notice: Subject to any disclaimer, the term of this patent is extended or adjusted under 35 U.S.C. 154(b) by 60 days.

(21) Appl. No.: 16/750,690

(22) Filed: Jan. 23, 2020

(65) Prior Publication Data
US 2020/0157863 A1 May 21, 2020

Related U.S. Application Data

(63) Continuation of application No. 15/945,269, filed on Apr. 4, 2018, now Pat. No. 10,563,440.
(Continued)

(51) Int. Cl.
*E05D 13/00* (2006.01)
*E05F 1/00* (2006.01)
(Continued)

(52) U.S. Cl.
CPC ......... *E05D 13/1276* (2013.01); *E05D 13/08* (2013.01); *E05D 15/22* (2013.01);
(Continued)

(58) Field of Classification Search
CPC ... Y10T 16/197; Y10T 16/64; Y10T 16/6298; Y10T 16/65; E05D 5/02; E05D 13/08;
(Continued)

(56) References Cited

U.S. PATENT DOCUMENTS

| 698,168 A | 4/1902 | Barnum |
| 887,968 A | 5/1908 | Selkirk |

(Continued)

FOREIGN PATENT DOCUMENTS

| CA | 1155341 | 10/1983 |
| CA | 2119506 | 10/1994 |

(Continued)

OTHER PUBLICATIONS

"Request for Ex Parte Reexamination of U.S. Pat. No. 9,133,656 Pursuant to 37 CFR 1.510 et seq", in U.S. Appl. No. 13/081,089, entitled *Inverted Constant Force Window Balance for Tilt Sash*, filed Feb. 26, 2016, 19 pgs.

(Continued)

*Primary Examiner* — Chuck Y Mah
(74) *Attorney, Agent, or Firm* — Merchant & Gould P.C.

(57) ABSTRACT

An inverted constant force window balance system includes a carrier assembly and a mounting bracket. The carrier assembly includes a housing, a coil spring disposed within the housing, and a shoe assembly coupled to the housing. The shoe assembly is configured to receive a pivot bar from a window sash and extend at least one brake upon rotation of the pivot bar. The mounting bracket is releasably coupled to the housing opposite the shoe assembly and is coupled to the free end of the coil spring. At least a portion of the mounting bracket is configured to slideably move in relation to the free end of the coil spring between at least two positions. When at least a portion of the mounting bracket moves between the at least two positions, the mounting bracket disengages from the housing and releases the mounting bracket from the carrier assembly.

20 Claims, 47 Drawing Sheets

Related U.S. Application Data

(60) Provisional application No. 62/637,149, filed on Mar. 1, 2018, provisional application No. 62/580,293, filed on Nov. 1, 2017, provisional application No. 62/483,029, filed on Apr. 7, 2017.

(51) Int. Cl.
    *F16M 13/02*     (2006.01)
    *F16F 1/12*     (2006.01)
    *E05D 15/22*     (2006.01)
    *E05C 17/64*     (2006.01)

(52) U.S. Cl.
CPC .............. *F16F 1/12* (2013.01); *F16M 13/02* (2013.01); *E05Y 2201/10* (2013.01); *E05Y 2201/21* (2013.01); *E05Y 2800/45* (2013.01); *E05Y 2900/148* (2013.01)

(58) Field of Classification Search
CPC ..... E05D 13/10; E05D 13/12; E05D 13/1276; E05D 13/1284; E05D 13/1292; E05D 15/22; E05D 15/165; E05Y 2900/148; E05Y 2201/10; E05Y 2201/21; E05Y 2800/45; E06B 3/44; E06B 3/4407; E06B 3/4415; F16F 1/12; F16M 13/02
See application file for complete search history.

(56) References Cited

U.S. PATENT DOCUMENTS

| | | |
|---|---|---|
| 1,007,212 A | 10/1911 | Lasersohn |
| 1,312,665 A | 8/1919 | Almquist |
| 1,420,503 A | 6/1922 | Throne |
| 1,480,453 A | 1/1924 | Lane |
| 2,069,025 A | 1/1937 | Anderson |
| 2,178,533 A | 10/1939 | Viehweger |
| 2,209,293 A | 7/1940 | Cannon et al. |
| 2,602,958 A | 7/1952 | Brown |
| 2,609,191 A | 9/1952 | Foster |
| 2,609,193 A | 9/1952 | Foster |
| 2,622,267 A | 12/1952 | Peremi |
| 2,635,282 A | 4/1953 | Trammell, Sr. et al. |
| 2,644,193 A | 7/1953 | Anderberg |
| 2,684,499 A | 7/1954 | Lewis |
| 2,732,594 A | 1/1956 | Adams et al. |
| 2,739,344 A | 3/1956 | Dickinson |
| 2,766,492 A | 10/1956 | Day et al. |
| 2,807,045 A | 9/1957 | Chenoweth |
| 2,817,872 A | 12/1957 | Foster |
| 2,851,721 A | 9/1958 | Decker et al. |
| 2,873,472 A | 2/1959 | Foster |
| 2,952,884 A | 9/1960 | Dinsmore |
| 3,007,194 A | 11/1961 | Griswold |
| 3,105,576 A | 10/1963 | Jones et al. |
| 3,150,420 A | 9/1964 | Brenner |
| 3,184,784 A | 5/1965 | Peters |
| 3,364,622 A | 1/1968 | Collard |
| 3,434,236 A | 3/1969 | Weidner et al. |
| 3,445,964 A | 5/1969 | Foster |
| 3,452,480 A | 7/1969 | Foster |
| 3,461,608 A | 8/1969 | Johnson |
| 3,475,865 A | 11/1969 | Ames |
| 3,497,999 A | 3/1970 | Hendra |
| 3,529,381 A | 9/1970 | Grossman |
| 3,676,956 A | 7/1972 | Taylor et al. |
| 3,732,594 A | 5/1973 | Mills |
| 3,820,193 A | 6/1974 | Foster |
| 3,844,066 A | 10/1974 | Nobes |
| 3,869,754 A | 3/1975 | Foster |
| 3,992,751 A | 11/1976 | Foster et al. |
| 4,028,849 A | 6/1977 | Anderson |
| 4,068,406 A | 1/1978 | Wood |
| 4,079,549 A | 3/1978 | Wood |
| 4,089,085 A | 5/1978 | Fitzgibbon |
| 4,190,930 A | 3/1980 | Prosser |
| 4,227,345 A | 10/1980 | Durham, Jr. |
| 4,228,620 A | 10/1980 | Hutchins |
| 4,300,316 A | 11/1981 | Ficurilli |
| 4,332,054 A | 6/1982 | Paist et al. |
| 4,364,199 A | 12/1982 | Johnson et al. |
| 4,446,654 A | 5/1984 | Schoolman et al. |
| 4,452,012 A | 6/1984 | Deal |
| 4,506,478 A | 3/1985 | Anderson |
| 4,510,713 A | 4/1985 | Anderson |
| 4,517,766 A | 5/1985 | Haltof |
| 4,555,868 A | 12/1985 | Mancuso |
| 4,570,382 A | 2/1986 | Suess |
| 4,571,887 A | 2/1986 | Haltof |
| 4,590,708 A | 5/1986 | Campodonico |
| 4,610,108 A | 9/1986 | Marshik |
| 4,642,845 A | 2/1987 | Marshik |
| 4,683,676 A | 8/1987 | Sterner, Jr. |
| 4,689,850 A | 9/1987 | Flight |
| 4,697,304 A | 10/1987 | Overgard |
| 4,704,821 A | 11/1987 | Berndt |
| 4,718,194 A | 1/1988 | FitzGibbon et al. |
| 4,785,581 A | 11/1988 | Abramson et al. |
| 4,799,333 A | 1/1989 | Westfall et al. |
| 4,837,976 A | 6/1989 | Westfall et al. |
| 4,854,077 A | 8/1989 | Rogers et al. |
| 4,885,871 A | 12/1989 | Westfall et al. |
| 4,888,915 A | 12/1989 | Goldenberg |
| 4,914,861 A | 4/1990 | May |
| 4,922,657 A | 5/1990 | Foss |
| 4,930,254 A | 6/1990 | Valentin |
| 4,935,987 A | 6/1990 | Sterner, Jr. |
| 4,941,285 A | 7/1990 | Westfall |
| 4,949,425 A | 8/1990 | Dodson et al. |
| 4,953,258 A | 9/1990 | Mennuto |
| 4,958,462 A | 9/1990 | Cross |
| 4,961,247 A | 10/1990 | Leitzel et al. |
| 5,035,081 A | 7/1991 | Yamamoto et al. |
| 5,036,621 A | 8/1991 | Iwasaki |
| 5,069,001 A | 12/1991 | Makarowski |
| 5,113,922 A | 5/1992 | Christensen et al. |
| 5,119,591 A | 6/1992 | Sterner, Jr. et al. |
| 5,119,592 A | 6/1992 | Westfall et al. |
| 5,127,192 A | 7/1992 | Cross |
| 5,140,769 A | 8/1992 | Hickson et al. |
| 5,157,808 A | 10/1992 | Sterner, Jr. |
| 5,189,838 A | 3/1993 | Westfall |
| 5,210,976 A | 5/1993 | Cripps |
| 5,232,208 A | 8/1993 | Braid et al. |
| 5,251,401 A | 10/1993 | Prete et al. |
| 5,301,467 A | 4/1994 | Schmidt et al. |
| 5,353,548 A | 10/1994 | Westfall |
| 5,365,638 A | 11/1994 | Braid et al. |
| 5,371,971 A | 12/1994 | Prete |
| 5,377,384 A | 1/1995 | Riegelman |
| 5,383,303 A | 1/1995 | Nakanishi et al. |
| D355,262 S | 2/1995 | Chaney et al. |
| 5,440,837 A | 8/1995 | Piltingsrud |
| 5,445,364 A | 8/1995 | Tibbals, Jr. |
| 5,448,858 A | 9/1995 | Briggs et al. |
| 5,452,495 A | 9/1995 | Briggs |
| 5,463,793 A | 11/1995 | Westfall |
| 5,463,795 A | 11/1995 | Carlson et al. |
| 5,530,991 A | 7/1996 | deNormand et al. |
| 5,544,450 A | 8/1996 | Schmidt et al. |
| 5,553,903 A | 9/1996 | Prete et al. |
| 5,566,507 A | 10/1996 | Schmidt et al. |
| 5,572,828 A | 11/1996 | Westfall |
| 5,615,452 A | 4/1997 | Habbersett |
| 5,632,117 A | 5/1997 | Prete et al. |
| 5,632,118 A | 5/1997 | Stark |
| 5,661,927 A | 9/1997 | Polowinczak et al. |
| 5,669,180 A | 9/1997 | Maier |
| 5,697,188 A | 12/1997 | Fullick et al. |
| 5,699,636 A | 12/1997 | Stark |
| 5,704,165 A | 1/1998 | Slocomb et al. |
| 5,737,877 A | 4/1998 | Meunier et al. |
| 5,802,767 A | 9/1998 | Slocomb et al. |
| 5,806,243 A | 9/1998 | Prete et al. |

(56) References Cited

U.S. PATENT DOCUMENTS

| | | |
|---|---|---|
| 5,806,900 A | 9/1998 | Bratcher et al. |
| 5,829,196 A | 11/1998 | Maier |
| 5,852,854 A | 12/1998 | Pierrot et al. |
| 5,855,092 A | 1/1999 | Raap et al. |
| 5,873,199 A | 2/1999 | Meunier et al. |
| 5,924,243 A | 7/1999 | Polowinczak et al. |
| 5,927,013 A | 7/1999 | Slocomb et al. |
| 5,943,822 A | 8/1999 | Slocomb et al. |
| 5,996,283 A | 12/1999 | Maier |
| 6,032,417 A | 3/2000 | Jakus et al. |
| 6,041,475 A | 3/2000 | Nidelkoff |
| 6,041,476 A | 3/2000 | deNormand |
| 6,041,550 A | 3/2000 | Tix |
| 6,058,653 A | 5/2000 | Slocomb et al. |
| 6,119,398 A | 9/2000 | Yates, Jr. |
| D434,637 S | 12/2000 | Habeck et al. |
| 6,155,615 A | 12/2000 | Schultz |
| 6,161,335 A | 12/2000 | Beard et al. |
| 6,178,696 B1 | 1/2001 | Liang |
| 6,226,923 B1 | 5/2001 | Hicks et al. |
| 6,305,126 B1 | 10/2001 | Hendrickson et al. |
| 6,378,169 B1 | 4/2002 | Batten et al. |
| 6,393,661 B1 | 5/2002 | Braid et al. |
| D462,258 S | 9/2002 | Meunier |
| D464,256 S | 10/2002 | Meunier |
| 6,467,128 B1 | 10/2002 | Damani |
| 6,470,530 B1 | 10/2002 | Trunkle |
| D467,490 S | 12/2002 | Uken et al. |
| 6,553,620 B2 | 4/2003 | Guillemet et al. |
| 6,584,644 B2 | 7/2003 | Braid et al. |
| 6,606,761 B2 | 8/2003 | Braid et al. |
| 6,622,342 B1 | 9/2003 | Annes et al. |
| 6,679,000 B2 | 1/2004 | Uken et al. |
| 6,763,550 B2 | 7/2004 | Regnier |
| 6,820,368 B2 | 11/2004 | Uken et al. |
| 6,840,011 B2 | 1/2005 | Thompson et al. |
| 6,848,148 B2 | 2/2005 | Braid et al. |
| 6,857,228 B2 | 2/2005 | Kunz et al. |
| 6,860,066 B2 | 3/2005 | Kunz et al. |
| 6,892,494 B2 | 5/2005 | Malek |
| 6,931,788 B2 | 8/2005 | Uken et al. |
| 6,934,998 B1 | 8/2005 | Shuler |
| 6,983,513 B2 | 1/2006 | Pettit |
| 6,990,710 B2 | 1/2006 | Kunz et al. |
| 7,013,529 B2 | 3/2006 | Pettit |
| 7,076,835 B2 | 7/2006 | Harold et al. |
| 7,143,475 B2 | 12/2006 | Annes et al. |
| 7,191,562 B2 | 3/2007 | Uken et al. |
| 7,552,510 B2 | 6/2009 | Harold et al. |
| 7,587,787 B2 | 9/2009 | Pettit |
| 7,673,372 B2 | 3/2010 | Annes et al. |
| 7,703,175 B2 | 4/2010 | Tuller |
| 7,735,191 B2 | 6/2010 | Tuller |
| 7,937,809 B2 | 5/2011 | Tuller |
| 7,945,994 B2 | 5/2011 | Dallas et al. |
| 7,966,770 B1 | 6/2011 | Kunz |
| 8,074,402 B2 | 12/2011 | Tuller |
| 8,132,290 B2 | 3/2012 | Liang et al. |
| 8,181,396 B1 | 5/2012 | Kunz |
| 8,313,310 B2 | 11/2012 | Uchikado |
| 8,365,356 B2 | 2/2013 | Robertson |
| 8,371,068 B1 | 2/2013 | Kunz |
| 8,424,248 B2 | 4/2013 | Uken et al. |
| 8,505,242 B1 | 8/2013 | Kunz |
| 8,539,642 B2 | 9/2013 | Baker |
| 8,561,260 B2 | 10/2013 | Baker et al. |
| 8,640,383 B1 | 2/2014 | Kunz |
| 8,813,310 B2 | 8/2014 | Baker et al. |
| 8,819,896 B2 | 9/2014 | Kellum, III et al. |
| 8,850,745 B2 | 10/2014 | Sofianek |
| 8,918,979 B2 | 12/2014 | Baker |
| RE45,328 E | 1/2015 | Tuller |
| 8,966,822 B2 | 3/2015 | Sofianek et al. |
| 9,003,710 B2 | 4/2015 | Kellum, III et al. |
| 9,121,209 B2 | 9/2015 | Baker et al. |
| 9,133,656 B2 | 9/2015 | Steen et al. |
| 9,458,655 B2 | 10/2016 | deNormand |
| 9,476,242 B2 | 10/2016 | Baker |
| 9,580,950 B2 | 2/2017 | Uken et al. |
| 9,995,072 B2 | 6/2018 | Baker |
| 10,081,972 B1 | 9/2018 | Kunz |
| 10,174,537 B1 | 1/2019 | Kunz |
| 10,208,517 B2 | 2/2019 | Lucci et al. |
| 10,344,514 B2 | 7/2019 | Uken |
| 10,415,287 B1 | 9/2019 | Kunz |
| 10,533,359 B2 | 1/2020 | Uken |
| 10,563,440 B2 | 2/2020 | Kellum |
| 10,563,440 B2 | 2/2020 | Kellum |
| 2002/0053117 A1 | 5/2002 | Braid et al. |
| 2002/0092241 A1 | 7/2002 | Uken et al. |
| 2002/0104189 A1 | 8/2002 | Braid et al. |
| 2002/0129463 A1 | 9/2002 | Newman |
| 2003/0074764 A1 | 4/2003 | Pettit et al. |
| 2003/0192147 A1 | 10/2003 | Braid et al. |
| 2003/0192257 A1 | 10/2003 | Uken et al. |
| 2003/0213096 A1 | 11/2003 | Annes et al. |
| 2004/0006845 A1 | 1/2004 | Polowinczak et al. |
| 2004/0163209 A1 | 8/2004 | Pettit |
| 2004/0216380 A1 | 11/2004 | Uken et al. |
| 2004/0237256 A1 | 12/2004 | Lutfallah |
| 2004/0244158 A1 | 12/2004 | Awakura et al. |
| 2004/0244295 A1 | 12/2004 | Derham et al. |
| 2005/0055802 A1 | 3/2005 | Braid et al. |
| 2005/0091791 A1 | 5/2005 | Kunz |
| 2005/0178068 A1 | 8/2005 | Uken et al. |
| 2005/0198775 A1 | 9/2005 | Pettit et al. |
| 2005/0229492 A1 | 10/2005 | Robertson |
| 2006/0086052 A1 | 4/2006 | Petta et al. |
| 2006/0207185 A1 | 9/2006 | Shuler et al. |
| 2007/0011846 A1 | 1/2007 | Braid et al. |
| 2007/0101654 A1 | 5/2007 | Robertson |
| 2007/0113479 A1 | 5/2007 | Uken et al. |
| 2008/0047099 A1 | 2/2008 | Malek |
| 2008/0120804 A1 | 5/2008 | Annes et al. |
| 2008/0178424 A1 | 7/2008 | Tuller |
| 2008/0178425 A1 | 7/2008 | Tuller |
| 2009/0188075 A1 | 7/2009 | Baker |
| 2009/0260295 A1 | 10/2009 | Tuller |
| 2010/0115854 A1 | 5/2010 | Uken et al. |
| 2011/0067314 A1 | 3/2011 | Baker |
| 2011/0239402 A1 | 10/2011 | Steen et al. |
| 2012/0297687 A1 | 11/2012 | Baker et al. |
| 2013/0283699 A1 | 10/2013 | Kellum, III et al. |
| 2013/0340349 A1 | 12/2013 | Baker |
| 2014/0000172 A1 | 1/2014 | Sofianek |
| 2014/0026490 A1 | 1/2014 | Baker et al. |
| 2014/0208653 A1 | 7/2014 | Sofianek et al. |
| 2014/0208655 A1 | 7/2014 | Stoakes et al. |
| 2014/0259524 A1 | 9/2014 | Kellum, III et al. |
| 2014/0259936 A1 | 9/2014 | DeNormand et al. |
| 2014/0331561 A1 | 11/2014 | Baker et al. |
| 2015/0167379 A1 | 6/2015 | Sofianek et al. |
| 2015/0361701 A1 | 12/2015 | Steen et al. |
| 2015/0368952 A1 | 12/2015 | Baker et al. |
| 2016/0222709 A1 | 8/2016 | Wynder |
| 2016/0298368 A1 | 10/2016 | Kunz |
| 2016/0298369 A1 | 10/2016 | Kunz |
| 2017/0089109 A1 | 3/2017 | Steen et al. |
| 2017/0145722 A1 | 5/2017 | Kellum, III |
| 2017/0211305 A1 | 7/2017 | Uken et al. |
| 2017/0292303 A1 | 10/2017 | Lucci |
| 2017/0370138 A1 | 12/2017 | Uken et al. |
| 2018/0261660 A1 | 9/2018 | Jinta |
| 2019/0085609 A1 | 3/2019 | Kellum |
| 2020/0217116 A1 | 7/2020 | Kellum |
| 2020/0224472 A1 | 7/2020 | Uken |
| 2020/0318408 A1 | 10/2020 | Steen |

FOREIGN PATENT DOCUMENTS

| | | |
|---|---|---|
| CA | 2382933 | 4/2002 |
| CA | 2338403 | 4/2006 |
| CA | 2596293 | 2/2008 |
| CA | 2619267 | 7/2008 |

(56) References Cited

FOREIGN PATENT DOCUMENTS

| | | |
|---|---|---|
| CA | 2619289 | 7/2008 |
| CA | 2820240 | 1/2014 |
| CA | 2836375 | 7/2014 |
| DE | 4211695 | 10/1992 |
| GB | 329996 | 5/1930 |
| GB | 723056 | 2/1955 |
| GB | 740223 | 11/1955 |
| GB | 1505782 | 3/1978 |
| GB | 2195691 | 4/1988 |
| GB | 2236786 | 4/1991 |
| GB | 2254875 | 10/1992 |
| GB | 2276655 | 10/1994 |
| GB | 2278626 | 12/1994 |
| GB | 2280697 | 2/1995 |
| GB | 2292168 | 2/1996 |
| GB | 2295634 | 6/1996 |
| JP | 56-171982 | 1/1981 |
| JP | 03197785 | 8/1991 |
| JP | 5-52273 | 7/1993 |
| JP | 3025244 | 6/1996 |
| JP | 63-3785 | 1/1998 |
| JP | 2000283025 | 10/2000 |
| JP | 2004293388 | 10/2004 |
| JP | 2005113907 | 4/2005 |

OTHER PUBLICATIONS

Balance Systems—BSI Amesbury Group, Inc. Crossbow Balance Advertisement dated Jun. 7, 1999 (3 pgs.).

BSI Tilt Balance Systems, Balance Systems—BSI, Amesbury Group, Inc., 1996-2001, 4 pgs.

BSI's Hidden Advantage: It's as Easy as 1-2-3, Balance Systems—BSI, Amesbury Group, Inc., 2001, 3 pgs.

Response By Patent Owner to Office Action in EX-Parte Re-Examination Pursuant to 37 C.F.R. 1.550(e) for co-pending U.S. Appl. No. 90/013,695, filed Aug. 23, 2016, 13 pages.

Crossbow Balance! Another New Balance in BSI's Quiver, Balance Systems—Bsi, Amesbury Group, Inc., Jun. 7, 1999, 2 pgs.

Dakota Balance—Balances and Accessories brochure, May 2001, 2 pgs.

DWM Door & Window Maker Magazine, "2004 Annual Buyers Guide", vol. 5, Issue 3, Apr. 2004, 2 pgs.

Ex-Parte Re-Examination Office Action for corresponding U.S. Re-Examination U.S. Appl. No. 90/013,695 dated Jun. 23, 2016, 8 pgs.

Heinberg, "Latest Trends in Window and Door Hardware," Shelter Magazine, Jul. 2001, cover and p. 11.

PCT International Search Report, Written Opinion, and International Preliminary Report on Patentability (with 37 sheets of annexes) for PCT/US2011/024134; ISA/US, dated Feb. 9, 2011 (113 pages total).

Photographs of the Crossbow Balance Component shown in C6 (7 views; 3 pgs).

PCT International Search Report and Written Opinion in International Application PCT/US2018/026500, dated Jun. 22, 2018, 13 pages.

PCT International Preliminary Report on Patentability in Application PCT/US2018/026500, dated Oct. 17, 2019, 7 pages.

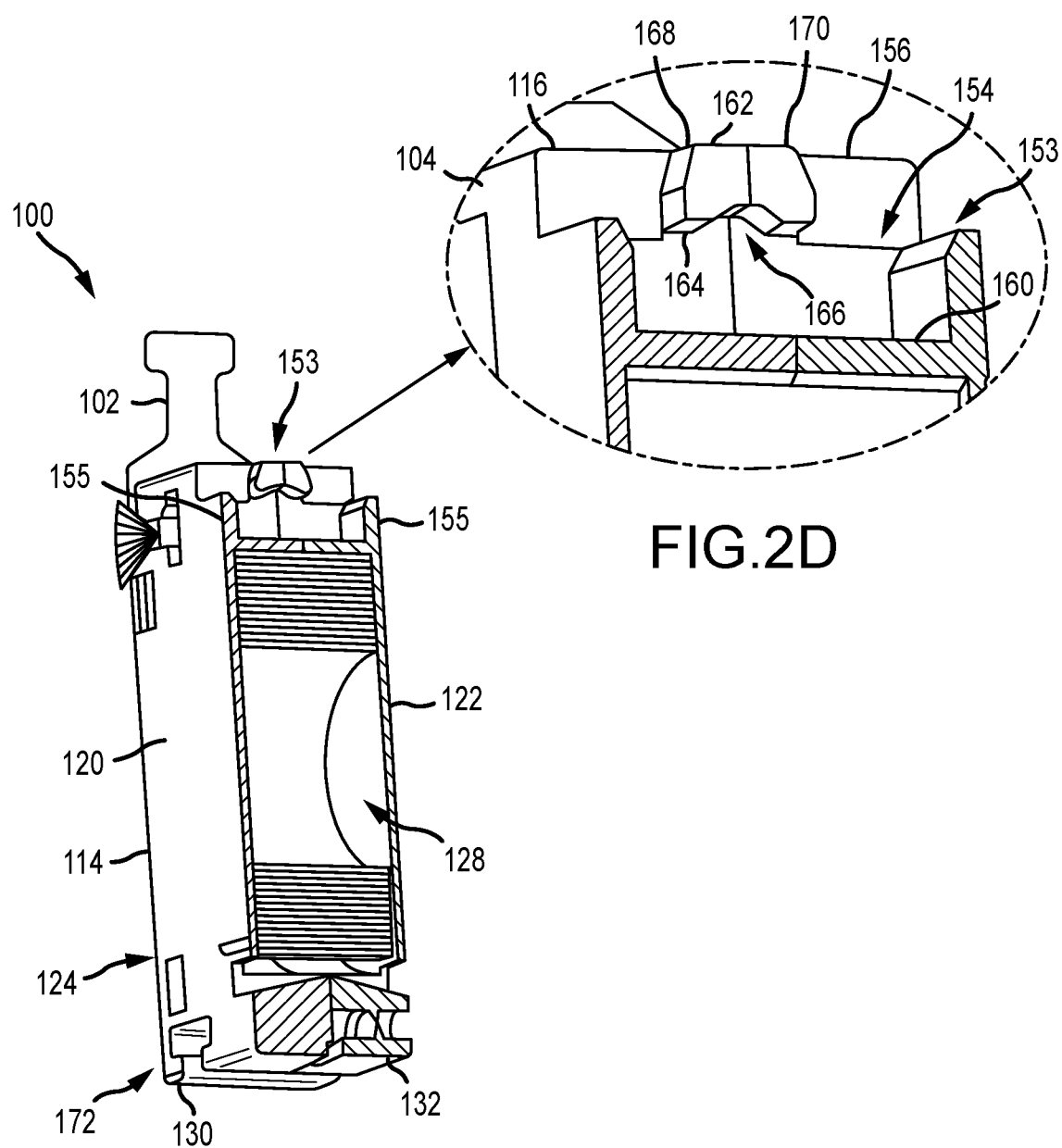

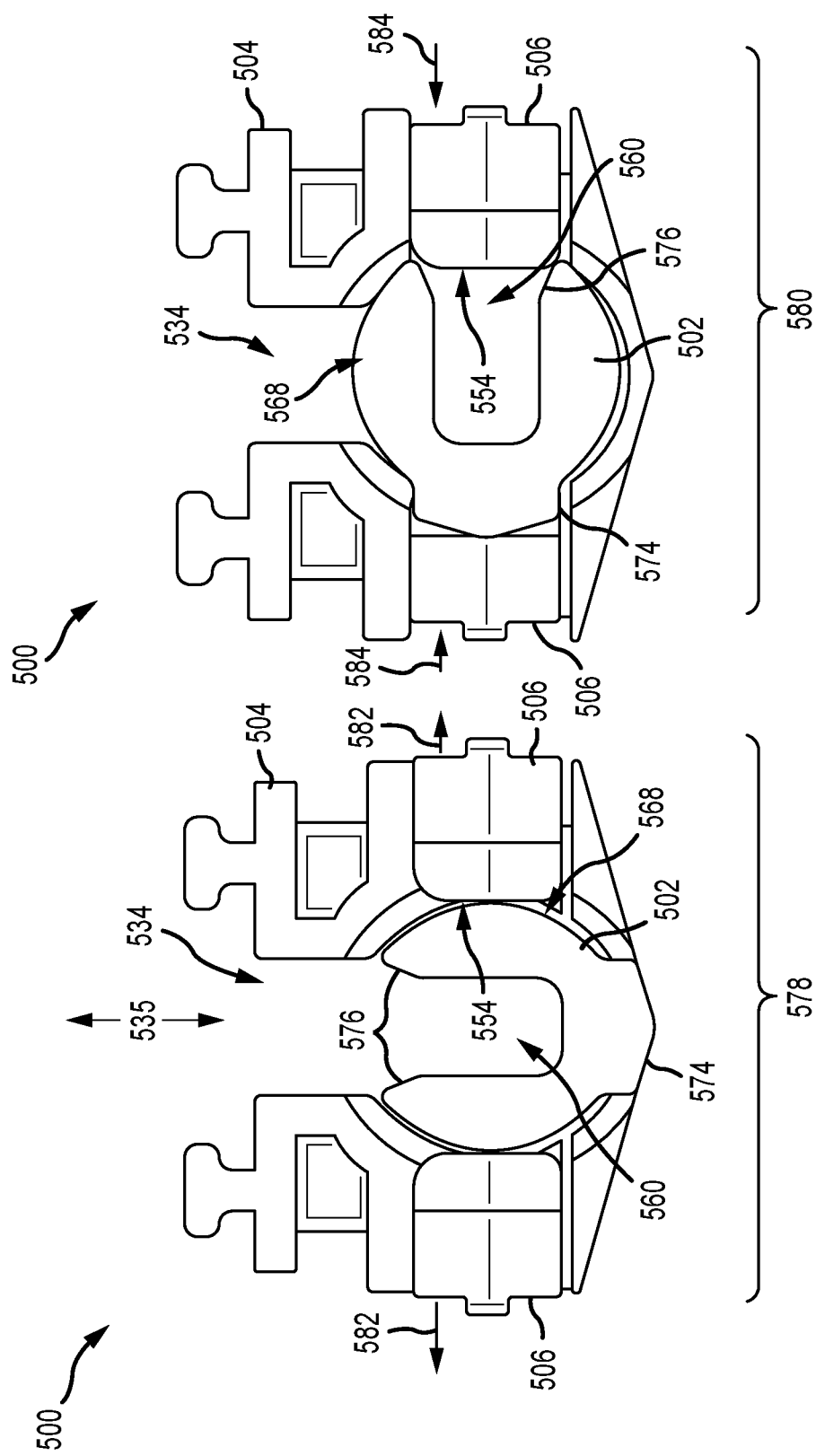

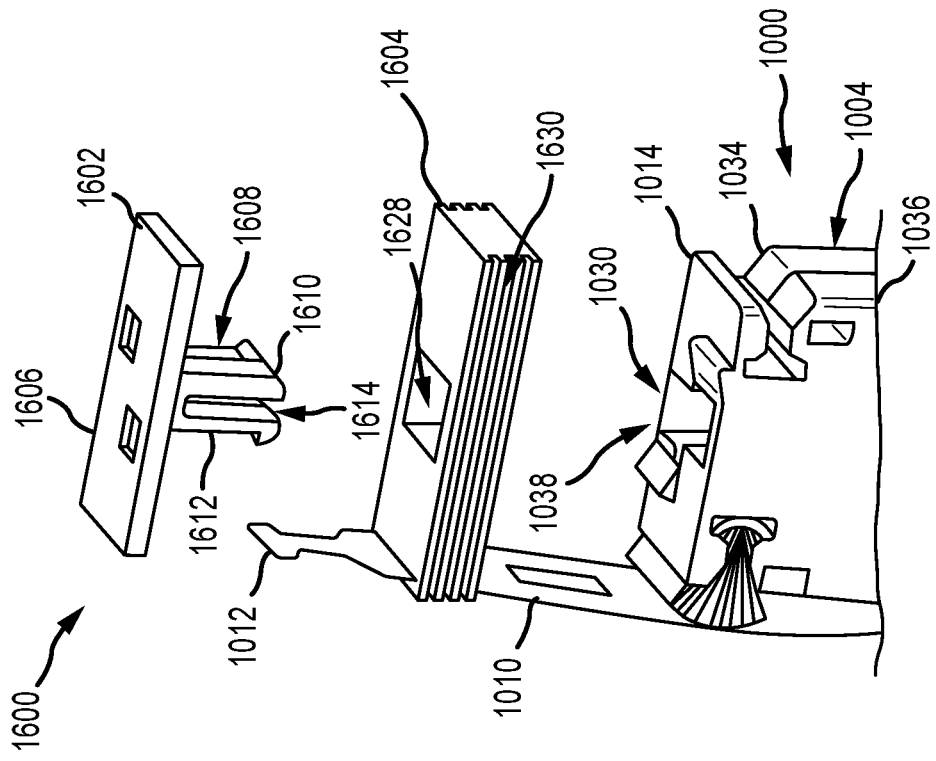
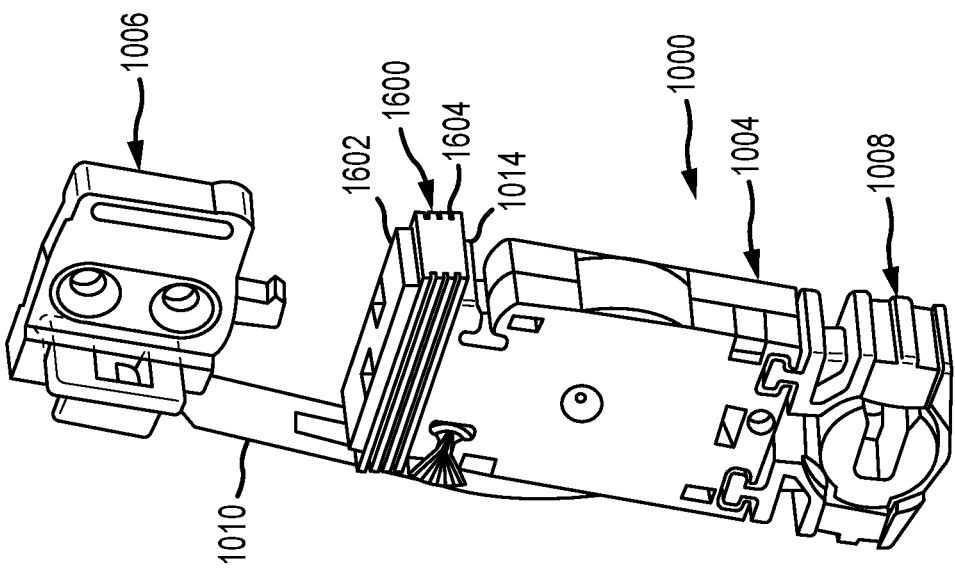
FIG.19B
FIG.19A

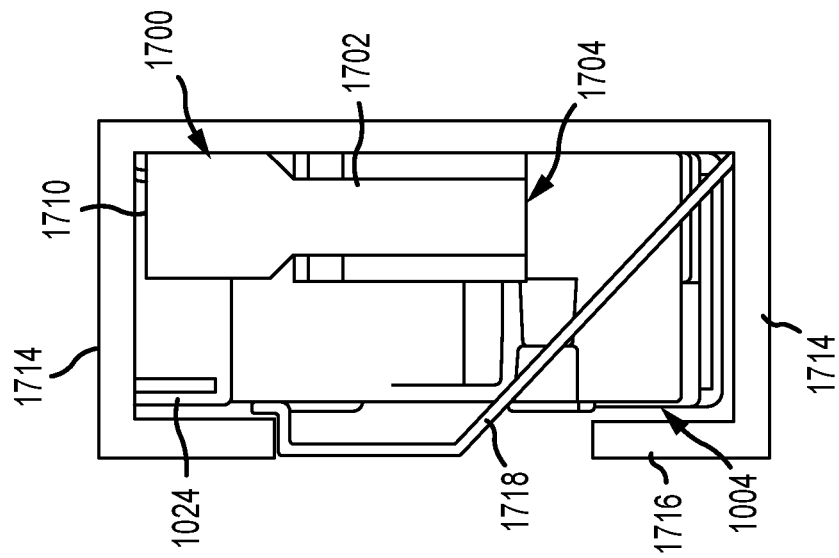
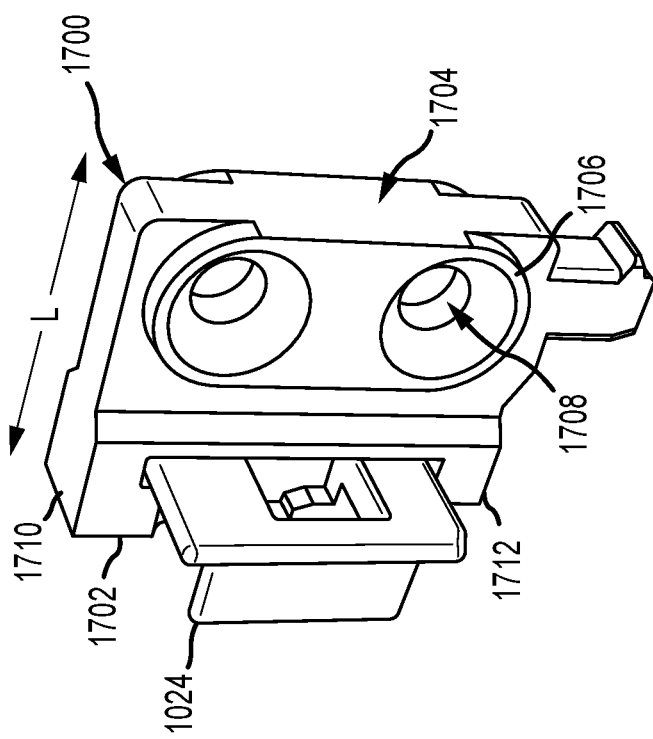
FIG.20B
FIG.20A

INVERTED CONSTANT FORCE WINDOW BALANCE

CROSS-REFERENCE TO RELATED APPLICATIONS

This application is a continuation of U.S. patent application Ser. No. 15/945,269, filed Apr. 4, 2018, now issued as U.S. Pat. No. 10,563,440, which claims priority to and the benefit of U.S. Provisional Patent Application No. 62/483,029, filed on Apr. 7, 2017, U.S. Provisional Patent Application No. 62/580,293, filed on Nov. 1, 2017, and U.S. Provisional Patent Application No. 62/637,149, filed on Mar. 1, 2018, the disclosures of which are hereby incorporated herein by reference in their entireties.

INTRODUCTION

Sash windows assemblies include one or more moveable panels or sashes. These moveable sashes typically slide within or along a window jamb and may include one or more balance assemblies or systems mounted within the space between the sash and the jamb to assist with the sliding movement of the sash. Some known sash windows assemblies allow for the sash to pivot relative to the jamb such that the sash may be tilted inwards for cleaning and/or installation/removal purposes. As such, the balance systems may include a carrier assembly that holds in place within the window jamb to prevent retraction of the balance system due to the titled and/or removed sash.

At least some known inverted constant force window balance systems include a carrier assembly that is coupled to the window sash through a pivot bar. The carrier assembly carries a coil spring having a free end secured to a window jamb channel with a mounting bracket, screw, or other element. As the coil spring unwinds from the sliding movement of the sash, the recoil tendency of the spring produces a retraction force to counter the weight of the window sash. As the window sash tilts, a locking element of the carrier assembly extends outward so as to contact the jamb channel and hold the carrier assembly in place to prevent the coil spring from retracting in the absence of the weight of the sash.

SUMMARY

In one aspect, the technology relates to an inverted constant force window balance system including: a carrier assembly including: a housing; a coil spring disposed within the housing, the coil spring including a free end; and a shoe assembly coupled to the housing, wherein the shoe assembly is configured to receive a pivot bar from a window sash and extend at least one brake upon rotation of the pivot bar; and a mounting bracket releasably coupled to the housing opposite the shoe assembly and coupled to the free end of the coil spring, wherein at least a portion of the mounting bracket is configured to slideably move in relation to the free end between at least two positions, and wherein when at least a portion of the mounting bracket moves between the at least two positions, the mounting bracket disengages from the housing.

In an example, the mounting bracket includes a jamb mount and a coil spring mount, wherein the jamb mount is configured to slide in relation to the coil spring mount between a first position and a second position, in the first position the jamb mount is releasably engaged with the housing and in the second position the jamb mount is disengaged from the housing. In another example, the coil spring mount is coupled to the free end of the coil spring. In yet another example, the jamb mount includes a detent and the coil spring mount includes a corresponding notch defined therein, and wherein the detent is received within the notch in the first position and is released from the notch in the second position. In still another example, the jamb mount is offset with respect to a center of the coil spring mount in the first position. In an example, the jamb mount includes at least one extension arm having a toe extending therefrom, wherein the toe is received by a corresponding projection extending from a top end of the housing when the jamb mount is in the first position.

In another example, the toe is configured to release from the projection in the second position so as to disengage the jamb mount from the housing. In yet another example, the jamb mount includes a boss. In still another example, the shoe assembly includes a housing body having a rotatable cam disposed therein, the cam including a body having an outer cam surface configured to extend the at least one brake upon rotation of the cam. In an example, the cam further includes a first end and an opposite second end, and wherein a flange extends from the outer cam surface adjacent to each cam end. In another example, the flange extends along the entire perimeter of the outer cam surface.

In yet another example, the outer cam surface is defined on a flange extending from the cam body. In still another example, the at least one brake includes a substantially U-shaped body that has a side portion and two legs extending therefrom, the brake body defines a housing opening between the two legs configured to receive the housing body of the shoe assembly such that the at least one brake is slideably coupled to the housing body. In an example, each leg includes a cam surface configured to be actuated by the outer cam surface of the cam body. In another example, the housing body is substantially U-shaped and has two legs, each leg including a free end with an extension arm extending therefrom, wherein the extension arm includes a detent. In yet another example, the carrier assembly housing includes at least one receiving channel having a notch defined in a bottom end, the at least one channel configured to receive a respective extension arm of the shoe assembly housing body with the notch configured to receive the detent.

In still another example, the housing of the carrier assembly is a first housing and the carrier assembly further includes a second housing including a second coil spring disposed therein, the second housing configured to be removably coupled between and to the shoe assembly and the first housing. In an example, the housing includes an outer wall having at least one longitudinal rib extending therefrom. In another example, the window balance system further includes a dam configured to be secured at a top end of the housing after the mounting bracket disengages from the housing.

In another aspect, the technology relates to a mounting bracket for use with an inverted constant force window balance system, the mounting bracket including: a coil spring mount including a cage and a back wall, wherein the coil spring mount is configured to secure a free end of a coil spring; and a jamb mount slidingly coupled to the coil spring mount, the jamb mount including: two side extension arms configured to slidingly receive at least a portion of the back wall; and a bottom extension arm including a toe configured to engage with a housing assembly.

In an example, the mounting bracket further includes a boss positioned opposite the two side extension arms. In another example, the mounting bracket further includes at least one aperture defined in the jamb mount, wherein a mechanical fuse extends from the at least one aperture. In yet another example, the jamb mount slides between two positions relative to the coil spring mount, and wherein the jamb mount in a first position is secured proximate a first side of the coil spring mount and the jamb mount in a second position is positioned proximate an opposite second side of the coil spring mount. In still another example, the back wall includes a notch and at least one of the two side extension arms includes a detent, and wherein the detent is received within the notch to secure the jamb mount in the first position.

In another aspect, the technology relates to a method for installing an inverted constant force window balance system, including a mounting bracket releasably coupled to a carrier assembly having a coil spring disposed therein, in a window jamb, the method including: positioning the window balance system in the window jamb, wherein the mounting bracket is releasably coupled to the carrier assembly; securing the mounting bracket to the window jamb, wherein during the securing operation, at least a portion of the mounting bracket slideably moves in relation to a free end of the coil spring and towards the window jamb; substantially simultaneously with the securing operation, releasing the mounting bracket from the carrier assembly such that the carrier assembly is configured to travel within the window jamb; and receiving at least a portion of a pivot bar coupled to a window sash in the carrier assembly.

In an example, the mounting bracket includes a jamb mount and a coil spring mount, wherein securing the mounting bracket includes sliding the jamb mount from a first position to a second position in relation to the coil spring mount. In another example, the mounting bracket includes a toe and the carrier assembly includes a projection, wherein releasing the mounting bracket from the carrier assembly includes disengaging the toe from the projection.

BRIEF DESCRIPTION OF THE DRAWINGS

There are shown in the drawings examples that are presently preferred, it being understood, however, that the invention is not limited to the precise arrangements and configurations shown.

FIG. 2C is a cross-sectional perspective view of the leading housing assembly.

FIG. 2D is a detailed cross-sectional view of the leading housing assembly shown in FIG. 2C.

FIGS. 5D and 5E are front views of the shoe assembly in a locked and an unlocked position respectively.

FIG. 19A is a perspective view of a dam of the window balance system shown in FIG. 10.

FIG. 19 B is an exploded perspective view of the dam.

FIG. 20A is a perspective view of another jamb mount.

FIG. 20B is a plan view of the jamb mount shown in FIG. 20A.

DETAILED DESCRIPTION

The examples of a window balance system described herein enable a more efficient inverted constant force balance for use with hung window assemblies. In aspects, the window balance system includes a two-piece mounting bracket that facilitates a more secure connection to a window jamb because a portion slideably mounts flush to the jamb while maintaining the original position of the coil spring. Additionally, the mounting bracket may slide along the top of the window balance system enabling the window balance system to be installed on both the left and right side of the window sash (or in each opposing jamb channel) without any modification. As such, the window balance system described herein is not limited to being installed in a single position or orientation. Moreover, a releasable coupling between the mounting bracket and a carrier assembly is robust and decreases undesirable decoupling during shipping, as well as decreases installation time in hung window assemblies.

Furthermore, the window balance system described herein is fully modular and thus can be adapted and configured to a wide range window sash weights from many different window manufactures. The carrier assembly may be modified to include two or more spring coils in series to account for these increased weights. Additionally, adapters and/or extensions may be included within the carrier assembly to increase adaptability with legacy window dimensions and configurations. Accordingly, the window balance system described herein increases ease of use for installers and adaptability for many different hung window assembly sizes.

Figure 1A:
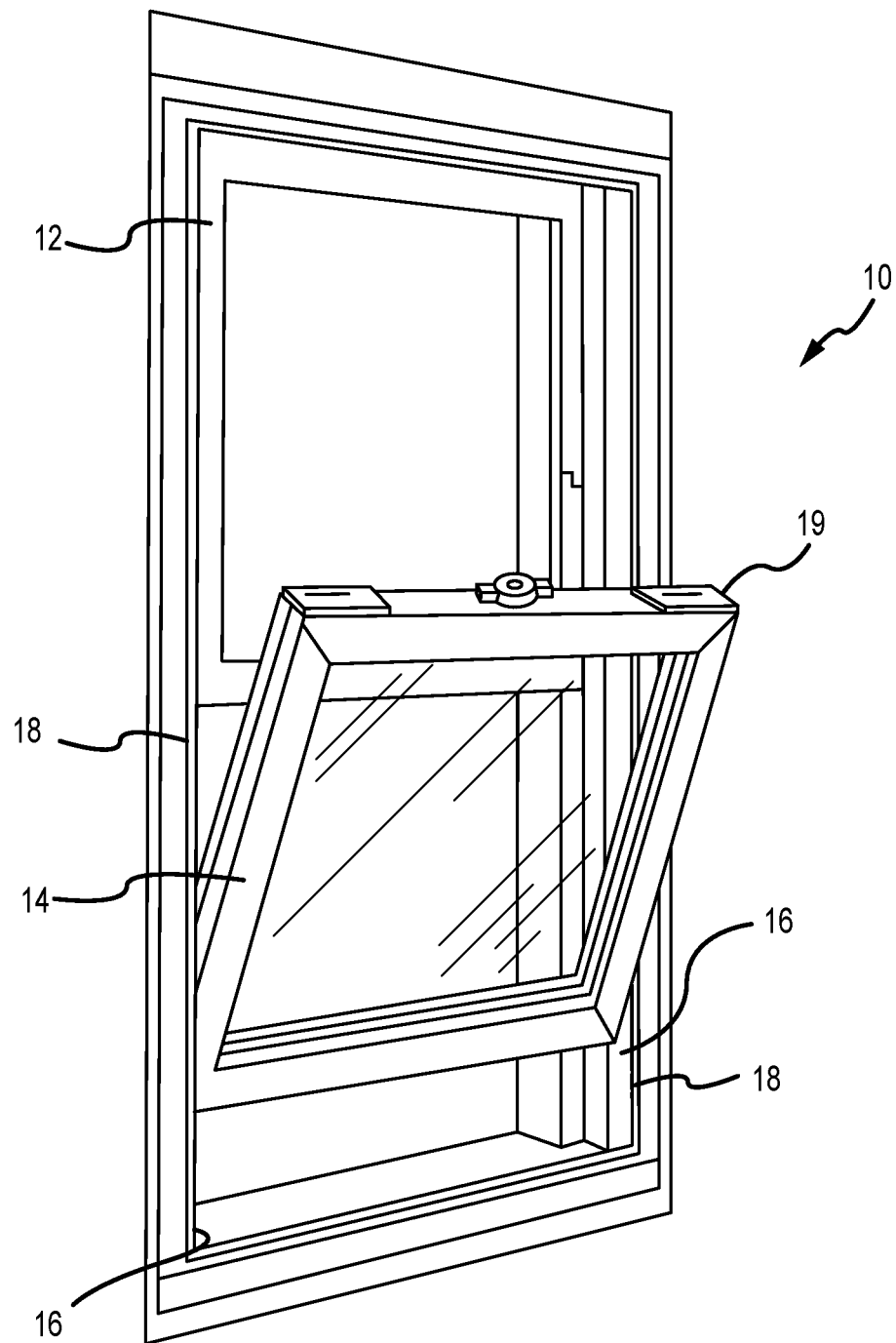
FIG. 1A is a perspective view of a hung window frame assembly.

FIG. 1A is a perspective view of a hung window frame assembly 10. A pair of window sashes 12, 14 are disposed in vertical alignment with a window jamb 16 that forms the side of a window frame 18. Typically, in a single hung window assembly, the upper sash 12 is fixed relative to the window frame 18 and the lower sash 14 is slideable within the window frame 18, while in a double hung window assembly, both the upper sash 12 and the lower sash 14 are slideable within the window frame 18. To counter balance the weight of the slideable window sashes 12 and/or 14 and to assist in the vertical sliding of the window sashes 12 and/or 14 within the window frame 18, a window balance system 20 (shown in FIG. 1B) is provided. The window balance system 20 is mounted within the window jamb 16 and is coupled to the window sash 12, 14, thereby forming a load path that enables support of the window sash 12, 14. In the example, the window frame assembly 10 is configured for vertically sliding sashes 12, 14. In alternative embodiments, the window frame assembly may be configured for horizontally sliding sashes and which may include the window balance systems described herein.

Each window sash 12, 14 may also include tilt latches 19, positioned at a top portion of the sash, and pivot bars 32 (shown in FIG. 1C) extending from a lower portion of the sash. The tilt latches 19 and pivot bars 32 enable the window sash 12, 14 to pivot relative to, and be removed from, the window jamb 16 and facilitate sash installation and/or window cleaning. Each pivot bar 32 may be coupled to the window balance system 20, which is configured to enable both the sliding movement of the window sash 12, 14 and the pivoting movement of the window sash 12, 14. Generally, a single window balance system 20 is installed on either side of each window sash 12, 14 and within the corresponding window jamb 16.

Figure 1B:
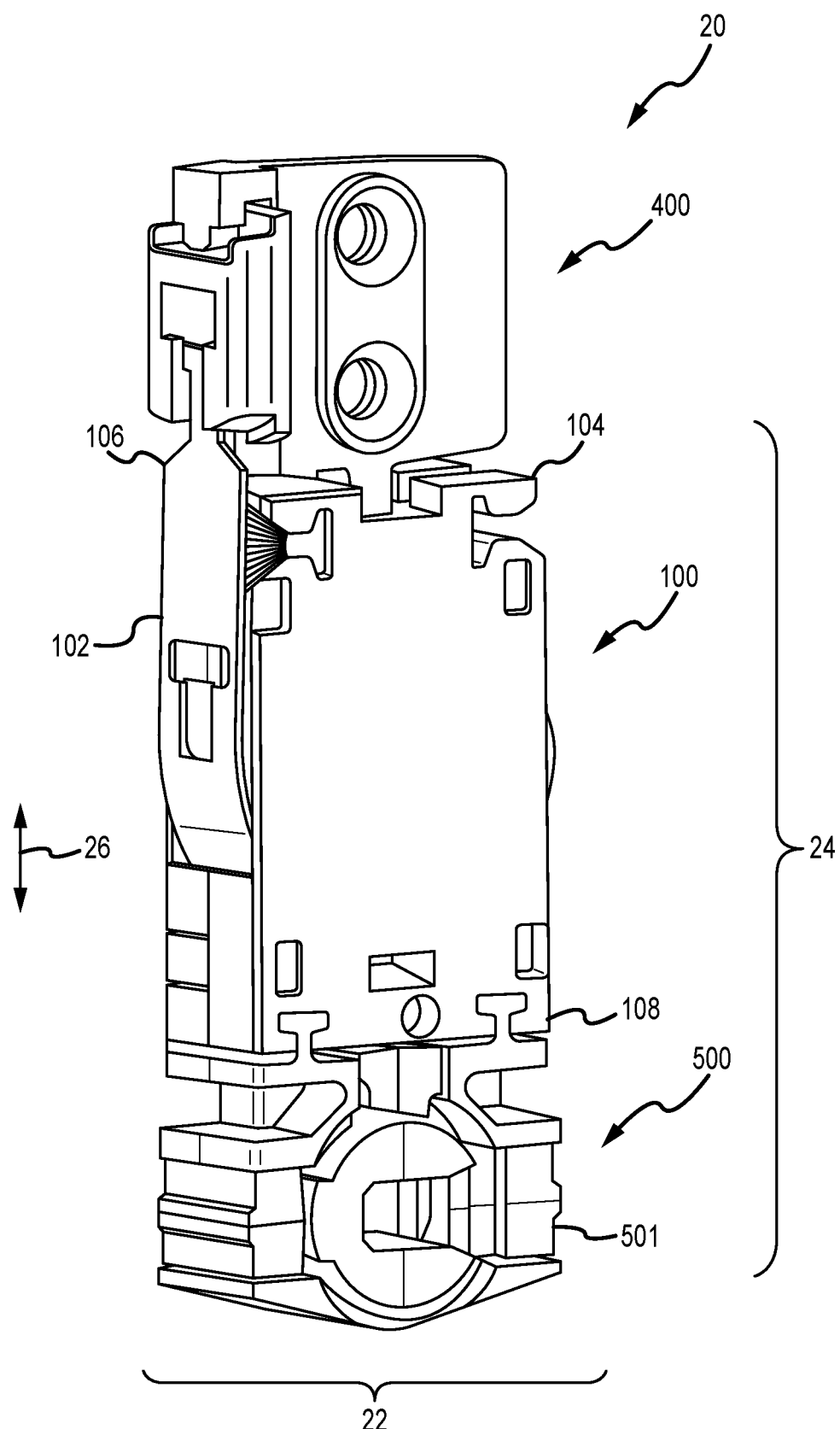
FIG. 1B is a perspective view of an inverted constant force window balance system.

FIG. 1B is a perspective view of the inverted constant force window balance system 20 that may be used with the hung window frame assembly 10 (shown in FIG. 1A). The window balance system 20 includes a leading housing assembly 100, a mounting bracket 400, and a shoe assembly 500. The leading housing assembly 100 houses a constant force coil spring 102 that includes a free end 106 that is coupled to the mounting bracket 400. The mounting bracket 400 enables the window balance system 20 to be secured to the window jamb 16 as described below in reference to FIGS. 1C and 1D.

The window balance system 20 is illustrated in a shipping configuration 22, where a top end 104 of the leading housing assembly 100 is releasably coupled to the mounting bracket 400. The shipping configuration 22 enables the window balance system 20 to be transported and installed within the window jamb without the mounting bracket 400 being undesirably dislodged from a carrier assembly 24, and thereby, decreasing the likelihood that components may be misplaced and/or lost. In the example, the leading housing assembly 100 and the shoe assembly 500 may form the carrier assembly 24. A bottom end 108 of the leading housing assembly 100 is removably coupled to the shoe assembly 500 that is configured to be secured to the window sash via a pivot bar. The shoe assembly 500 includes a lock system 501 that enables the carrier assembly 24 to be frictionally secured within the window jamb when the window sash is tilted relative to the window frame as described herein. The carrier assembly 24 also couples the window balance system 20 to the window sash to assist in vertical sliding movement 26 of the window sash while the mounting bracket 400 is statically secured to the window jamb.

Figure 1C:
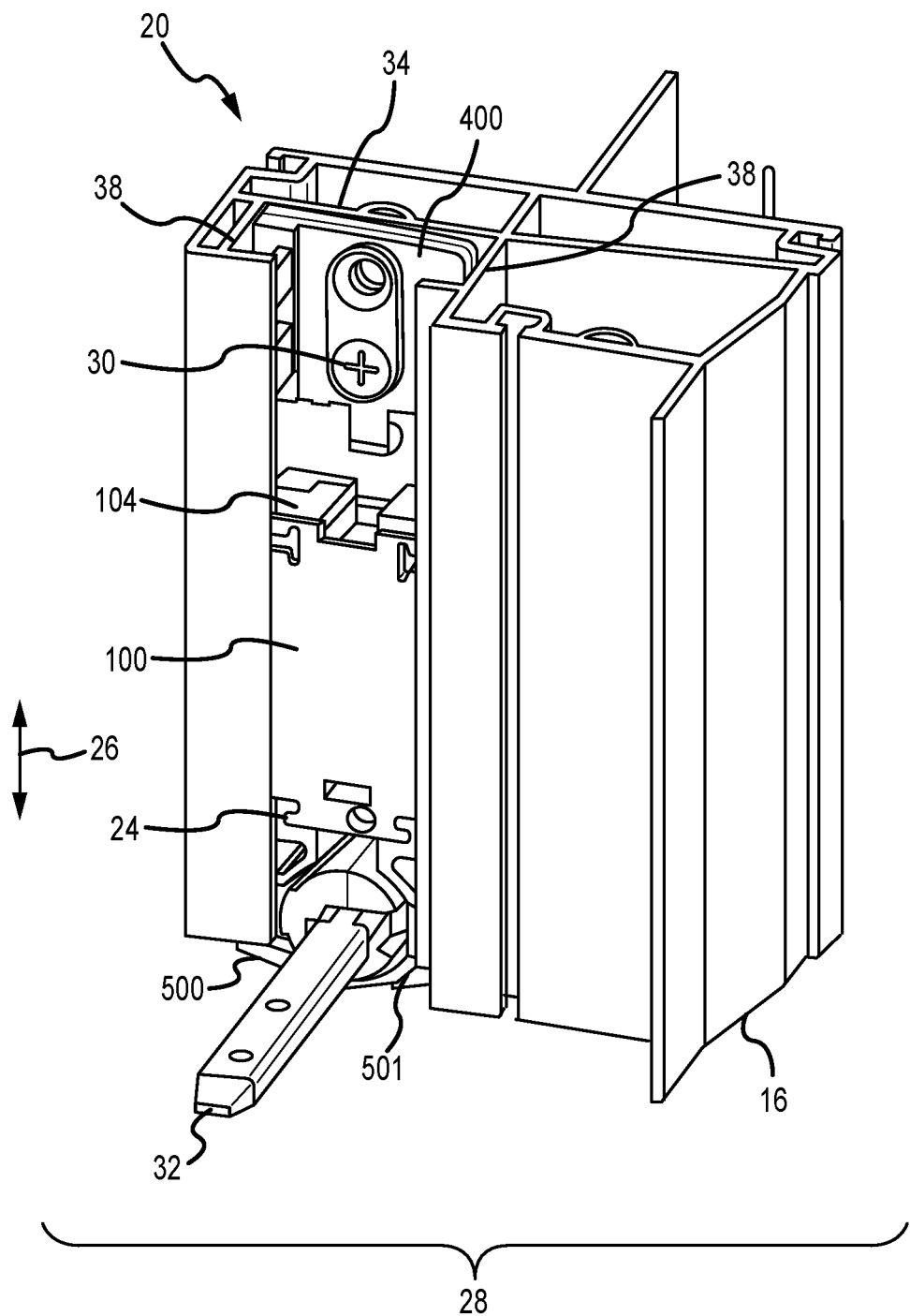
FIG. 1C is a perspective view of the window balance system of FIG. 1B installed in a window jamb.
Figure 1D:
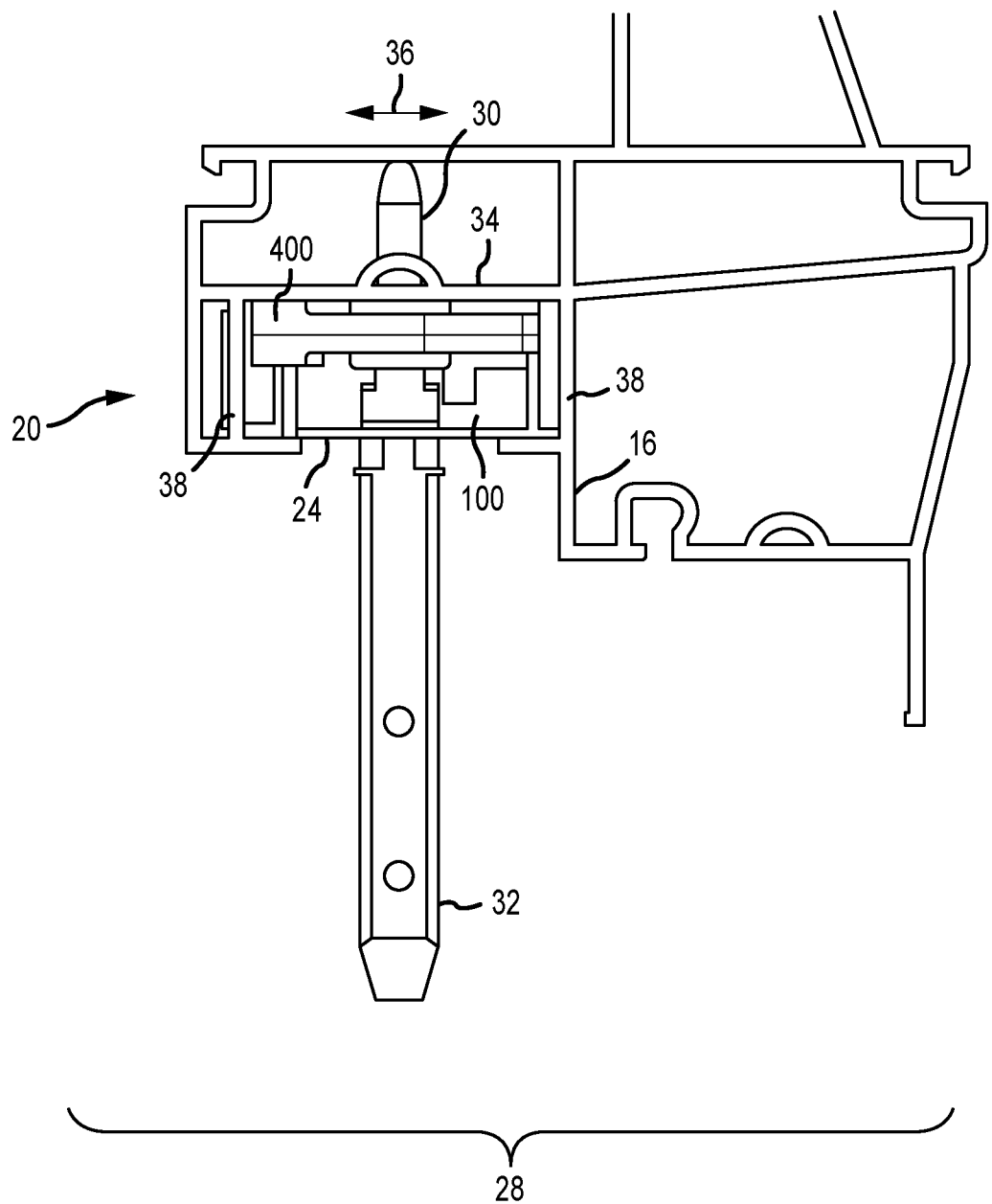
FIG. 1D is a plan view of the installed window balance system of FIG. 1C.

FIG. 1C is a perspective view of the window balance system 20 installed in the window jamb 16. FIG. 1D is a plan view of the window balance system 20 of FIG. 1C. Referring concurrently to FIGS. 1C and 1D, the window balance system 20 is illustrated in an installed configuration 28 within the window jamb 16. In the installed configuration 28, the mounting bracket 400 is secured to the window jamb 16 via one or more screws or other connection elements 30 such that the mounting bracket 400 can be released from the leading housing assembly 100. When the mounting bracket 400 is secured to the window jamb 16, the carrier assembly 24 may be coupled to the window sash (not shown), via the pivot bar 32. Accordingly, as the window sash slides vertically 26 within the window jamb 16, the coil spring is drawn out and retracts with respect to the leading housing assembly 100 to counterbalance the weight of the sash and assist in the sliding movement 26. The pivot bar 32 is received by the shoe assembly 500 such that the window sash may also tilt with respect to the window jamb 16 and the pivot bar 32 may rotate within the shoe assembly 500 to actuate the lock system 501.

In the example, the window jamb 16 may be a substantially C-shaped channel such that the mounting bracket 400 is coupled to a back wall 34 thereof. During installation of the mounting bracket 400 (e.g., securing the mounting bracket 400 to the window jamb 16) the mounting bracket 400 may decouple and release from the top end 104 of the leading housing assembly 100. In other examples, when securing the mounting bracket 400 to the window jamb 16, the mounting bracket 400 may stay coupled to the leading housing assembly 100 until the window sash is installed on the carrier assembly 24 so that it is the weight of the window sash that releases the top end 104 of the leading housing assembly 100 from the mounting bracket 400. Once the carrier assembly 24, including the leading housing assembly 100 and shoe assembly 500, is released from the mounting bracket 400, the carrier assembly 24 is in the installed configuration 28. In the installed configuration 28, the carrier assembly 24 is retractably moveable 26 axially along the jamb channel with respect to the mounting bracket 400 and the force applied by the coil spring 102 at least partially balances the weight of the window sash as described herein.

When the window sash tilts relative to the window jamb 16, the pivot bar 32 rotates within the shoe assembly 500 and engages the lock system 501 to extend horizontally 36 within the window jamb 16 and towards side walls 38 of the jamb channel to secure the carrier assembly 24 in place within the window jamb 16 through a friction connection. The engagement of the lock system 501 with the side walls 38 resists the recoil force of the coil spring and prevents vertical movement 26 of the carrier assembly 24 within the window jamb 16 as the tilting movement of the window sash removes the weight of the window sash from the carrier assembly 24. Generally, the coil spring is rated for a predetermined window sash weight. As such, for heavier window sashes (e.g., due to larger sizes or denser materials) the window balance system 20 may be modified and re-configured to add additional coil springs, in series, to enable the heavier window sashes to be supported as required or desired.

Figures 1E, 1F, 1G:
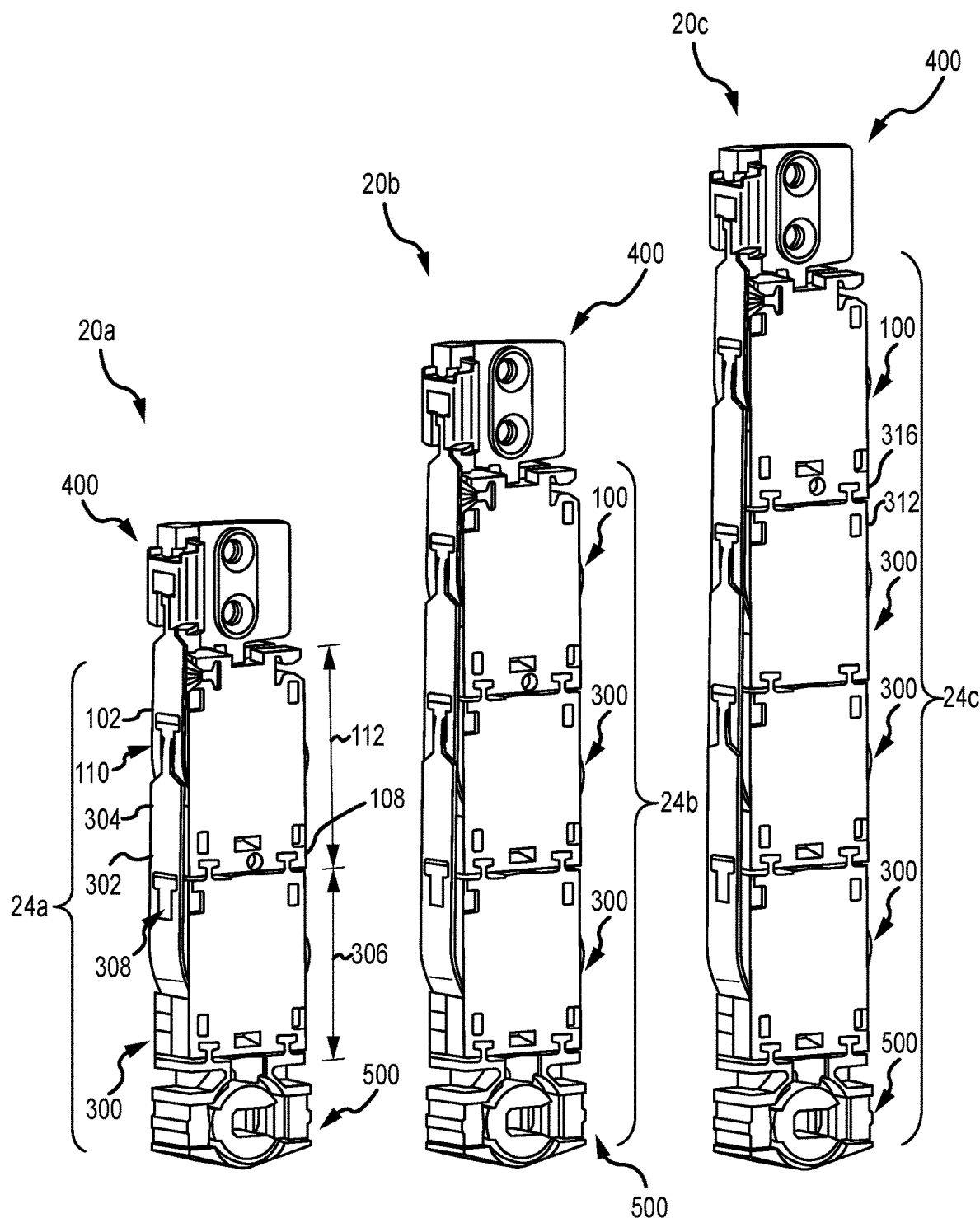
FIGS. 1E-1G are perspective views of a window balance system in alternative configurations.

FIGS. 1E-1G are perspective views of an inverted constant force window balance system in alternative configurations. The window balance system 20a that is shown in FIG. 1E includes the mounting bracket 400 and a first alternative configuration of a carrier assembly 24a. In this example, the carrier assembly 24a includes the leading housing assembly 100 with the leading coil spring 102, and the shoe assembly 500, however, the carrier assembly 24a also includes a trailing housing assembly 300 that houses a trailing coil spring 302. In the example, the trailing housing assembly 300 is coupled between the bottom end 108 of the leading housing assembly 100 and the shoe assembly 500. A free end 304 of the trailing coil spring 302 is coupled to an opening 110 defined within the leading coil spring 102 proximate its free end, thus forming a series of spring coils and enable counterbalance of larger weight window sashes. In the example, the leading housing assembly 100 has a height 112 that is greater than a height 306 of the trailing housing assembly 300 and the leading coil spring 102 has a spring rate and length that is approximately equal to the trailing coil spring 302. In alternative embodiments, the leading housing assembly height 112 may be equal to the trailing housing height 306. Additionally or alternatively, the spring rate and/or the length of the leading coil spring 102 may be different from the trailing coil spring 302.

By coupling the trailing coil spring 302 in series with the leading coil spring 102, the spring rate and the rated balance weight of the carrier assembly 24a increases, thereby enabling operation in larger/heavier window sash sizes. However, the window balance system 20 (shown in FIG. 1B) is configured such that any number of additional trailing housing assemblies 300 may be added in series. For example, two additional trailing housing assemblies 300 may be added between the leading housing assembly 100 and the shoe assembly 500 forming a further alternative carrier assembly 24b as shown in FIG. 1F. In another example, three additional trailing housing assemblies 300 may be added between the leading housing assembly 100 and the shoe assembly 500 forming yet another alternative carrier assembly 24c as shown in FIG. 1G. Alternatively, any number of trailing housing assemblies 300 may be utilized in a given carrier assembly 24, as required or desired for a particular application.

In both FIGS. 1F and 1G, a top end 312 of each trailing housing assembly 300 may be coupled to a bottom end 316 of the adjacent trailing housing assembly 300 to form a series of housing assemblies. Additionally, a free end 304 of each trailing coil spring 302 may be coupled to an opening 308 defined within the adjacent trailing coil spring 302 to form a series of coil springs.

Moreover, the modular configuration of the window balance system (e.g., leading housing assembly 100, trailing housing assembly 300, mounting bracket 400, and/or shoe assembly 500) enables other components to be coupled thereto. For example, an adapter 800 (shown in FIG. 8), an extension 900 (shown in FIG. 9), and/or a dam 1600 (shown in FIG. 19A may be coupled to the leading housing assembly 100, the trailing housing assembly 300, and/or the shoe assembly 500 to form other carrier assembly configurations and enable additional structure and/or functionalities as described further herein.

Figure 2A:
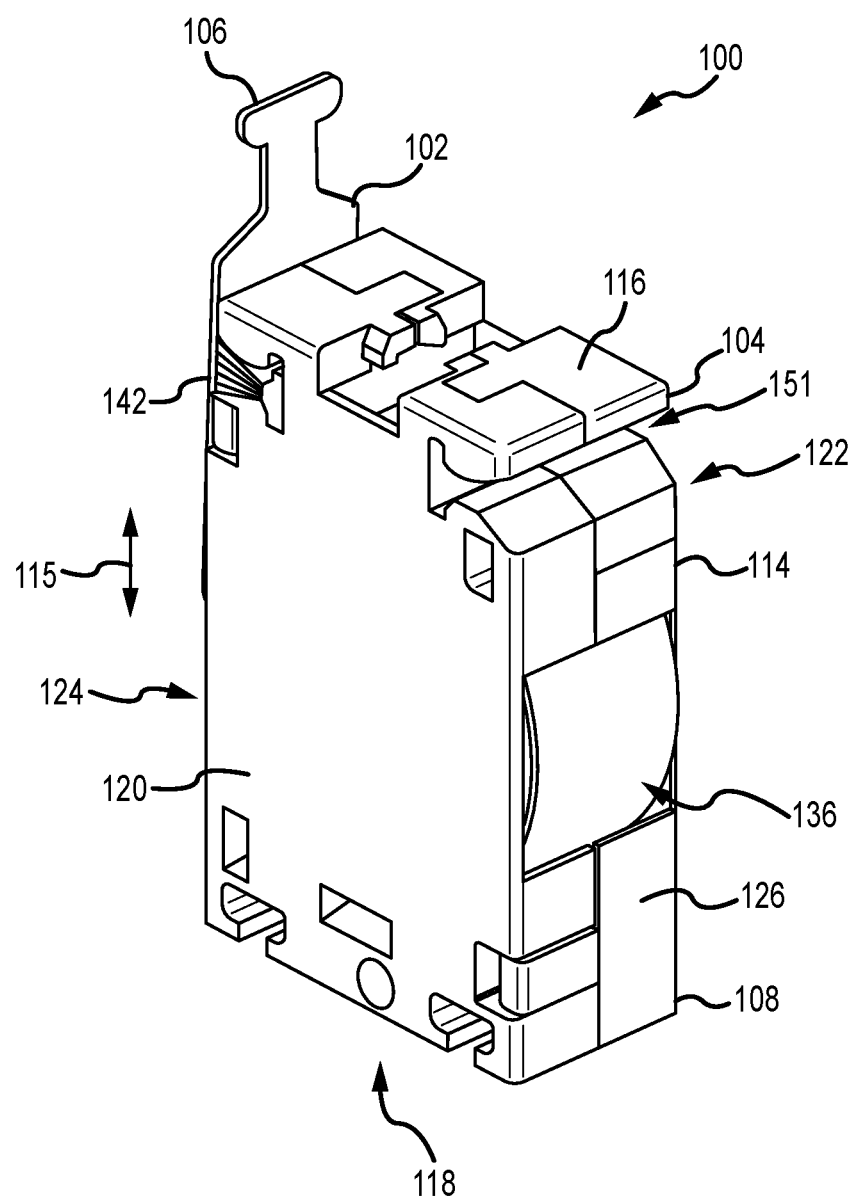
FIG. 2A is a perspective view of a leading housing assembly of the window balance system shown in FIG. 1B.
Figure 2B:
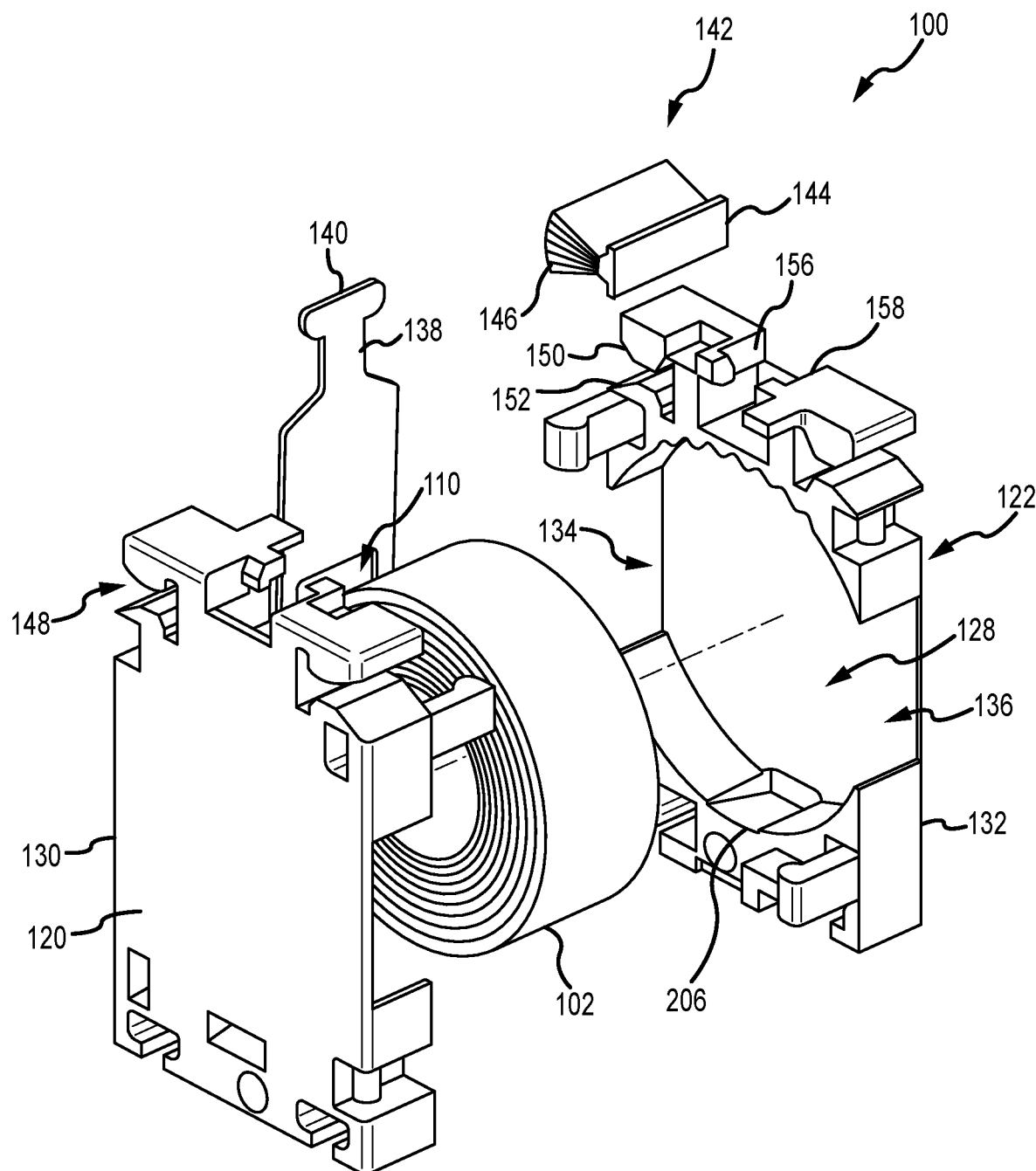
FIG. 2B is an exploded view of the leading housing assembly.

FIG. 2A is a perspective view of the leading housing assembly 100 of the window balance system 20 (shown in FIG. 1B). FIG. 2B is an exploded view of the leading housing assembly 100. Referring concurrently to FIGS. 2A and 2B, the leading housing assembly 100 includes a housing 114 extending in a longitudinal direction 115 that is parallel to the sliding movement 26 (shown in FIG. 1C), when installed. The housing 114 includes the top end 104 having a top wall 116 and the bottom end 108 having a bottom wall 118. The housing 114 further includes a first wall 120 and an opposite second wall 122, and a first end wall 124 and an opposite second end wall 126. The housing 114 defines an interior cavity 128 (shown in FIG. 2B) which receives the leading coil spring 102. In the example, the housing 114 is formed from two identical members 130, 132 coupled together, however, in alternative examples, the housing 114 may be formed from any number of members that enable the leading housing assembly 100 to function as described herein.

Each end wall 124, 126 defines an opening 134, 136, respectively, that extends from the first wall 120 to the second wall 122. The free end 106 of the coil spring 102 may extend through the first end wall opening 134 and towards the top end 104 of the housing 114 to be coupled to the mounting bracket. In the example, the coil spring free end 106 is substantially T-shaped and has a leg 138 and a cross-member 140 with the opening 110 defined proximate to the leg 138. The opening 110 is sized and shaped to correspond to the trailing coil spring free end such that it may receive and secure the free end of the trailing coil spring and hold it in place when the trailing housing assembly 300 (shown in FIG. 3A) is coupled in series to the leading housing assembly 100 as described above. In alternative examples, the coil spring free end 106 may have any other type of configuration to enable the window balance system to function as described herein.

The leading housing assembly 100 also includes a wiper system 142 that includes a supporting spline 144 with a tufted fabric pile 146 projecting therefrom. The wiper system 142 is positioned at the top end 104 of the housing 114 and within the first end wall 124. More specifically, the first end wall 124 includes a substantially T-shaped channel 148 defined at the top end 104. The channel 148 extends from the first wall 120 to the second wall 122 such that the supporting spline 144 may be slideably received therein. With the supporting spline 144 received within the channel 148, the tufted fabric pile 146 may extend beyond the end wall 124 towards the coil spring free end 106. The channel 148 may be further defined by two opposing oblique surfaces 150, 152 such that the tufted fabric pile 146 may spread out in a V-shape when extending beyond the first end wall 124.

Dirt and debris (e.g., gypsum dust, sawdust, sand, etc.) are common in new and remodel construction atmospheres and may be present within the window jamb. Dirt and debris accumulation on the coil spring 102 and within the housing 114 reduces its functionality and renders the attached window sash more difficult to open and close, and may also induce undesirable operating noise as components slide against one another. As such, the wiper system 142 is positioned adjacent to the coil spring 102 so as to wipe the coil during each sash opening and closing to reduce dirt and debris accumulation thereon. Additionally, the wiper system 142 reduces outside air infiltration through the window jamb.

The coil spring free end 106 may be coupled to the mounting bracket and enable counterbalance support of the opening and closing of the attached window sash as described above. FIGS. 2A and 2B illustrate the coil spring free end 106 extending out of the first end wall opening 134 and the wiper system 142 extending from the first end wall 124. The housing 114, however, is formed from two identical members 130, 132, and as such, includes a symmetrical opening 136 on the second end wall 126 and a symmetrical channel 151 defined within the second end wall 126. Accordingly, the coil spring free end 106 and the wiper system 142 may alternatively extend from the second end wall 126 when assembled.

FIG. 2C is a cross-sectional perspective view of the leading housing assembly 100 and FIG. 2D is a detailed cross-sectional view of the leading housing assembly 100 shown in FIG. 2C. Referring concurrently to FIGS. 2C and 2D, the cross-section is taken along a plane that is substantially parallel to the end wall 124. In the example, a top receiving element 153 is defined within the top wall 116 of the housing 114. The top receiving element 153 includes a substantially U-shaped channel 154 defined in the top wall 116 that extends from the first wall 120 to the second wall 122. The channel 154 is defined by two opposing side surfaces 156, 158 (shown in FIG. 2B) and a bottom surface 160. Each side surface 156, 158 may include a projection 162 that extends at least partially into the channel 154 from an upper portion of the side surfaces 156, 158. The projection 162 includes a bottom surface 164 having a notch 166 defined therein. The projection 162 is positioned approximately at the midpoint between the first and second walls 120, 122 and as such, the projection 162 includes two symmetrical sections 168, 170, each formed in the respective housing member 130, 132, that are positioned proximate to one another when the housing 114 is assembled. Additionally, each wall 120, 122 of the housing member may include an extension 155 that projects at least partially into the channel 154 such that the channel 154 forms a cavity at the top end 104 of the housing 114 to receive a portion of the mounting bracket.

In the shipping configuration 22 (shown in FIG. 1B), the notch 166 receives and engages a corresponding detent 424 (shown in FIG. 4B) extending from the mounting bracket 400 to facilitate releasably coupling the mounting bracket 400 to the leading housing assembly 100, which is discussed further below. The notch/detent releasable coupling enables a more secure connection between the mounting bracket and the leading housing assembly 100 such that during shipping the mounting bracket and the leading housing assembly 100 are not undesirably uncoupled or disengaged from one another. Additionally, the notch/detent releasable coupling also enables the mounting bracket to be more quickly released from the leading housing assembly 100 during installation within the window jamb.

Figure 2E:
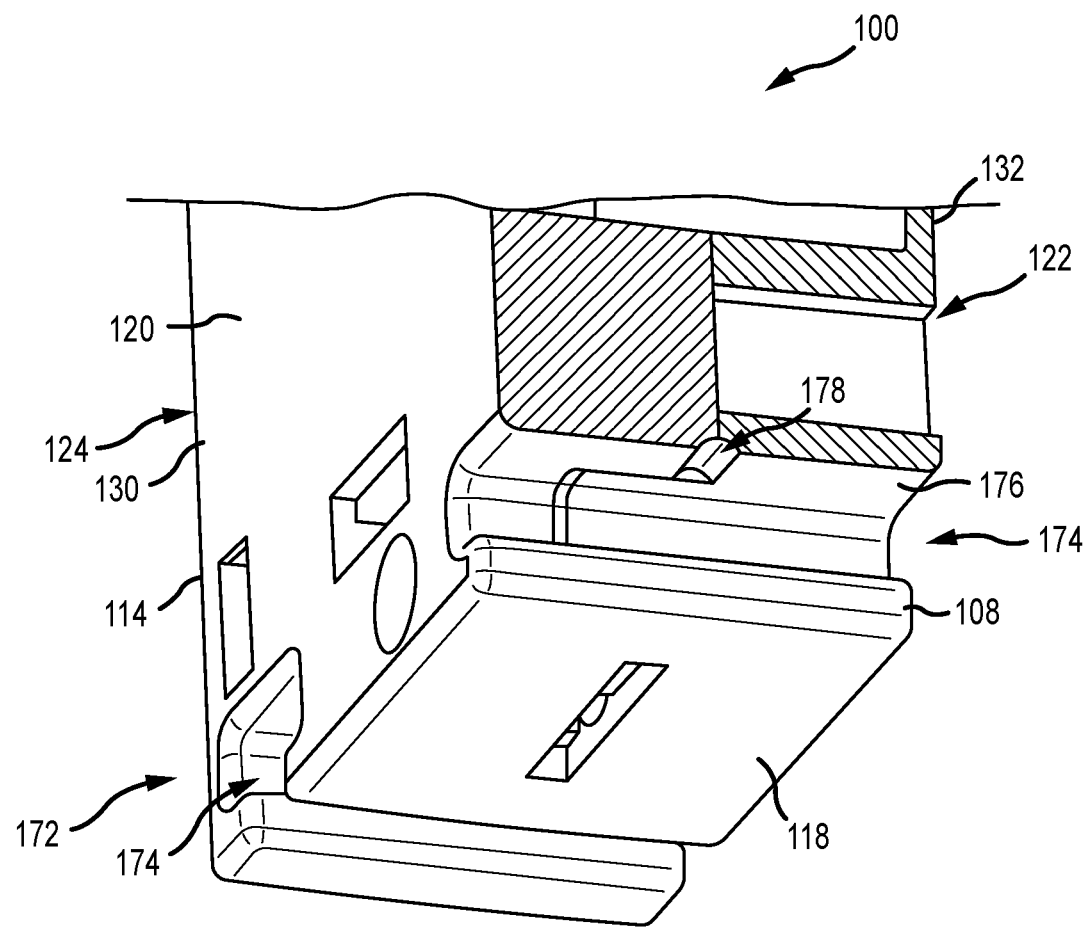
FIG. 2E is another detailed cross-sectional perspective view of the leading housing assembly.

FIG. 2E is another detailed cross-sectional perspective view of the leading housing assembly 100. The cross-section is taken along a plane that is substantially parallel to the end wall 124. In the example, a bottom receiving element 172 is defined within the bottom wall 118 of the housing 114. The bottom receiving element 172 includes at least one channel 174 defined in the bottom wall 118 that extends from the first wall 120 to the second wall 122. The channels 174 are substantially T-shaped (e.g., dog bone-shaped) and are defined by an innermost surface 176. The innermost surface 176 includes a notch 178 defined on the surface 176 and positioned approximately at the midpoint between the first and second walls 120, 122. As such, the notch 178 is formed by two symmetrical sections each formed in the respective housing member 130, 132.

The bottom receiving element 172 enables removable receipt and engagement of a corresponding top extension element from any other component to facilitate forming the carrier assembly, for example, the carrier assemblies 24, 24a, 24b, and 24c (shown in FIGS. 1B and 1E-1G). For example, a top extension element may be slid into the bottom receiving element 172 to secure two components together. More specifically, the notch 178 is sized and shaped to receive and engage a corresponding detent, for example, the shoe assembly detent 526 (shown in FIG. 5A), the trailing housing assembly detent 352 (shown in FIG. 3A), the adapter detent 816 (shown in FIG. 8), or the extension detent 926 (shown in FIG. 9) on the top extension element to enable a more secure component connection. By including the notch/detent connection, undesirable component disconnection is reduced, for example, during shipment, installation, and/or operation of the window balance system. In an example, the notch/detent connection enables a more automated installation process, where an automated arm can pick up the window balance system at one pick up point without other components being disconnected.

Figure 2F:
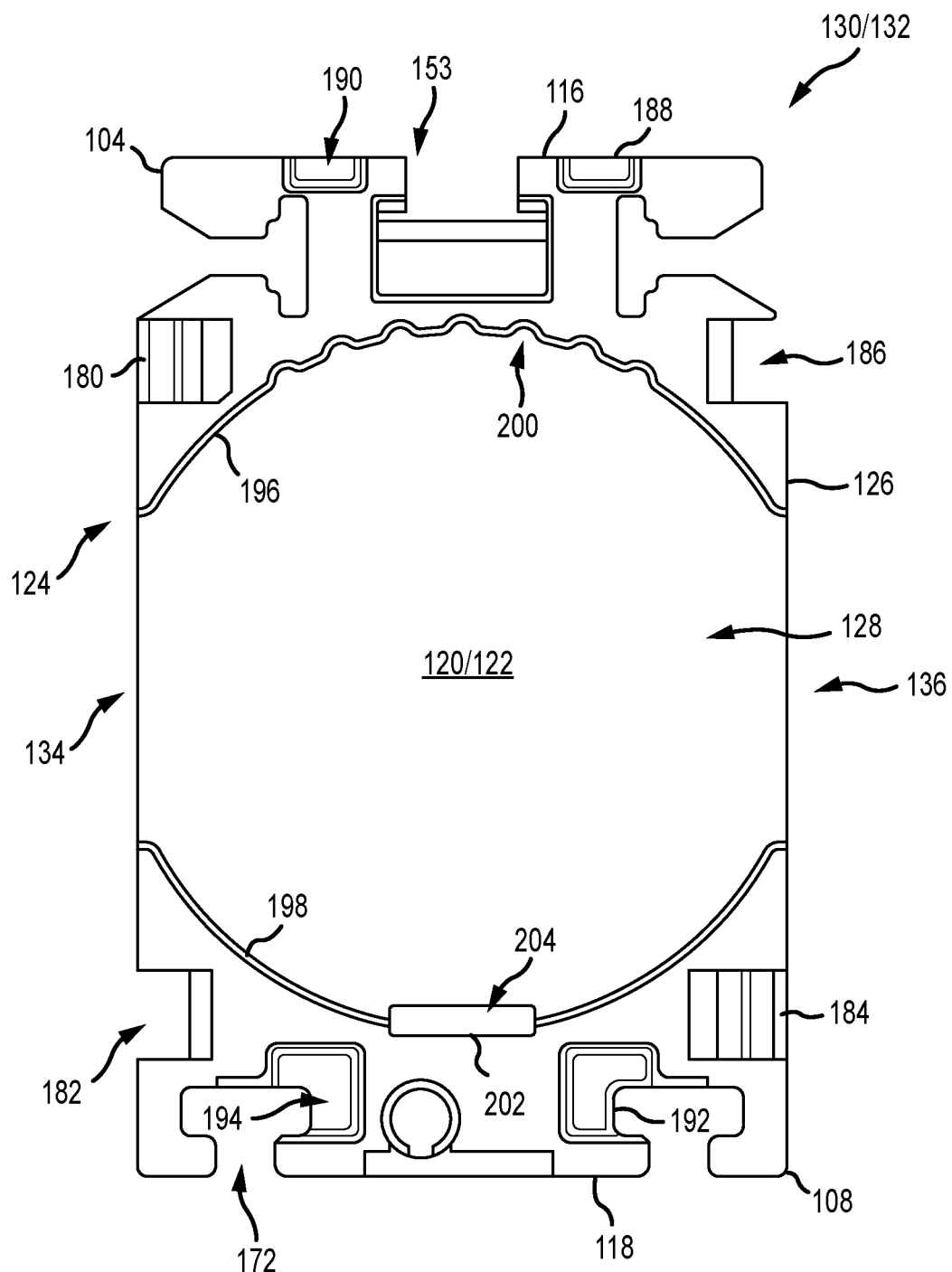
FIG. 2F is an interior view of the leading housing assembly.

FIG. 2F is an interior view of the leading housing assembly 100 (shown in FIG. 2A). The housing of the leading housing assembly is formed from two identical housing members 130, 132 placed back to back and coupled together. As such, each housing member 130, 132 forms half of the top wall 116 including the top receiving element 153, half of the bottom wall 118 including the bottom receiving element 172, half of the first end wall 124 including the opening 134, and half of the second end wall 126 including the opening 136. The first end wall 124 includes a first hook extension 180 adjacent the top end 104 and a first recess 182 defined within the first end wall 124 adjacent the bottom end 108. The second end wall 126 includes a second hook extension 184 adjacent the bottom end 108 and a second recess 186 defined within the second end wall 126 adjacent the top end 104. Each hook extension 180, 184 corresponds to the opposite recess 182, 186 such that the housing members 130 and 132 may be coupled together. For example, the housing members 130 and 132 may be a snap fit connection via the hook extensions 180, 184 and recesses 182, 186. By using identical housing members, the manufacturing and assembly processes of the window balance system is more efficient. In other examples, however, the housing members may not be identical and one member may include features and/or components not included on the other so as to enable the housing to function as described herein.

Additionally, the top wall 116 further includes a top projection 188 adjacent the second end wall 126 and a top recess 190 defined within the top wall 116 adjacent the first end wall 124, such that when coupling housing members 130 and 132 together, opposite projections 188 are received within the recesses 190 and provide a more secure connection. Similarly, the bottom wall 118 further includes a bottom projection 192 adjacent the second end wall 126 and a bottom recess 194 defined within the bottom wall 118 adjacent the first end wall 124. In alternative examples, the housing members 130 and 132 may be coupled together through any other connection configuration that enables the housing 114 to function as described herein. These projections and recesses and hook extensions and recesses are more clearly illustrated in FIG. 2B although the features are not labeled.

The interior cavity 128 that houses the coil spring 102 is defined by an upper annular surface 196 and a lower annular surface 198. The upper annular surface 196 may include a plurality of radially extending recesses 200 that facilitate reducing surface friction of the upper annular surface 196 when the coil spring 102 rotates therein. The lower annular surface 198 may include a debris trap 202 that facilitates removing dirt and debris that may accumulate within the housing 114. The debris trap 202 includes an opening 204 defined in the wall 120, 122 and an angled surface 206 (shown in FIG. 2B) offset from the lower annular surface 198 and positioned at the bottom of the interior cavity 128.

Figure 3A:
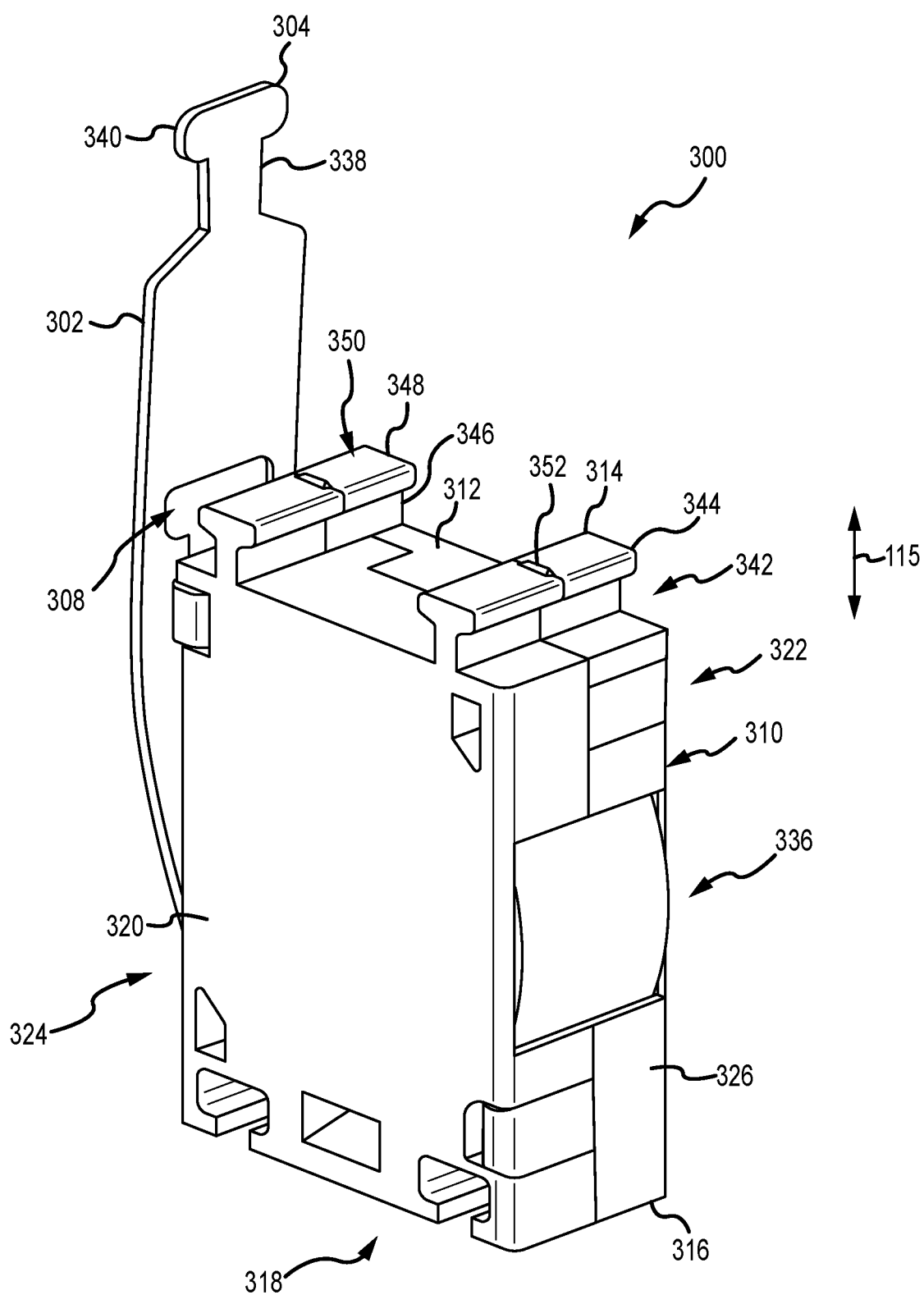
FIG. 3A is a perspective view of a trailing housing assembly of the window balance systems shown in FIGS. 1E-1G.
Figure 3B:
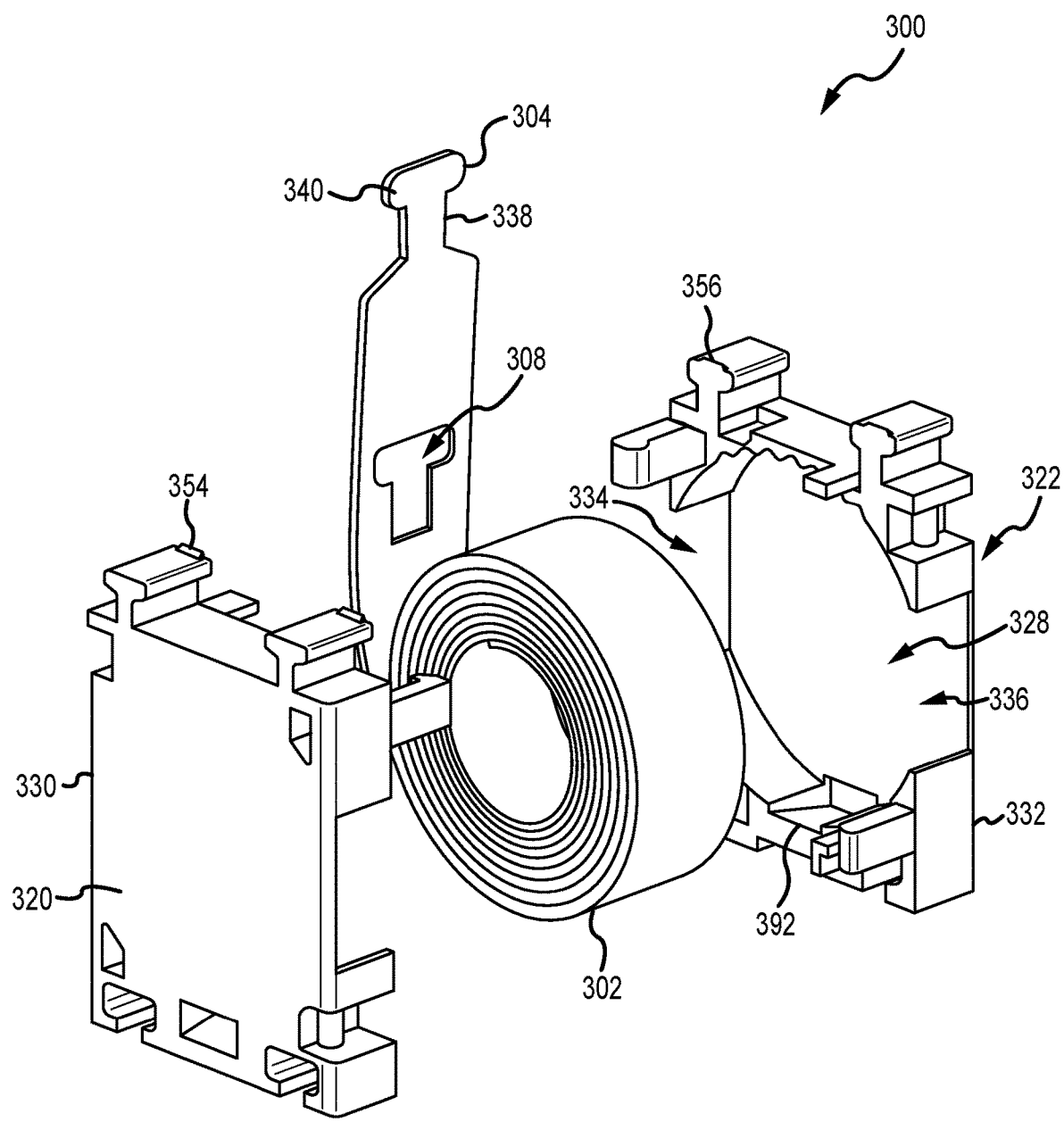
FIG. 3B is an exploded view of the trailing housing assembly.

FIG. 3A is a perspective view of the trailing housing assembly 300 of the window balance systems 20a-c (shown in FIGS. 1E-1G). FIG. 3B is an exploded view of the trailing housing assembly 300. Referring concurrently to FIGS. 3A and 3B, the trailing housing assembly 300 includes a housing 310 extending in the longitudinal direction 115. The housing 310 includes a top end 312 having a top wall 314 and a bottom end 316 having a bottom wall 318. The housing 310 further includes a first wall 320 and an opposite second wall 322, and a first end wall 324 and an opposite second end wall 326. The housing 310 defines an interior cavity 328 (shown in FIG. 3B) which receives the trailing coil spring 302. In the example, the housing 310 is formed from two identical members 330, 332 coupled together, however, in alternative examples, the housing 310 may be formed from any number of members to enable the trailing housing assembly 300 to function as described herein.

Each end wall 324, 326 defines an opening 334, 336, respectively, that extends from the first wall 320 to the second wall 322. The free end 304 of the coil spring 302 may extend through the first end wall opening 334 and towards the top end 312 of the housing 310 to be coupled to the leading housing assembly 100 or an adjacent trailing housing assembly 300. In the example, the coil spring free end 304 is substantially T-shaped having a leg 338 and a cross-member 340 with the opening 308 defined proximate to the leg 338. The opening 308 is sized and shaped to correspond to the trailing coil spring free end 304 such that it may receive and secure the free end 304 and hold it in place when more than one trailing housing assemblies 300 are coupled together in series. In alternative examples, the coil spring free end 304 may have any other type of configuration to enable the window balance system 20 to function as described herein.

FIGS. 3A and 3B illustrate the coil spring free end 304 extending out of the first end wall opening 334. The housing 310, however, is formed from two identical members 330, 332, and as such, includes a symmetrical opening 336 on the second end wall 326. Accordingly, the coil spring free end 304 may alternatively extend from the second end wall 326 when assembled.

The trailing housing assembly 300 also includes a top extension element 342 defined within the top wall 314 of the housing 310. In the example, the top extension element 342 includes at least one extension arm 344 extending from the top wall 314 and spanning between the first and second walls 320, 322. The extension arm 344 is substantially T-shaped (e.g., dog bone-shaped) having a leg 346 and a cross-member 348. The cross-member 348 includes a top surface 350 that has a detent 352 extending therefrom. The detent 352 is positioned approximately at the midpoint between the first and second walls 320, 322 and as such the detent 352 includes two symmetrical sections 354, 356, each formed in the respective housing member 330, 332.

The top extension element 342 is removably received and engaged by a corresponding bottom receiving element from any other component to facilitate forming the carrier assembly, for example, the carrier assemblies 24a, 24b, and 24c (shown in FIGS. 1E-1G). More specifically, the detent 352 is sized and shaped to receive and engage a corresponding notch, for example, the leading housing assembly notch 178 (shown in FIG. 2E) or the trailing housing assembly notch 364 (shown in FIG. 3C) of the bottom receiving element to enable a more secure component connection as described herein.

Figure 3C:
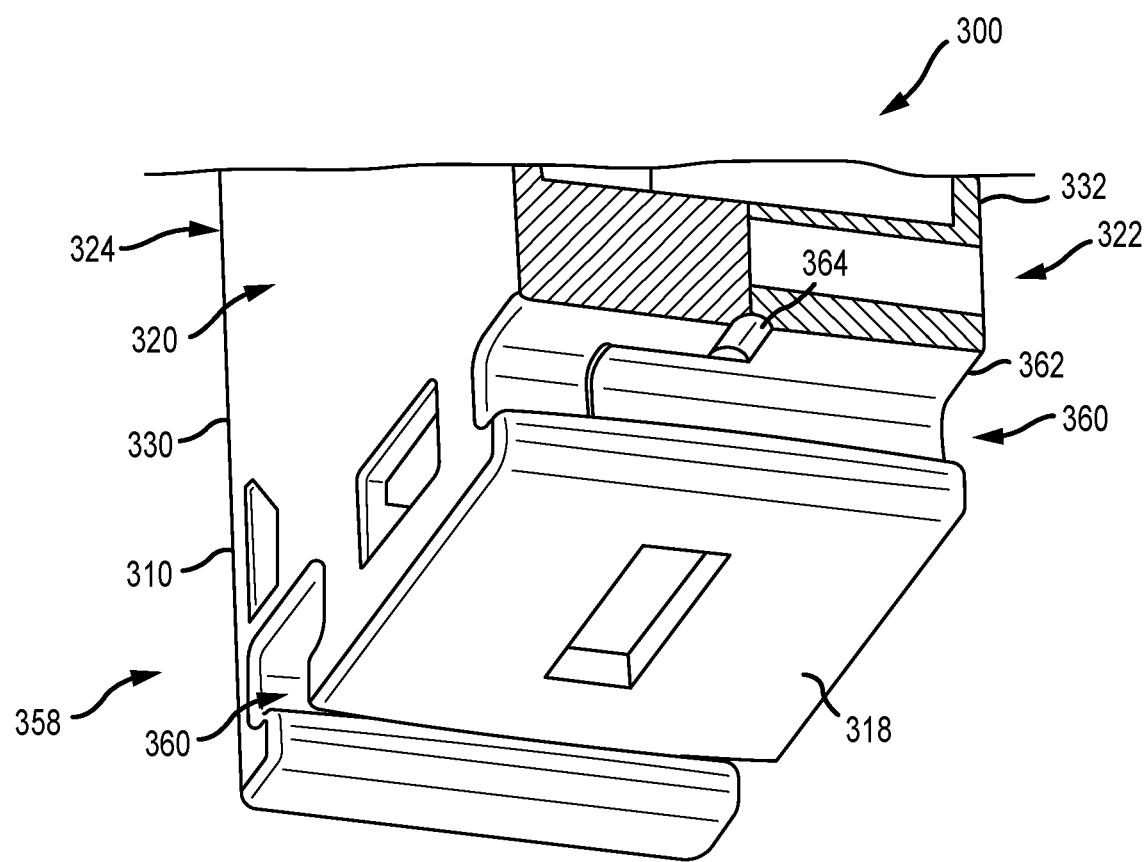
FIG. 3C is a detailed cross-sectional perspective view of the trailing housing assembly.

FIG. 3C is a detailed cross-sectional perspective view of the trailing housing assembly 300. The cross-section is taken along a plane that is substantially parallel to the end wall 324. In the example, a bottom receiving element 358 is defined within the bottom wall 318 of the housing 310. The bottom receiving element 358 includes at least one channel 360 defined in the bottom wall 318 that extends from the first wall 320 to the second wall 322. The channel 360 is substantially T-shaped (e.g., dog bone-shaped) and are defined by an innermost surface 362. The innermost surface 362 includes a notch 364 defined on the surface 362 and positioned approximately at the midpoint between the first and second walls 320, 322. As such, the notch 364 is formed by two symmetrical sections each formed in the respective housing member 330, 332.

The bottom receiving element 358 enables removable receipt and engagement of a corresponding top extension element from any other component to facilitate forming the carrier assembly, for example, the carrier assemblies 24a, 24b, and 24c (shown in FIGS. 1E-1G). More specifically, the notch 364 is sized and shaped to receive and engage a corresponding detent, for example, the shoe assembly detent 526 (shown in FIG. 5A), an adjacent trailing housing assembly detent 352 (shown in FIG. 3A), the adapter detent 816 (shown in FIG. 8), or the extension detent 926 (shown in FIG. 9) on the top extension element to enable a more secure component connection as described herein.

Figure 3D:
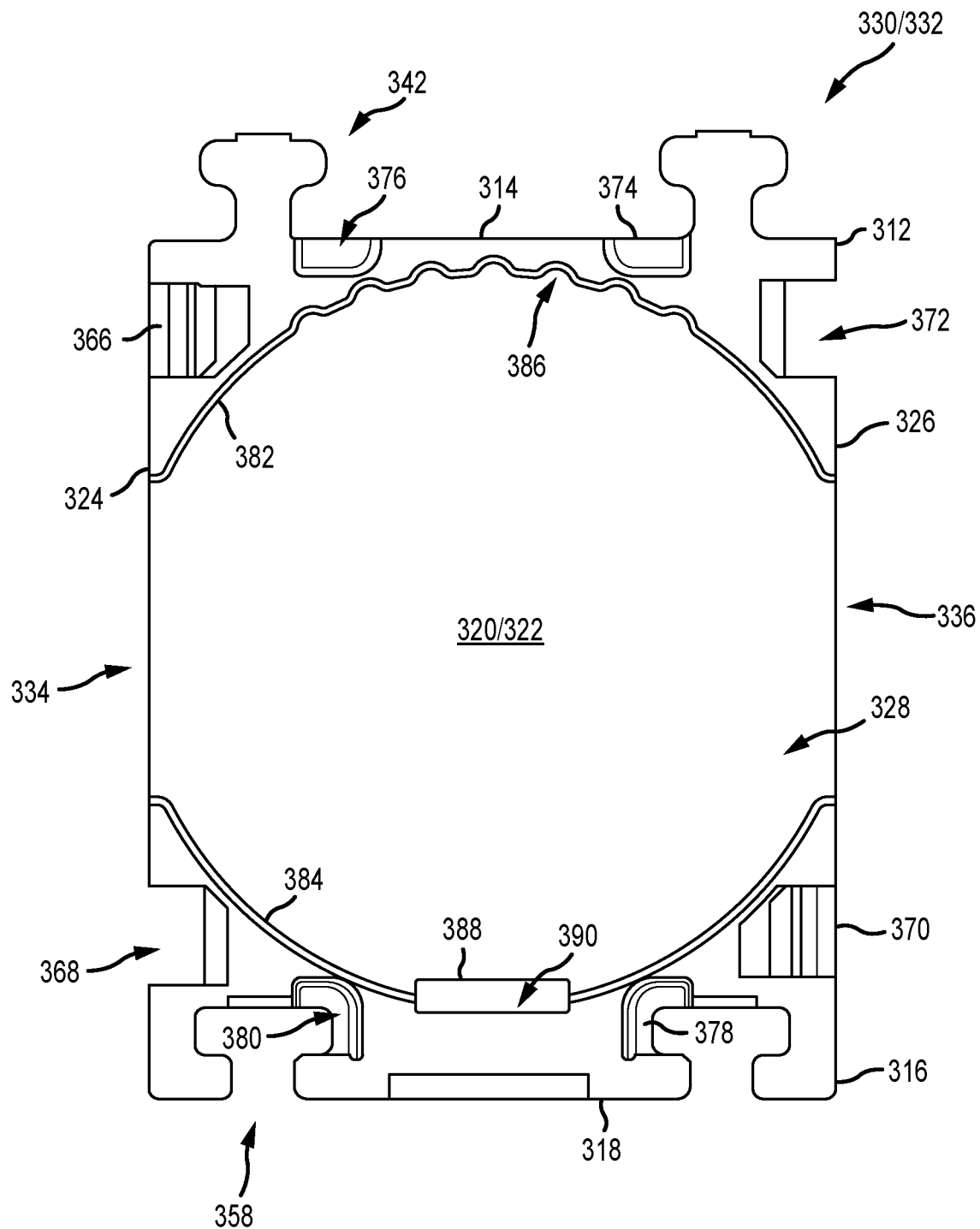
FIG. 3D is an interior view of the trailing housing assembly.

FIG. 3D is an interior view of the trailing housing assembly 300 (shown in FIG. 3A). The housing of the trailing housing assembly is formed from two identical housing members 330, 332 placed back to back and coupled together. As such, each housing member 330, 332 forms half of the top wall 314 including the top extension element 342, half of the bottom wall 318 including the bottom receiving element 358, half of the first end wall 324 including the opening 334, and half of the second end wall 326 including the opening 336. The first end wall 324 includes a first hook extension 366 adjacent the top end 312 and a first recess 368 defined within the first end wall 324 adjacent the bottom end 316. The second end wall 326 includes a second hook extension 370 adjacent the bottom end 316 and a second recess 372 defined within the second end wall 326 adjacent the top end 312. Each hook extension 366, 370 correspond to the opposite recess 368, 372 such that the housing members 330 and 332 may be coupled together. For example, the housing members 330 and 332 may be a snap fit connection via the hook extensions 366, 370 and recesses 368, 372. By using identical housing members, the manufacturing and assembly processes of the window balance system is more efficient. In other examples, however, the housing members may not be identical and one member may include features and/or components not included on the other so as to enable the housing to function as described herein.

Additionally, the top wall 314 further includes a top projection 374 adjacent the second end wall 326 and a top recess 376 defined within the top wall 314 adjacent the first end wall 324, such that when coupling housing members 330 and 332 together opposite projections 378 are received within the recesses 380 and provide a more secure connection. Similarly, the bottom wall 318 further includes a bottom projection 378 adjacent the second end wall 326 and a bottom recess 380 defined within the bottom wall 318 adjacent the first end wall 324. In alternative examples, the housing members 330 and 332 may be coupled together through any other connection configuration that enables the housing 310 to function as described herein. These projections and recesses and hook extensions and recesses are more clearly illustrated in FIG. 3B although the features are not labeled.

The interior cavity 328 that houses the coil spring 302 is defined by an upper annular surface 382 and a lower annular surface 384. The upper annular surface 382 may include a plurality of radially extending recesses 386 that facilitate reducing surface friction of the upper annular surface 382 when the coil spring 302 rotates therein. The lower annular surface 384 may include a debris trap 388 that facilitates removing dirt and debris that may accumulate within the housing 310. The debris trap 388 includes an opening 390 defined in the wall 320, 322 and an angled surface 392 (shown in FIG. 3B) offset from the lower annular surface 384 and positioned at the bottom of the interior cavity 328.

Figure 4A:
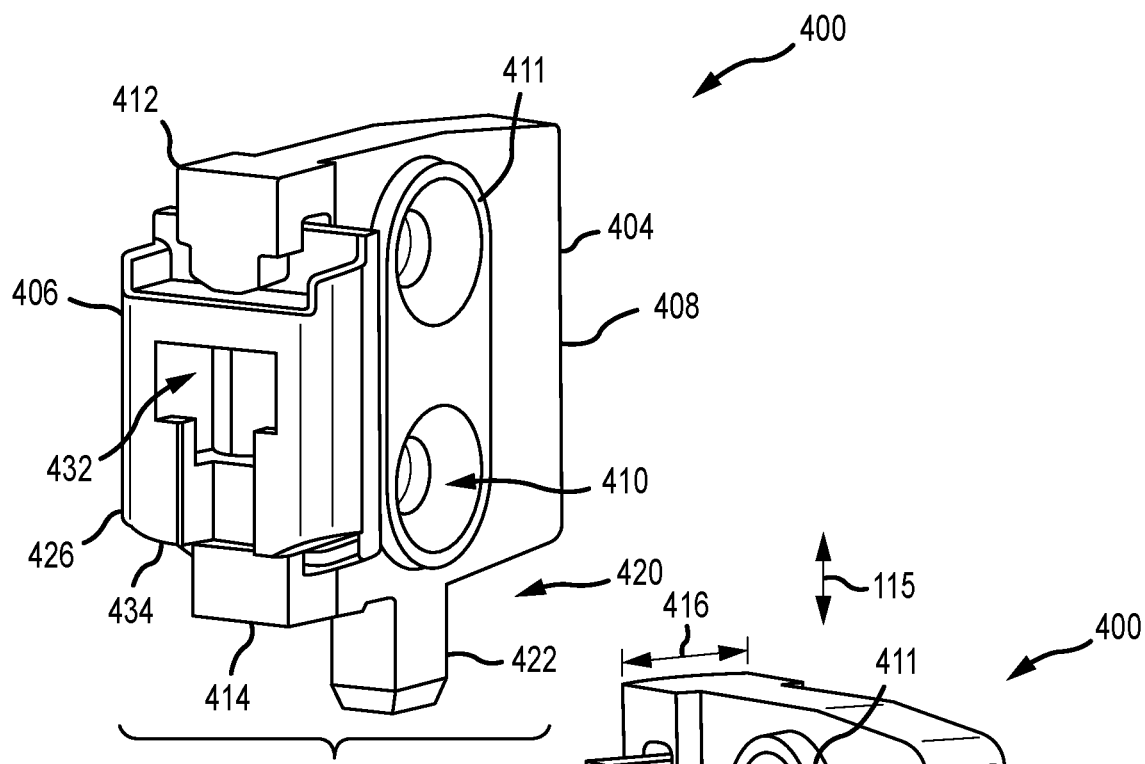
FIGS. 4A and 4B are perspective views of a mounting bracket of the window balance system shown in FIG. 1B.
Figure 4B:
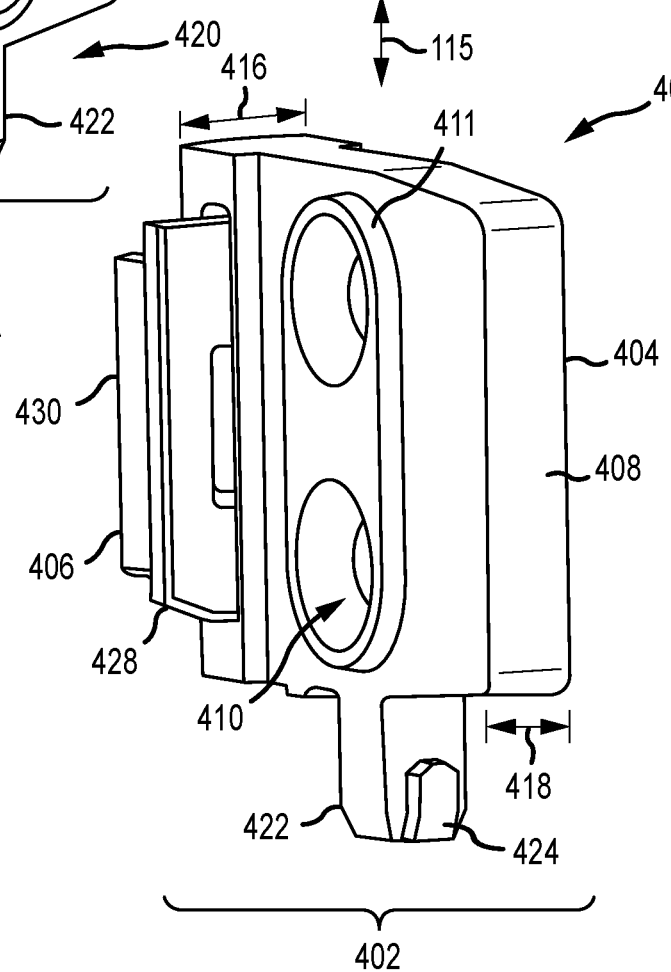

FIGS. 4A and 4B are perspective views of the mounting bracket 400 of the window balance system 20 (shown in FIG. 1B). Referring concurrently to FIGS. 4A and 4B, the mounting bracket 400 is in a shipping configuration 402 that corresponds to the shipping configuration 22 of the window balance system 20 (shown in FIG. 1B). In the example, the mounting bracket 400 includes a jamb mount 404 and a coil spring mount 406. The jamb mount 404 includes a substantially rectangular-shaped body 408 that is symmetrical about the longitudinal direction 115. The body 408 defines at least one aperture 410 surrounded by a raised collar 411 that enables a screw or other fastener element to couple the mounting bracket 400 to a window jamb during installation. In some examples, the apertures 410 may include a countersunk bore to enable use of a flat-head screw type fastener.

On one side of the body 408, the mounting bracket 400 includes a pair of discrete side extension arms 412, 414 for coupling the coil spring mount 406 to the jamb mount 404. The side extension arms 412, 414 receive the coil spring mount 406 and enable the jamb mount 404 to slide in relation to the coil spring mount 406 as described further below. The side extension arms 412, 414 and the collar 411 have a thickness 416 that is greater than a thickness 418 of the rest of the body 408 so that the mounting bracket 400 may be mounted flat to the window jamb when secured thereto.

The jamb mount 404 also includes a bottom extension element 420 that extends from the bottom of the body 408. The bottom extension element 420 includes a bottom extension arm 422 having a detent 424 extending therefrom. The bottom extension element 420 is removably received and engaged by a corresponding top receiving element 153 (shown in FIG. 2C) of the leading housing assembly 100. More specifically, the bottom extension arm 422 and detent 424 are sized and shaped to be received within the leading housing assembly channel 154 and engage the notch 166 (both shown in FIG. 2C) to releasably couple the mounting bracket 400 to the leading housing assembly 100 as described herein.

The coil spring mount 406 includes a body 426 that has a back wall 428 and a cage 430 extending outwards from the back wall 428. The back wall 428 is received by the side extension arms 412, 414 to slideably couple the jamb mount 404 to the coil spring mount 406. The cage 430 includes an opening 432 defined within the body 426 to receive the free end of the leading housing assembly coil spring. In the example, the cage 430 includes a front wall 434 with the opening 432 sized and shaped to correspond to the T-shaped coil spring free end 106 (shown in FIG. 2B). As such, the free end of the coil spring may pass through the opening 432 and be positioned and secured within the cage 430 behind the front wall 434 to couple the coil spring to the mounting bracket 400.

Figure 4C:
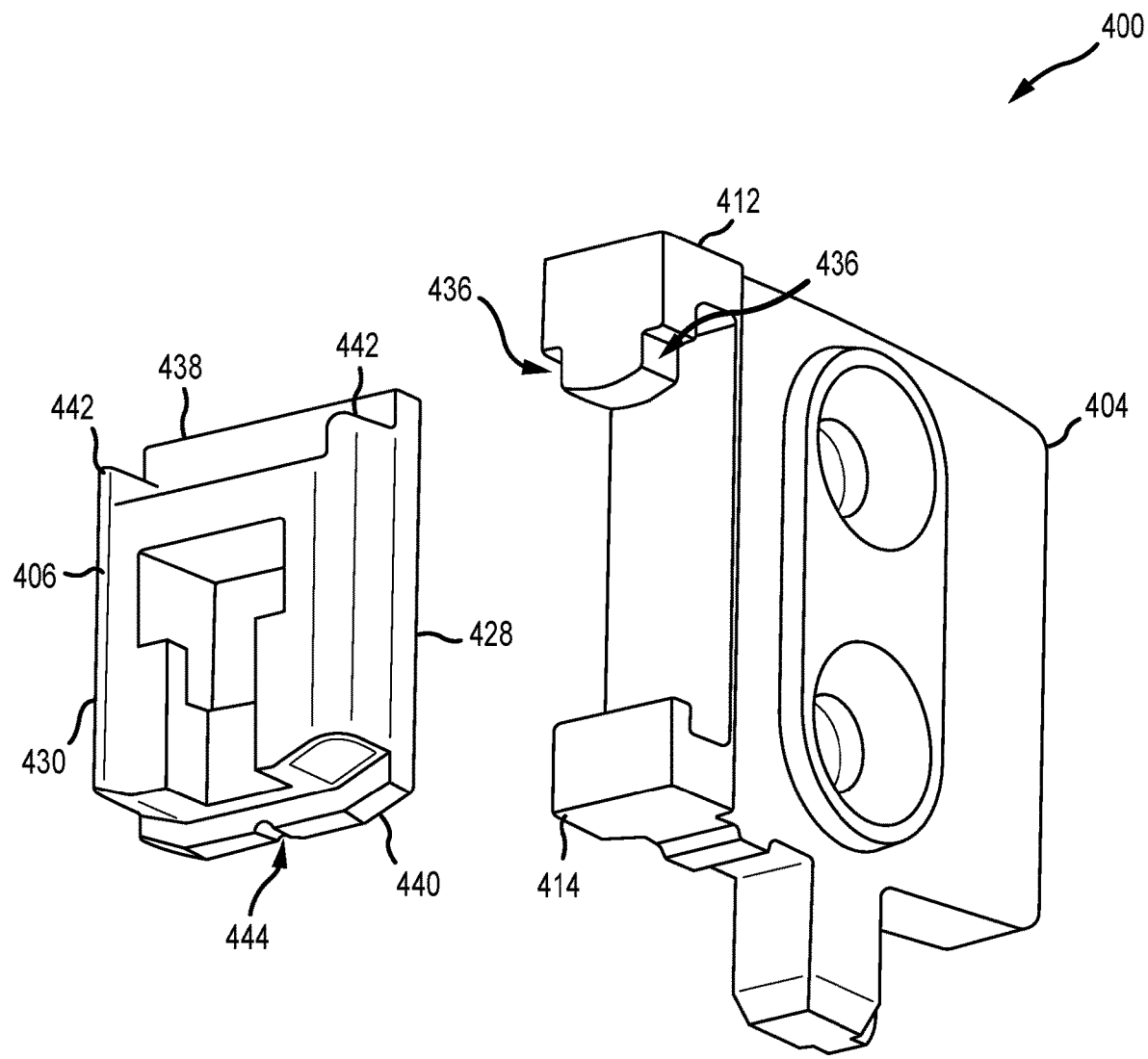
FIG. 4C is an exploded view of the mounting bracket.

FIG. 4C is an exploded view of the mounting bracket 400. In the example, the top side extension arm 412 enables receipt of a top end 438 of the back wall 428 and the bottom side extension arm 414 enables receipt of a bottom end 440 of the back wall 428 such that the jamb mount 404 is slideably moveable with respect to the coil spring mount 406 as discussed further below. Two opposing recesses 436 are defined on the free end of the top side extension arm 412 and two sidewall extensions 442 are defined on the coil spring mount 406 that are receivable within the top side extension arm recesses 436 during the sliding movement of the jamb mount 404. The bottom end 440 includes a notch 444 defined therein and positioned at approximately the midpoint of the back wall 428. The notch 444 enable receipt and engagement of a corresponding detent 446 (shown in FIG. 4G) that extends from the bottom side extension arm 414. The notch 444 and detent 446 enable the jamb mount 404 and coil spring mount 406 to be secured in the shipping configuration 402 (shown in FIGS. 4A and 4B).

Figure 4E:
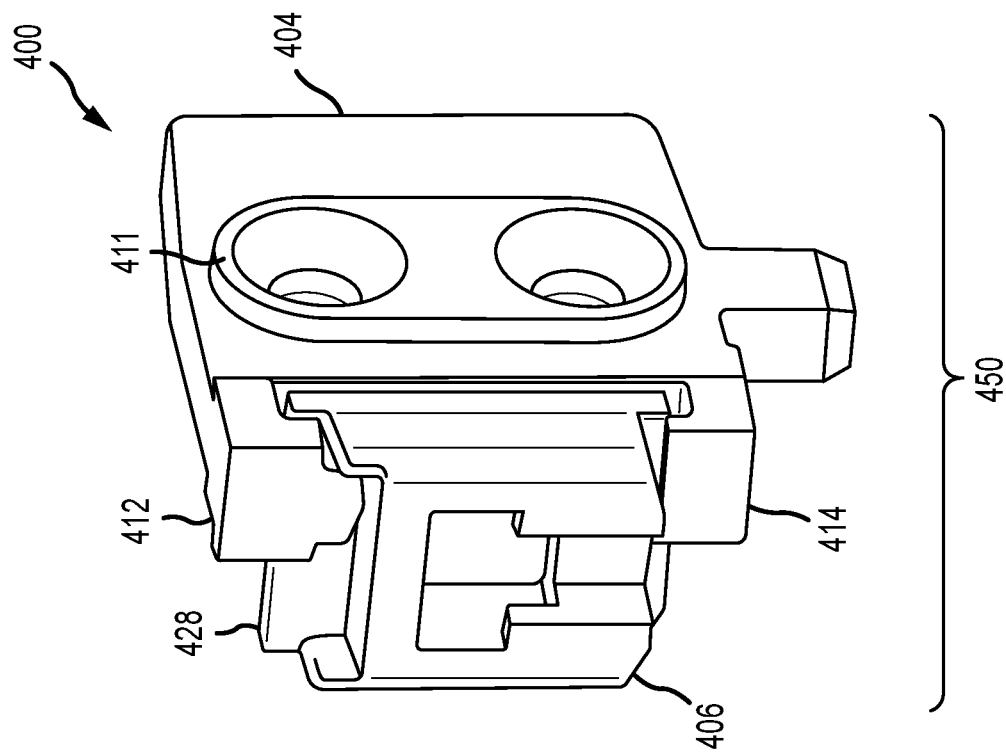
FIGS. 4D and 4E are perspective views of the mounting bracket in a first and second installed configuration, respectively.
Figure 4D:
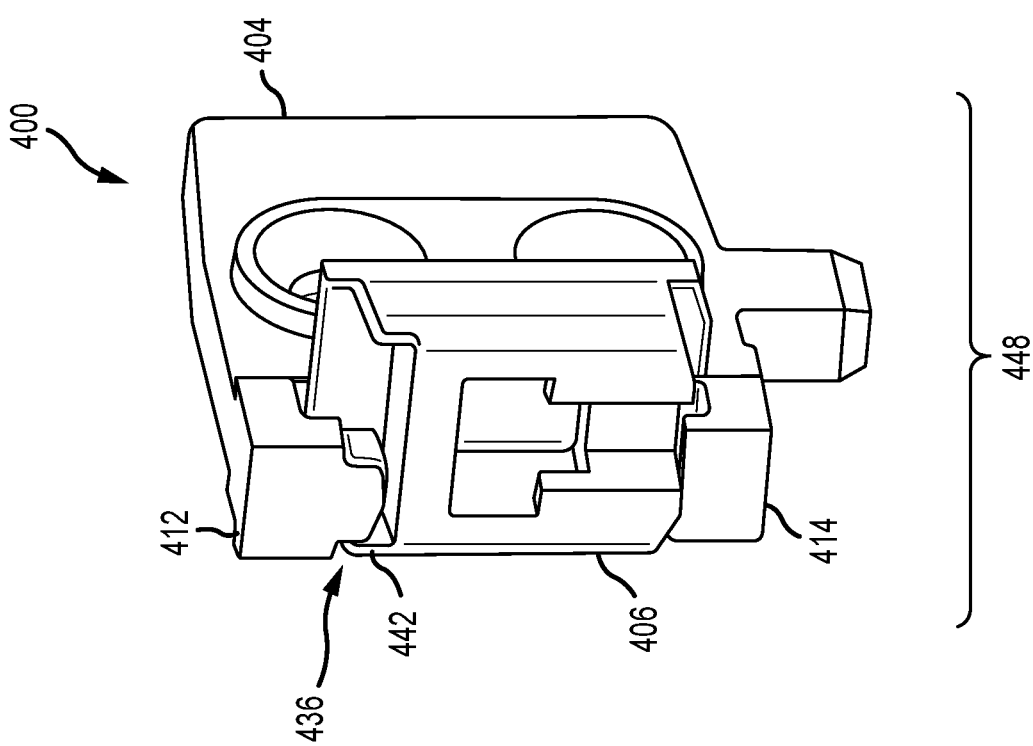

FIGS. 4D and 4E are perspective views of the mounting bracket 400 in a first installed configuration 448 and second installed configuration 450, respectively. Referring concurrently to FIGS. 4D and 4E, the window balance system 20 is typically shipped in the shipping configuration 22 (shown in FIG. 1B) with the mounting bracket 400 in the shipping configuration 402 (shown in FIG. 4A) and having the jamb mount 404 coupled to the leading housing assembly 100 and centered with respect to the coil spring mount 406. With the jamb mount 404 centered with respect to the coil spring mount 406, the window balance system may be easily installed in either the right or left window jamb. That is, either wall 120, 122 of the leading housing assembly 100 (shown in FIG. 2A) may be positioned adjacent to the back wall of the window jamb because the jamb mount 404 may slideably move in either direction towards the jamb and move into the installed configurations 448, 450.

To mount the jamb mount 404 flat to the window jamb, the jamb mount 404 slideably moves with respect to the coil spring mount 406 to either the first or the second installed configuration 448, 450, while maintaining the position of the leading coil spring. By maintaining the position of the leading coil spring, the performance of the window balance system increases because the free end of the coil spring does not twist. In both the first and second installed positions 448, 450, the jamb mount 404 slides to the outer end of the coil spring mount 406 such that the sidewall extension 442 is received within the recess 436. As such, the coil spring mount 406 is flush with the side extension arms 412, 414 providing a flat mounting surface along with the collar 411 on the window jamb.

Figure 4F:
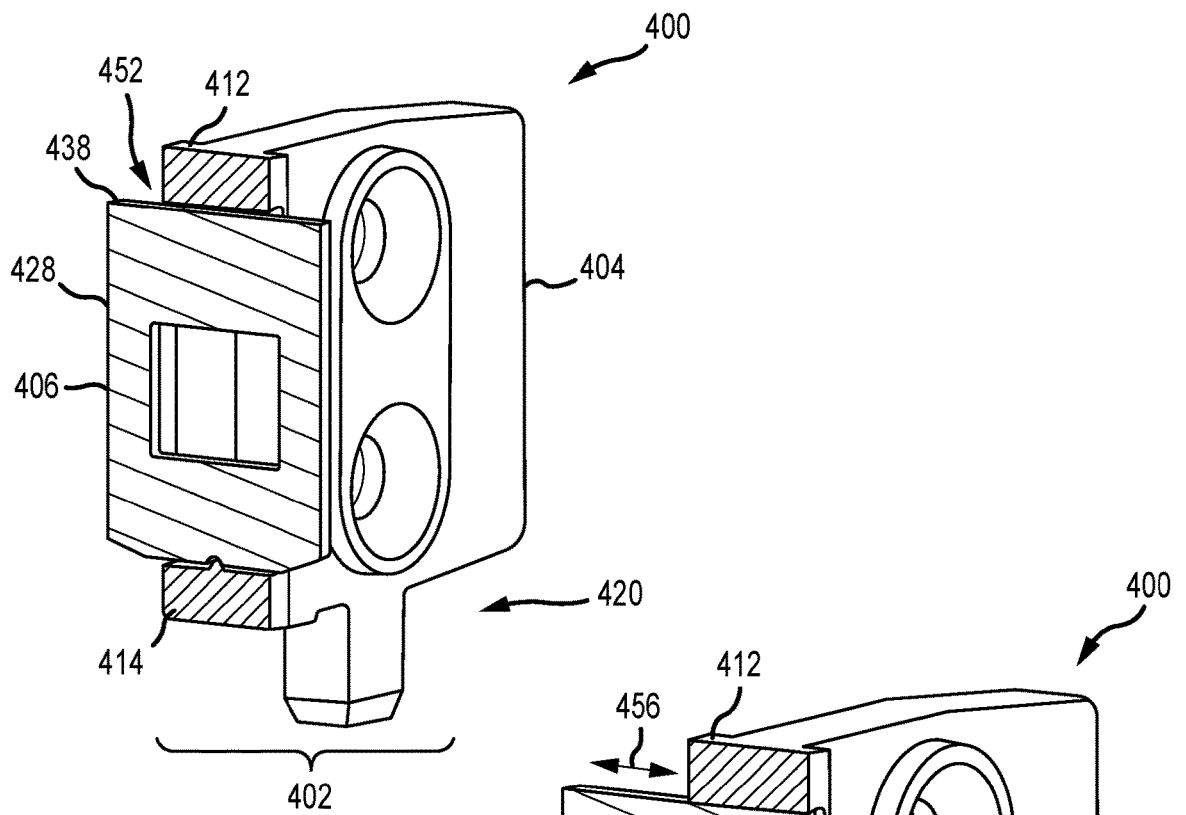
FIGS. 4F and 4G are cross-sectional views of the mounting bracket in a shipping configuration and the second installed configuration, respectively.
Figure 4G:
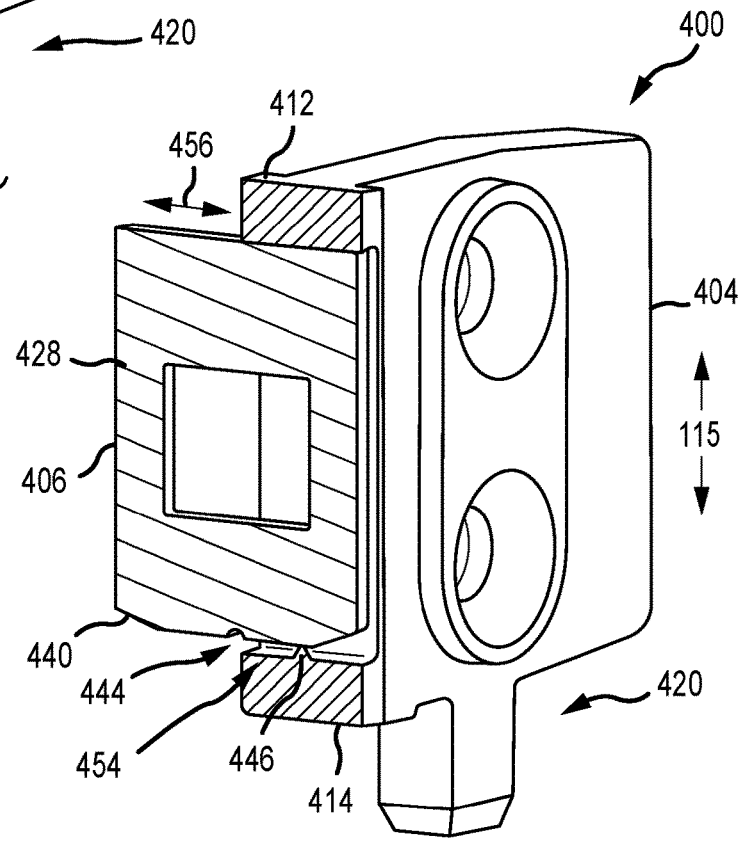

FIGS. 4F and 4G are cross-sectional views of the mounting bracket 400 in the shipping configuration 402 and the second installed configuration 450, respectively. The cross-section is taken along a plane that is substantially parallel to the back wall 428 of the coil spring mount 406. Referring concurrently to FIGS. 4F and 4G, in the shipping configuration 402, the jamb mount 404 is centered with respect to the coil spring mount 406 and the notch 444 receives and engages the detent 446 such that a gap 452 is formed between the top end 438 and top side extension arm 412. When the mounting bracket 400 moves into the second installed configuration 450 (or similarly the first installed configuration) during installation of the window balance system to the window jamb, the jamb mount 404 moves slightly downward in the longitudinal direction 115. As such, the detent 446 disengages from the notch 444 and a gap 454 is formed between the bottom end 440 and the bottom side extension arm 414. Once the detent 446 is disengaged, the jamb mount 404 is slideable in a direction 456 into the second installed position 450. The jamb mount 404 may also similarly slide along direction 456 into the first installed position 448 (shown in FIG. 4D) depending on the position of window balance system within the window jamb. In addition, as the jamb mount 404 moves in a downward direction the bottom extension element 420 also decouples from the leading housing assembly as described further below.

Figure 4H:
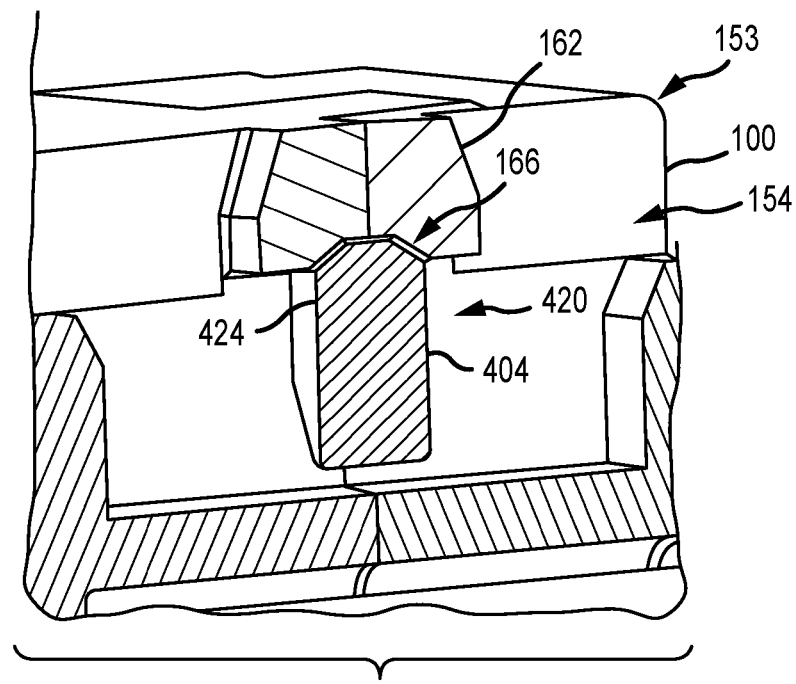
FIGS. 4H and 4I are detailed cross-sectional views of the leading housing assembly and the mounting bracket in the shipping configuration and the second installed configuration respectively.
Figure 4I:
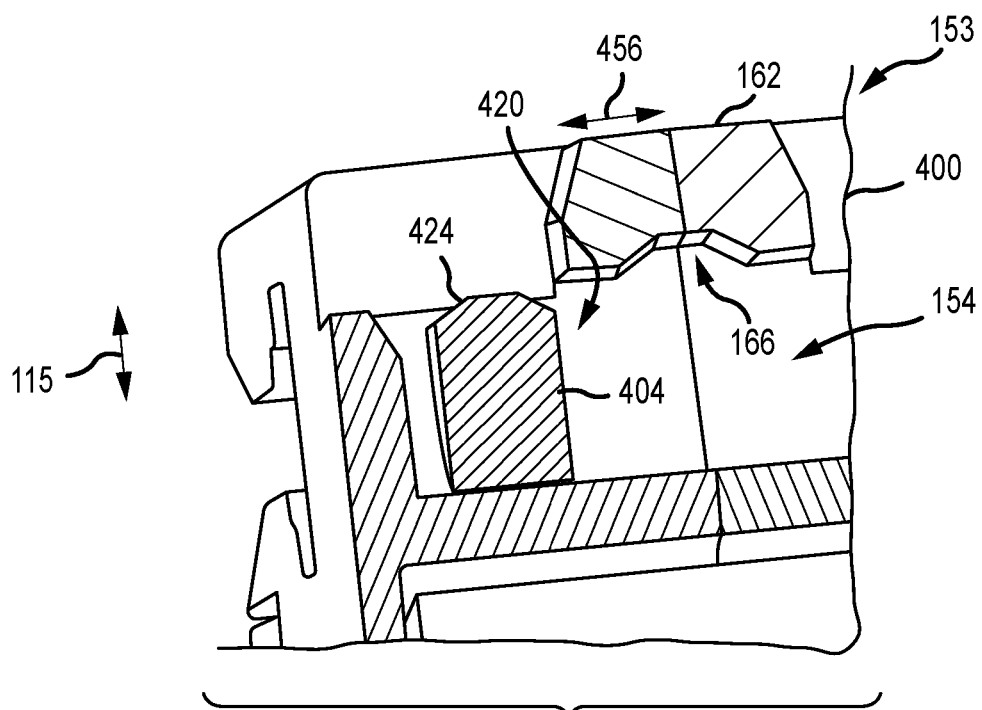

FIGS. 4H and 4I are detailed cross-sectional views of the leading housing assembly 100 and mounting bracket 400 in the shipping configuration 22, 402 and the second installed configuration 28, 450, respectively. The cross-section is taken along a plane that is substantially parallel to the end walls 124, 126 (shown in FIG. 2A) of the leading housing assembly 100. Referring concurrently to FIGS. 4H and 4I, in the shipping configuration 22, 402, the jamb mount 404 is centered with respect to the leading housing assembly 100 and the bottom extension element 420 is coupled to the leading housing assembly top receiving element 153. More specifically, the detent 424 is received and engaged with the projection notch 166. As the mounting bracket 400 is moved into the installed configuration 28, 450, the jamb mount 404 moves slightly downward in the longitudinal direction 115 and the detent 424 disengages from the notch 166. The jamb mount 404 is then free to slide along direction 456 and the detent 424 may move within the channel 154 for the mounting bracket 400 to disengage from the leading housing assembly 100. The jamb mount 404 may also similarly slide along direction 456 into the first installed configuration 448 of the mounting bracket 400 (shown in FIG. 4D) depending on the position of window balance system within the window jamb. The movement between the mounting bracket 400 and the leading housing assembly 100 may be from one or both of the components sliding, pivoting, twisting, or a combination of two or more of these motions relative one another.

Cooperation between the notch 444 and the detent 446 (shown in FIGS. 4F and 4G) and the notch 166 and the detent 424 (shown in FIGS. 4H and 4I) enables the window balance system to decrease undesirable uncoupling and disengagement between the mounting bracket 400 and the leading housing assembly 100 while in the shipping configuration 22, 402. However, during installation of the window balance system onto the window jamb, the notch 444 and detent 446 and the notch 166 and detent 424 enables efficient disengagement and decoupling between the mounting bracket 400 and the leading housing assembly 100 for window sash use. By including the notch/detent connections, undesirable component disconnection is reduced, for example, during shipment and/or installation of the window balance system. In an example, the notch/detent connection enables a more automated installation process, where an automated arm can pick up the window balance system at one pick up point without other components being disconnected.

Figure 5A:
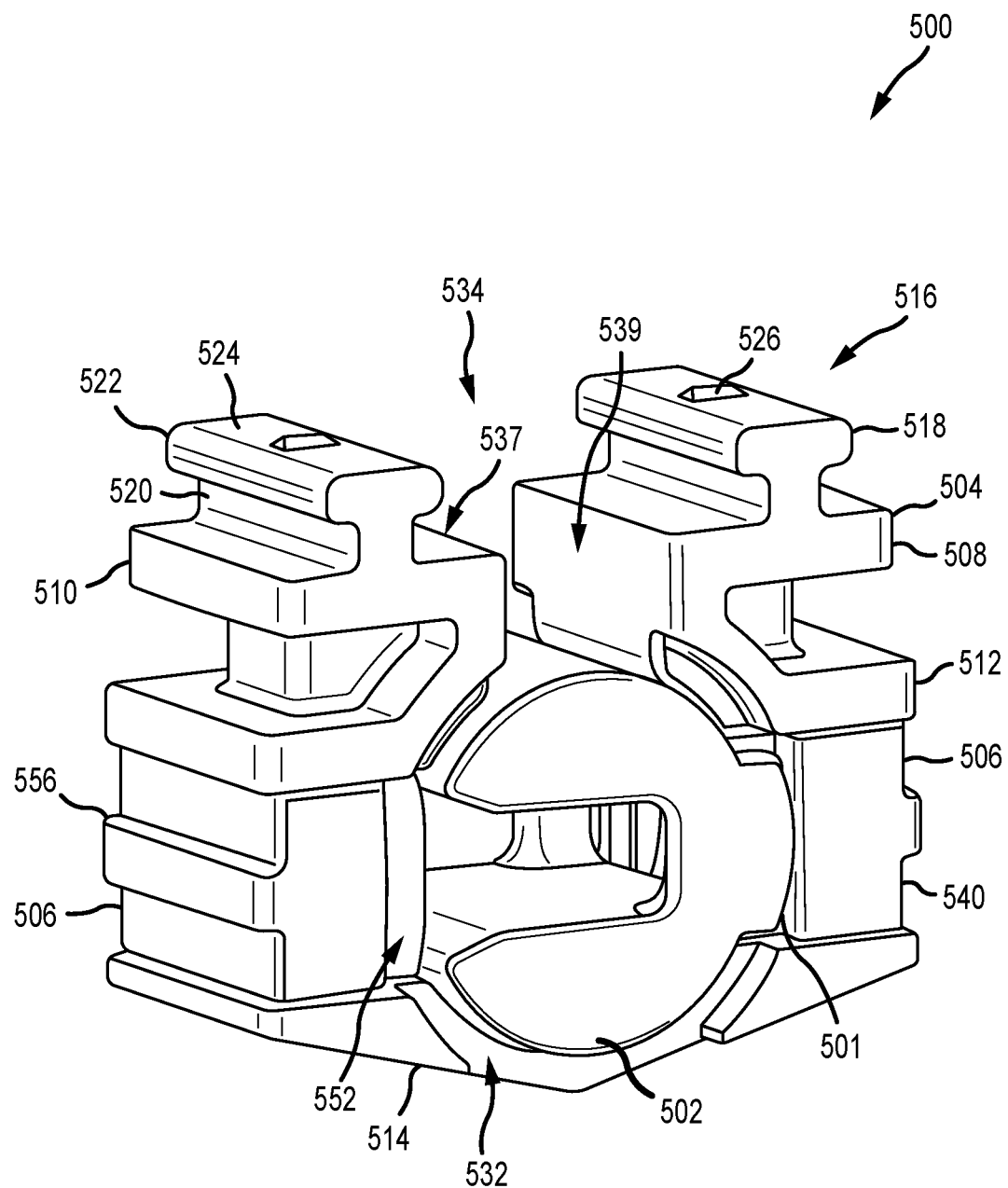
FIG. 5A is a perspective view of a shoe assembly of the window balance system shown in FIG. 1B.
Figure 5B:
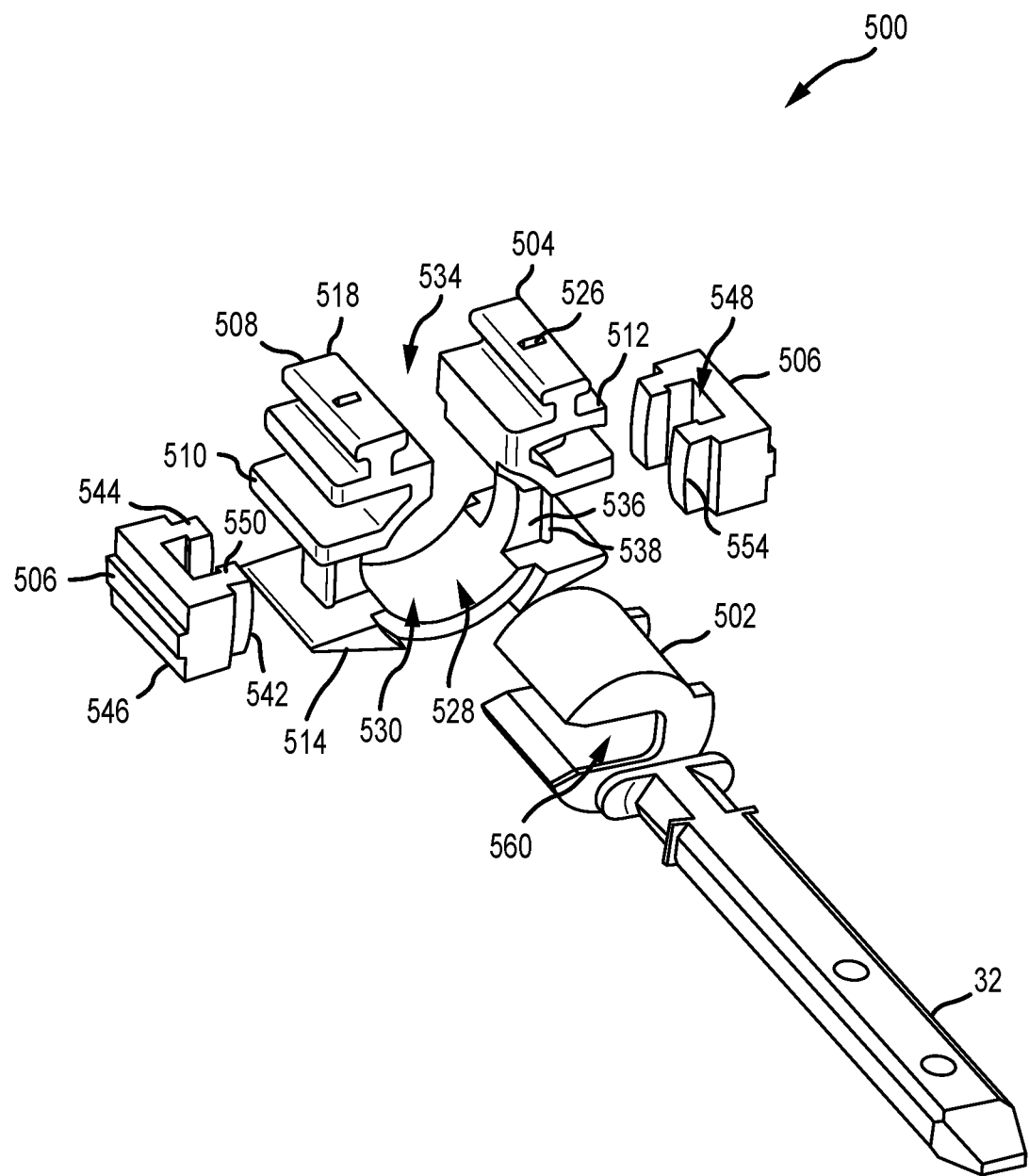
FIG. 5B is an exploded view of the shoe assembly.
Figure 5C:
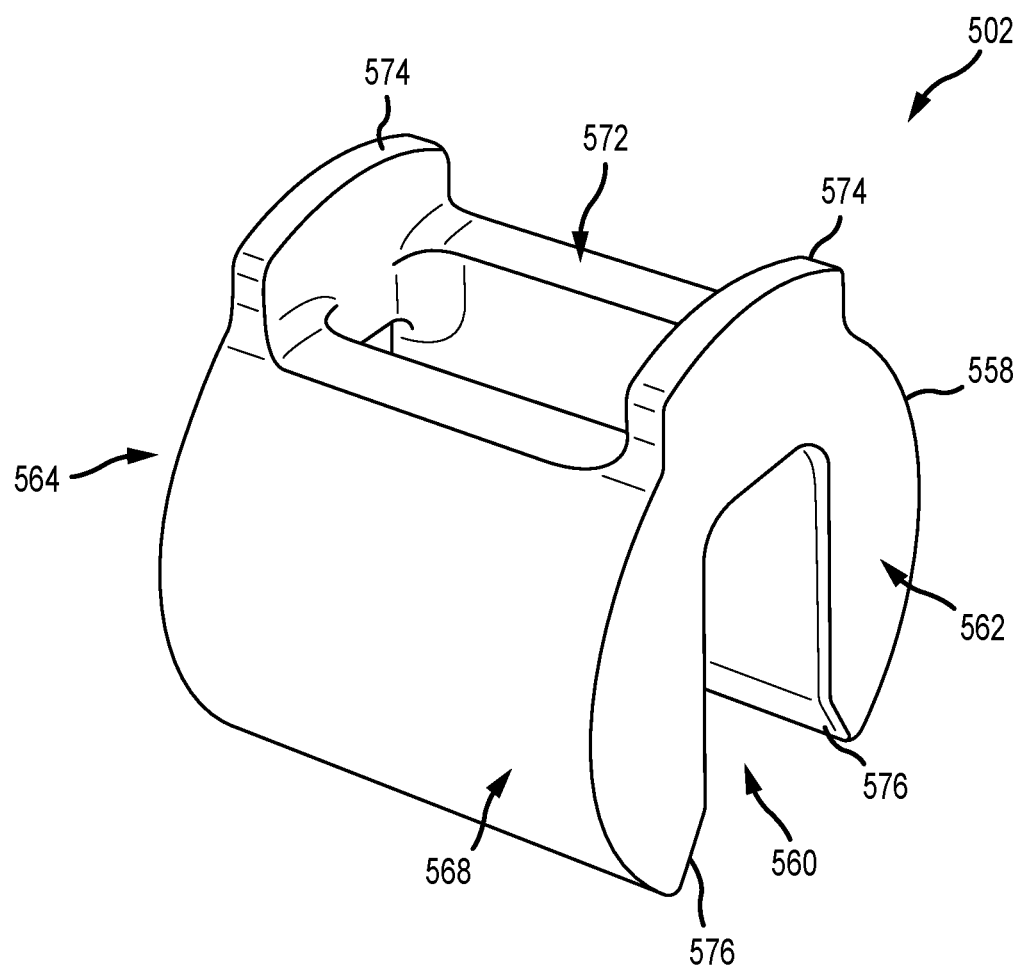
FIG. 5C is a perspective view of a cam.

FIG. 5A is a perspective view of the shoe assembly 500 of the window balance system 20 (shown in FIG. 1B). FIG. 5B is an exploded view of the shoe assembly 500. FIG. 5C is perspective view of a cam 502 of the shoe assembly 500. Referring concurrently to FIGS. 5A-5C, the shoe assembly 500 includes the rotatable cam 502, a housing 504, and at least one brake 506. The rotatable cam 502 and the at least one brake 506 form a lock system 501 that enables the shoe assembly 500 to engage with the window jamb when the window sash is tilted. The housing 504 includes a substantially U-shaped body 508 having two legs 510, 512 and a bottom member 514 extending therebetween. The housing 504 also includes a top extension element 516 that extends from the top of each leg 510, 512. The top extension element 516 includes at least one extension arm 518 extending from the top of the legs 510, 512. The extension arm 518 is substantially T-shaped (e.g., dog bone-shaped) having a leg 520 and a cross-member 522. The cross-member 522 includes a top surface 524 that has a detent 526 positioned approximately at the midpoint along the top surface 524 and extending therefrom.

The top extension element 516 is removably received and engaged by a corresponding bottom receiving element from any other component to facilitate forming the carrier assembly, for example, the carrier assemblies 24, 24*a*, 24*b*, and 24*c* (shown in FIGS. 1B and 1E-1G). More specifically, the detent 526 is sized and shaped to receive and engage a corresponding notch, for example, the leading housing assembly notch 178 (shown in FIG. 2E), the trailing housing assembly notch 364 (shown in FIG. 3C), the adapter notch (shown in FIG. 8) or the extension notch (shown in FIG. 9)

of the bottom receiving element to enable a more secure component connection as described herein.

The housing 504 defines a cam opening 528 between the legs 510, 512 and terminating at the bottom member 514. The cam opening 528 includes an annular surface 530 that corresponds to the shape of the cam 502 such that the housing 504 may receive the cam 502 and enable the cam 502 to rotate therein. At least partially surrounding the cam opening 528, an annular cam recess 532 is defined on each side of the body 508. Between the housing legs 510, 512, a top opening 534 is defined between two opposing substantially parallel surfaces 537, 539. As such, the cam 502 may be coupled to the housing 504 by sliding the cam 502 through the top opening 534 between the leg surfaces 537, 539 and into the cam opening 528. In the example, each housing leg 510, 512 is sufficiently resilient such that they may deflect outwards to facilitate insertion of the cam 502 along an axial direction 535 (shown in FIG. 5D). Additionally, the leg surfaces 537, 539 are substantially flat and free of any protrusions to enable easy insertion of the cam 502. Each housing leg 510, 512 includes a brake receiving section 536 having a smaller thickness adjacent to the bottom member 514 to enable the brakes 506 to be coupled to the housing 504. The brake receiving section 536 includes a flange 538 opposite the cam opening 528 to slideably retain each brake 506 within the housing 504.

The brake 506 includes a substantially U-shaped body 540 having two legs 542, 544 extending from a side member 546. The body 540 defines a housing opening 548 between the legs 542, 544 and side member 546. The housing opening 548 enables the brake 506 to be coupled to the housing 504 at each brake receiving section 536. As such, each leg 542, 544 includes an inward projection 550 extending into the housing opening 548 that may engage with the brake receiving section flange 538 to secure the brake 506 to the housing 504. Each leg 542, 544 also includes a cam recess 552 defined on the exterior of the leg 542, 544 and a brake cam surface 554 at the free end of each leg 542, 544. The side member 546 may include a filet 556 that extends the length of the brake 506, which increases the frictional hold of the brake 506 within the window jamb. In other examples, the side member 546 may only have a substantially flat braking surface and without the filet 556.

Referring now to FIG. 5C and with continued reference to FIGS. 5A and 5B, the cam 502 includes a substantially cylindrical body 558 having a keyhole 560 defined therein and extending from a first end 562 to a second end 564. The keyhole 560 is sized and shaped to receive a portion of the pivot bar 32 that extends from the window sash. The body 558 includes an outer cam surface 568 that defines the perimeter thereof. The outer cam surface 568 may be engage with the brake cam surface 554 such that rotation of the cam 502 slides the brakes 506 outward to a locked position 578 (shown in FIG. 5D). The body 558 also includes a flat surface 572 extending along the length of the cam 502 and bounded by two cam flanges 574 extending outward adjacent each end 562, 564. The cam flanges 574 enable the cam 502 to be retained in the housing 504 and do not interfere with the brakes 506 when the cam 502 rotates. The keyhole 560 may further be defined by two opposing oblique surfaces 576 adjacent the outer cam surface 568, which help guide the pivot bar 32 into the keyhole 560 from the top opening 534 of the shoe housing 504.

FIGS. 5D and 5E are front views of the shoe assembly 500 in a locked position 578 and an unlocked position 580, respectively. In the locked position 578, the keyhole 560 is in communication with the housing top opening 534 such that the pivot bar may be inserted and/or removed from the shoe assembly 500. When the cam 502 is in the locked position 578, the outer cam surface 568 is rotated adjacent to and engages with the brake cam surfaces 554 to extend 582 the brakes 506 outward from the housing 504 to contact the window jamb. This holds the carrier assembly 24 in place against the jamb side walls 38 (shown in FIG. 1D) and restricts movement within the window jamb. By engaging both legs of the brake 506, the shoe assembly 500 engages both ends of the side member of the brake 506 for an increased hold within the window jamb. In the locked position 578, the cam flanges 574 are within the annular cam recess of the housing 504 to prevent the cam 502 from sliding out of the cam opening in a substantially perpendicular direction. Additionally, the cam oblique surfaces 576 align with the housing 504 so as to assist in channeling the pivot bar into the keyhole 560 along the axial direction 535.

When the cam 502 is rotated into the unlocked position 580, the outer cam surface 568 rotates away from and disengages with the brake cam surfaces 554 enabling the brakes 506 to retract 584 into the housing 504 and disengaging the window jamb, allowing the carrier assembly to vertically within the window jamb. As the cam 502 rotates, the keyhole 560 and the flat surface of the cam 502 is positioned adjacent to the brakes 506 such that the brakes 506 may move inwards with respect to the housing 504. In the unlocked position 580, the cam flanges 574 are within the cam recess 552 of the brake 506 to prevent the cam 502 from sliding out of the cam opening in a substantially perpendicular direction. In the example, the cam 502 may rotate in either direction within the housing 504, and as such enable the carrier assembly 24 to be installed in either side of the window jamb as described herein.

Figure 6:
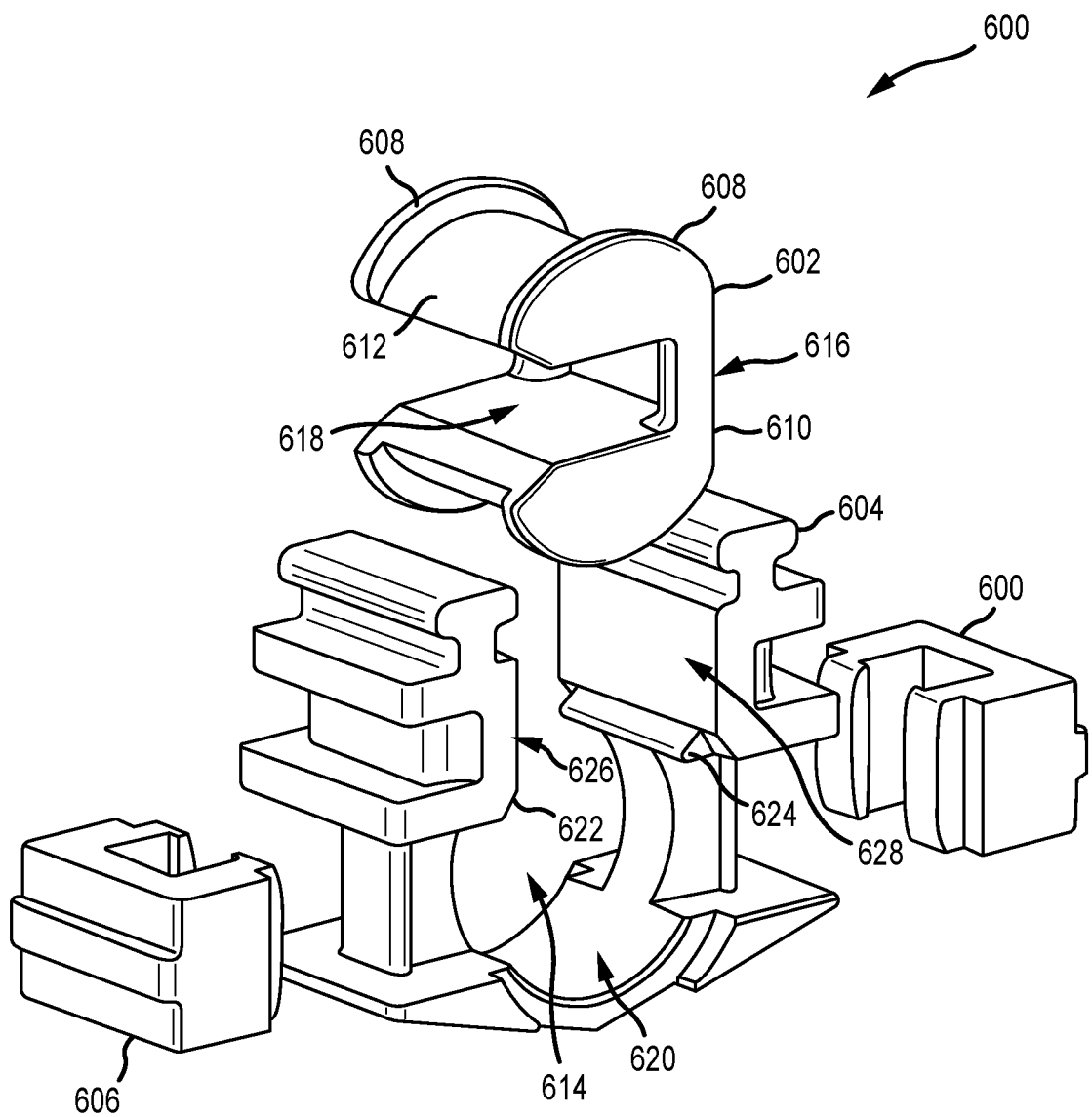
FIG. 6 is an exploded view of another shoe assembly that may be used with the window balance system shown in FIG. 1B.

FIG. 6 is an exploded view of another shoe assembly 600 that may be used with the window balance system 20 (shown in FIG. 1B). The shoe assembly 600 includes a rotatable cam 602, a housing 604, and at least one brake 606. The shoe assembly 600 may receive the pivot bar such that as the window sash tilts from the window jamb, the pivot bar rotates and engages the cam 602. Upon rotation of the cam 602, the brakes 606 extend from the housing 604 and lock the shoe assembly 600 within the window jamb as described in detail above. However, in this example, a cam flange 608 extends from the cylindrical body 610 along substantially the entire perimeter of the cam surface 612, and as such, further reduces the possibility that the cam 602 slides out of a cam opening 614 defined in the housing 604 because the cam flange 608 extends for a longer distance. In this example, the cam flange 608 may extend along both the cam surface 612 and a flat surface 616 opposite a keyhole 618. In other examples, the cam flange 608 may only extend along the cam surface 612. Additionally, as with the example of FIGS. 5A-5E, the cam flange 608 does not interfere with the brake 606 when actuated by the pivot bar.

Furthermore, in this example, the cam opening 614 is defined by an annular surface 620 that includes two opposing projections 622, 624 on each housing leg, respectively. The projections 622, 624 are positioned at the end of leg surfaces 626, 628 upon which the cam 602 slides along when being inserted into the housing 604, as described above. The projections 622, 624 extend away from the surfaces 626, 628 to provide housing structure that retains the cam 602 within the cam opening 614. In some examples, the projections 622, 324 may be angled to facilitate channeling the pivot bar towards the keyhole 618 of the cam 602.

Figure 7:
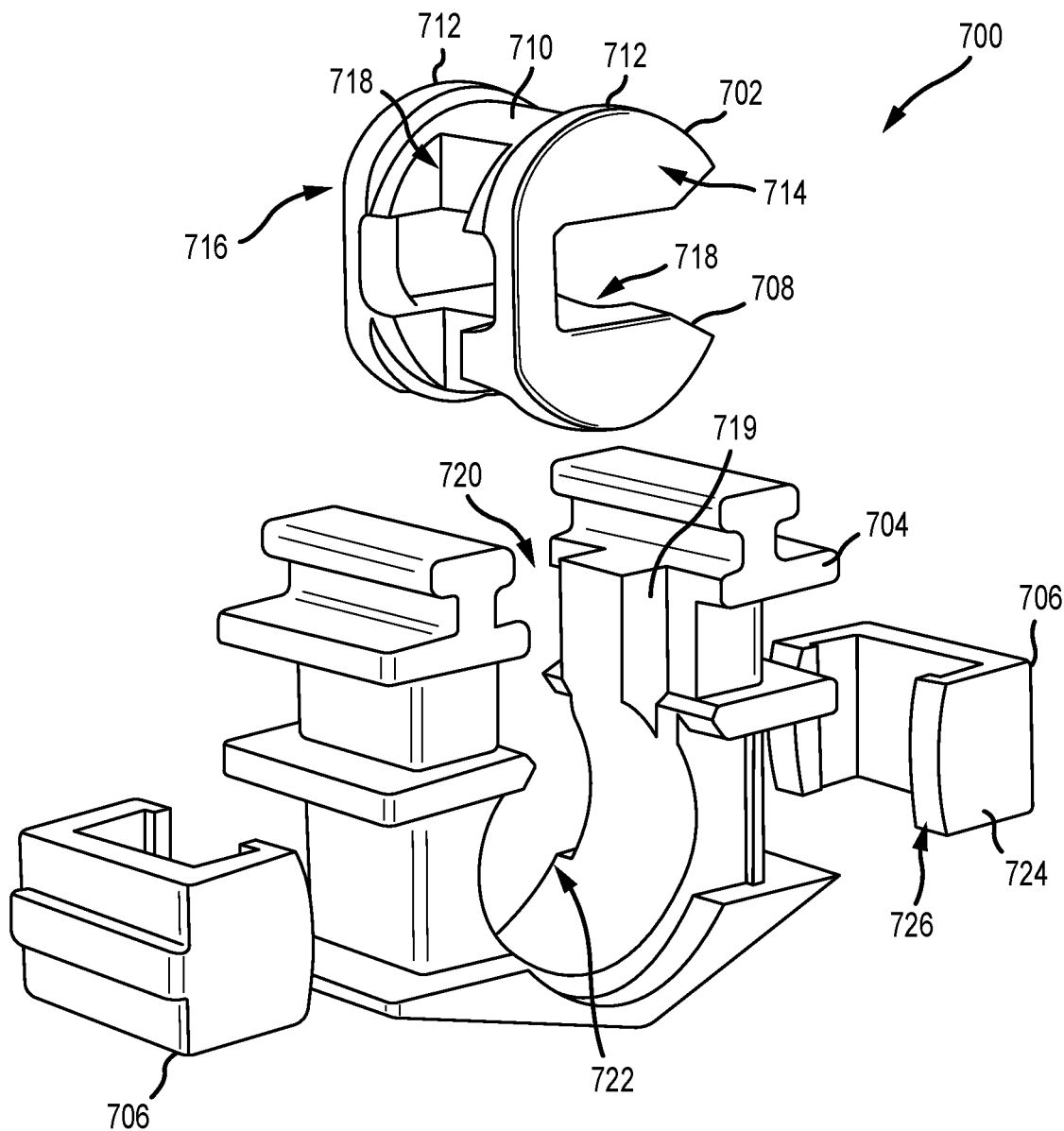
FIG. 7 is an exploded view of another shoe assembly that may be used with the window balance system shown in FIG. 1B.

FIG. 7 is an exploded view of another shoe assembly 700 that may be used with the window balance system 20 (shown in FIG. 1B). The shoe assembly 700 includes a rotatable cam 702, a housing 704, and at least one brake 706. The shoe assembly 700 may receive the pivot bar such that as the window sash tilts from the window jamb, the pivot bar rotates and engages the cam 702. Upon rotation of the cam 702, the brakes 706 extend from the housing 704 and lock the shoe assembly 700 within the window jamb as described in detail above. However, in this example, a cam body 708 is substantially cylindrical and has an outer surface 710. A cam flange 712 extends outward from the outer surface 710 at each end 714, 716 of the body 708. The body 708 further includes recesses 718 defined therein to enable the cam 702 to pass through housing projections 719 of the housing legs that extend into a top opening 720 of the housing 704 and the cam 702 to be received in a cam opening 722. As the cam flange 712 extends from the cylindrical cam body 708, a brake leg 724 of the brake 706 includes a cam surface 726 without any recesses, because the cam flange 712 enables direct actuation of the brakes 706. By including the cam flange 712, the possibility that the cam 702 sides out of the cam opening is reduced.

Figure 8:
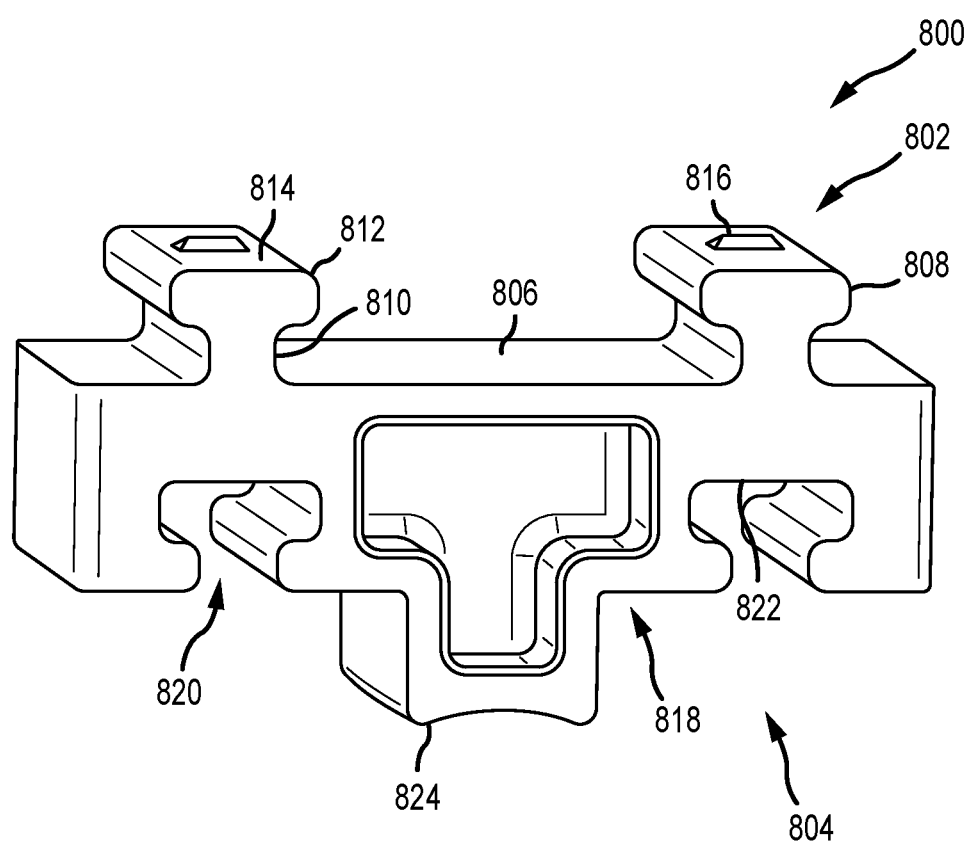
FIG. 8 is a perspective view of an adapter of the window balance system shown in FIG. 1B.

FIG. 8 is a perspective view of an adapter 800 that may be used with the window balance system 20 (shown in FIG. 1B). The adapter 800 includes a top extension element 802 and a bottom receiving element 804. The top extension element 802 is defined on a top wall 806 of the adapter 800. The top extension element 802 includes at least one arm 808 extending from the top wall 806. The arm 808 is substantially T-shaped (e.g., dog bone-shaped) having a leg 810 and a cross-member 812. The cross-member 812 includes a top surface 814 that may have a detent 816 extending therefrom.

The top extension element 802 is removably received and engaged by a corresponding bottom receiving element from any other component to facilitate forming the carrier assembly, for example, the carrier assemblies 24, 24a, 24b, and 24c (shown in FIGS. 1B and 1E-1G). More specifically, the detent 816 is sized and shaped to receive and engage a corresponding notch, for example, the leading housing assembly notch 178 (shown in FIG. 2E) or the trailing housing assembly notch 364 (shown in FIG. 3C) of the bottom receiving element to enable a more secure component connection as described herein.

The bottom receiving element 804 is defined in a bottom wall 818 of the adapter 800. The bottom receiving element 804 includes at least one channel 820 defined in the bottom wall 818 that is substantially T-shaped (e.g., dog bone-shaped) and defined by an innermost surface 822. The innermost surface 822 may include a notch (not shown) defined therein.

The bottom receiving element 804 enables removable receipt and engagement of a corresponding top extension element from any other component to facilitate forming the carrier assembly, for example, the carrier assemblies 24, 24a, 24b, and 24c (shown in FIGS. 1B and 1E-1G). More specifically, the notch is sized and shaped to receive and engage a corresponding detent, for example, the shoe assembly detent 526 (shown in FIG. 5A) or an adjacent trailing housing assembly detent 352 (shown in FIG. 3A) on the top extension element to enable a more secure component connection as described herein.

The adapter 800 may be coupled between the trailing housing assembly 300 and the shoe assembly 500 to extend the height of the trailing housing assembly 300. As discussed above in FIG. 1E, the height 306 of the trailing housing assembly 300 is less than the height 112 of the leading housing assembly 100. The adapter 800 is used to extend the height of the trailing housing assembly 300 to be equal to the leading housing assembly height 112. Additionally or alternatively, the adapter 800 may be used for coupling to the shoe assembly 500 to more securely hold the pivot bar in place. A bottom projection 824 may extend from the bottom wall 818 and be positioned within the shoe assembly top opening 534 (shown in FIG. 5B) to restrict axial movement of the pivot bar out of and away from the cam.

Figure 9:
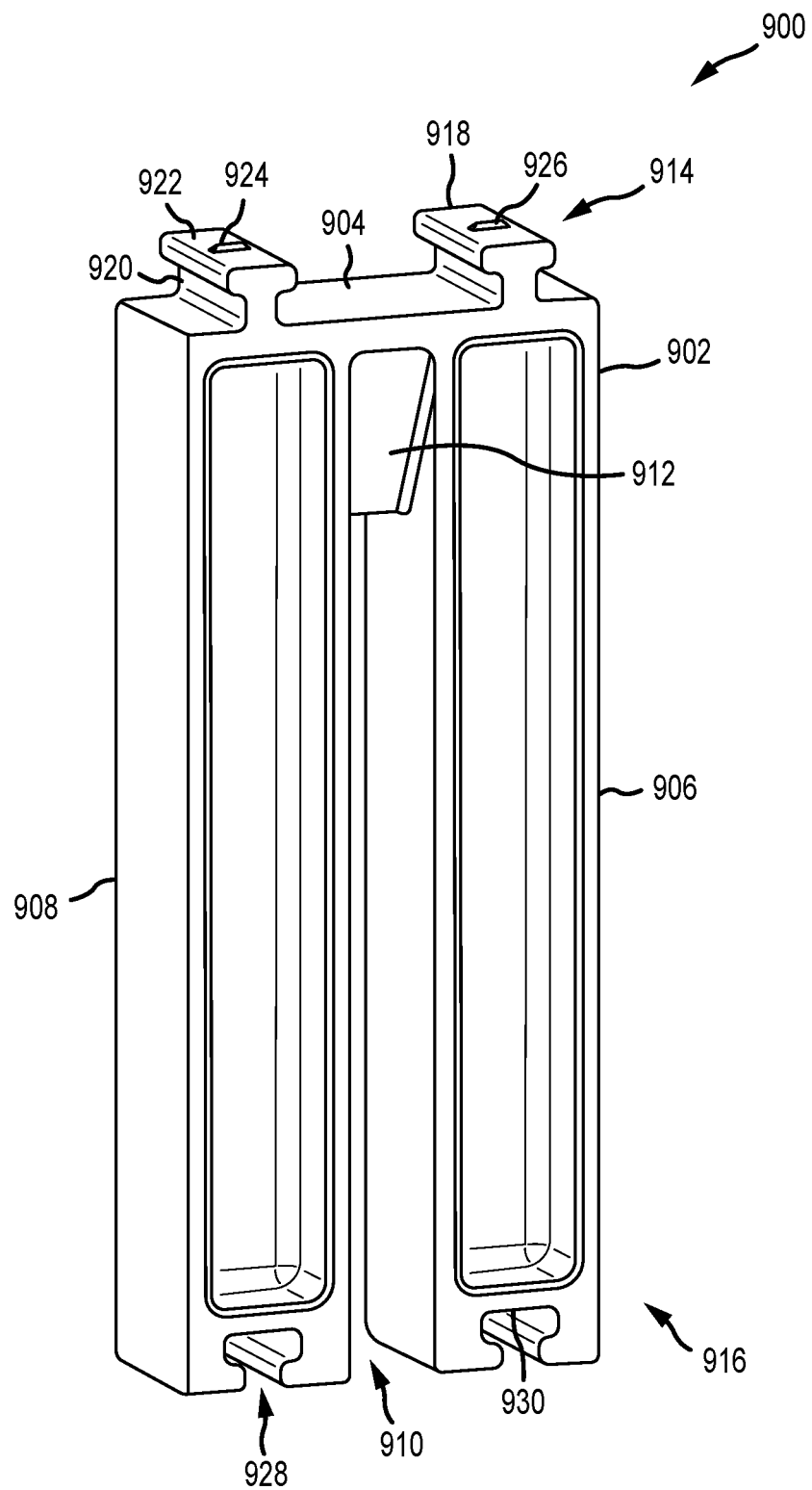
FIG. 9 is a perspective view of an extension of the window balance system shown in FIG. 1B.

FIG. 9 is a perspective view of an extension 900 that may be used with the window balance system 20 (shown in FIG. 1B). The extension 900 includes a substantially U-shaped body 902 having a top wall 904 and two elongate legs 906, 908 extending downwards therefrom. Between the legs 906, 908, an elongated pivot bar opening 910 is defined. Proximate the top wall 904, a sloped surface 912 extends from an outer surface of the body 902 at least further defining the elongated opening 910. The body 902 includes the sloped surface 912 on either side of the extension 900.

The extension 900 also includes a top extension element 914 and a bottom receiving element 916. In the example, the top extension element 914 includes at least one arm 918 extending from the top wall 904. The arm 918 is substantially T-shaped (e.g., dog bone-shaped) having a leg 920 and a cross-member 922. The cross-member 922 includes a top surface 924 that may have a detent 926 extending therefrom.

The top extension element 914 is removably received and engaged by a corresponding bottom receiving element from any other component to facilitate forming the carrier assembly, for example, the carrier assemblies 24, 24a, 24b, and 24c (shown in FIGS. 1B and 1E-1G). More specifically, the detent 926 is sized and shaped to receive and engage a corresponding notch, for example, the leading housing assembly notch 178 (shown in FIG. 2E) or the trailing housing assembly notch 364 (shown in FIG. 3C) of the bottom receiving element to enable a more secure component connection as described herein.

The bottom receiving element 916 is defined in the free end of each leg 906, 908. The bottom receiving element 916 includes at least one channel 928 defined in the free end of each leg 906, 908 that is substantially T-shaped and defined by an innermost surface 930. The innermost surface 930 may include a notch (not shown) defined therein.

The bottom receiving element 916 enables removable receipt and engagement of a corresponding top extension element from any other component to facilitate forming the carrier assembly, for example, the carrier assemblies 24, 24a, 24b, and 24c (shown in FIGS. 1B and 1E-1G). More specifically, the notch is sized and shaped to receive and engage a corresponding detent, for example, the shoe assembly detent 526 (shown in FIG. 5A) or an adjacent trailing housing assembly detent 352 (shown in FIG. 3A) on the top extension element to enable a more secure component connection as described herein.

The extension 900 is coupled between either the leading housing assembly 100 or the trailing housing assembly 300 and the shoe assembly 500 to provide an elongated opening 910 that facilitates receiving the pivot bar. Additionally, the extension 900 assists in channeling the pivot bar to the cam 502 (shown in FIG. 5A). The elongated opening 910 is in flow communication with the top opening and keyhole of the shoe assembly for easier installation of the pivot bar, and without requiring racking of the window. By extending the longitudinal length of the elongated opening 910 that receives the pivot bar, wider window sash dimensions are more easily accommodated because the pivot bar can be dropped into the cam without window racking.

Figure 10:
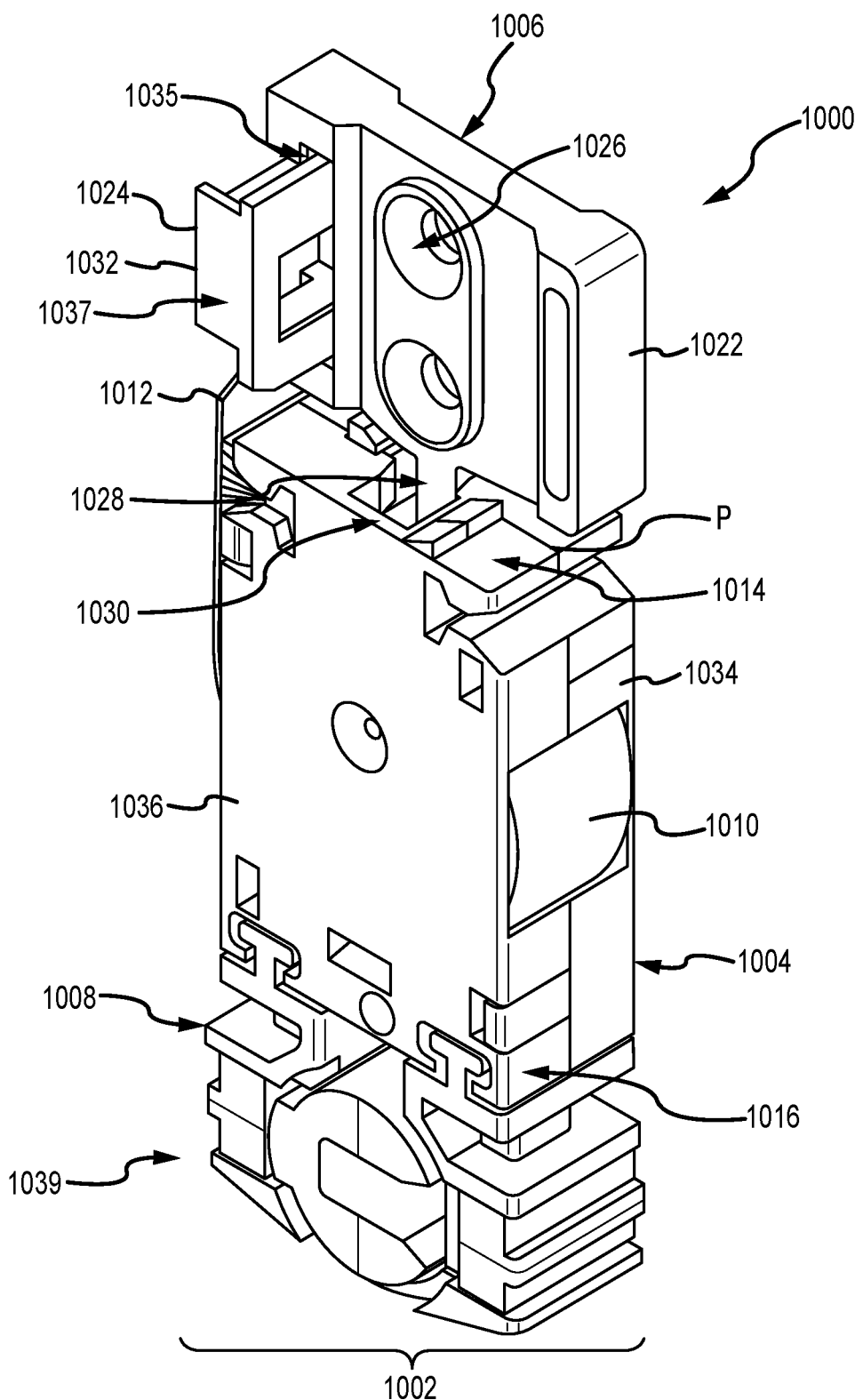
FIG. 10 is a perspective view of another inverted constant force window balance system.

FIG. 10 is a perspective view of another inverted constant force window balance system 1000 that may be used with the hung window frame assembly 10 (shown in FIG. 1A). Some of the features of the window balance system 1000 are described in the examples set forth above and are not described further. In this example, the window balance system 1000 is illustrated in a shipping configuration 1002 and includes a leading housing assembly 1004, a mounting bracket 1006, and a shoe assembly 1008. The shoe assembly 1008 may be any one of the shoe assemblies described in FIGS. 5A-7 and is not discussed further in this example. The leading housing assembly 1004 houses a coil spring 1010, which includes a free end 1012 that is coupled to the mounting bracket 1006. A top end 1014 of the leading housing assembly 1004 is releasably coupled to the mounting bracket 1006 as described further below. A bottom end 1016 of the leading housing assembly 1004 is removably coupled to the shoe assembly 1008 that enables the window balance system 1000 to be secured within a window jamb during operation as described herein.

The mounting bracket 1006 includes a jamb mount 1022 and a coil spring mount 1024. The jamb mount 1022 includes at least one aperture 1026 that enables a screw or other fastener element to couple the mounting bracket 1006 to a window jamb during installation. The jamb mount 1022 also includes a bottom extension element 1028 that is configured to be removably received and engaged by a corresponding top receiving element 1030 of the leading housing assembly 1004. As such, the mounting bracket 1006 is releasably coupled to the leading housing assembly 1004. The coil spring mount 1024 includes a body 1032 that is configured to receive the free end 1012 of the coil spring 1010 so that the mounting bracket 1006 is coupled to the coil spring 1010.

In this example, the leading housing assembly 1004 may be formed by two identical housing members 1034, 1036 that are joined at a mating plane P. In the shipping configuration 1002, the jamb mount 1022 is positioned proximate the first housing member 1034 so that the jamb mount 1022 is off-center relative to the leading housing assembly 1004. When the window balance system 1000 is mounted with the first housing member 1034 adjacent to the window jamb surface, the jamb mount 1022 is fastened to the window jamb such that the top receiving element 1030 does not immediately release from the bottom extension element 1028. Once the window sash is loaded on the shoe assembly 1008, the top receiving element 1030 moves in relation to the bottom extension element 1028 and the leading housing assembly 1004 is released from the mounting bracket 1006. The movement of the top receiving element 1030 may be sliding, pivoting, twisting, or a combination of two or more of these motions. This forms a first installed configuration (described further below in reference to FIG. 12C), such that the leading housing assembly 1004 is enabled to slide up and down within the window jamb and in relation to the mounting bracket 1006. Additionally, when the jamb mount 1022 is fastened to the window jamb, the jamb mount 1022 substantially maintains its position on the coil spring mount 1024. That is, proximate a first side 1035 thereof as depicted in FIG. 10.

When the window balance system 1000 is mounted with the second housing member 1036 on the window jamb surface, the jamb mount 1022 is fastened to the window jamb such that it moves from a position proximate the first housing member 1034 to a position proximate the second housing member 1036 and across the mating plane P. This movement of the jamb mount 1022 releases the top receiving element 1030 from the bottom extension element 1028. The movement of the jamb mount 1022 may be sliding, pivoting, twisting, or a combination of two or more of these motions. This forms a second installed configuration (described further below in reference to FIG. 12D), wherein the leading housing assembly 1004 is enabled to slide up and down in the vertical direction within the window jamb and in relation to the mounting bracket 1006. Additionally, when the jamb mount 1022 slides from the first housing member 1034 toward the second housing member 1036, the jamb mount 1022 also slides from the first side 1035 of the coil spring mount 1024 to a second side 1037 of the coil spring mount 1024. Although the jamb mount 1022 slides across the mating plane P, the coil spring mount 1024 maintains a centered position with regards to the leading housing assembly 1004.

Similar to the alternative configurations of the window balance system 20 illustrated in FIGS. 1E-1G, the window balance system 1000 may be coupled to one or more trailing housing assemblies so that the spring rate and the rated balance weight of the window balance system can be increased as required or desired, thereby enabling operation in larger/heavier window sash sizes. For example, an alternative configuration illustrated in FIG. 14 includes one trailing housing assembly 1086 coupled between the leading housing assembly 1004 and the shoe assembly 1008. Additionally, the leading housing assembly 1004, the shoe assembly 1008, and any trailing housing assemblies form a carrier assembly 1039 that is configured to be secured to the window sash as described herein.

Figure 11A:
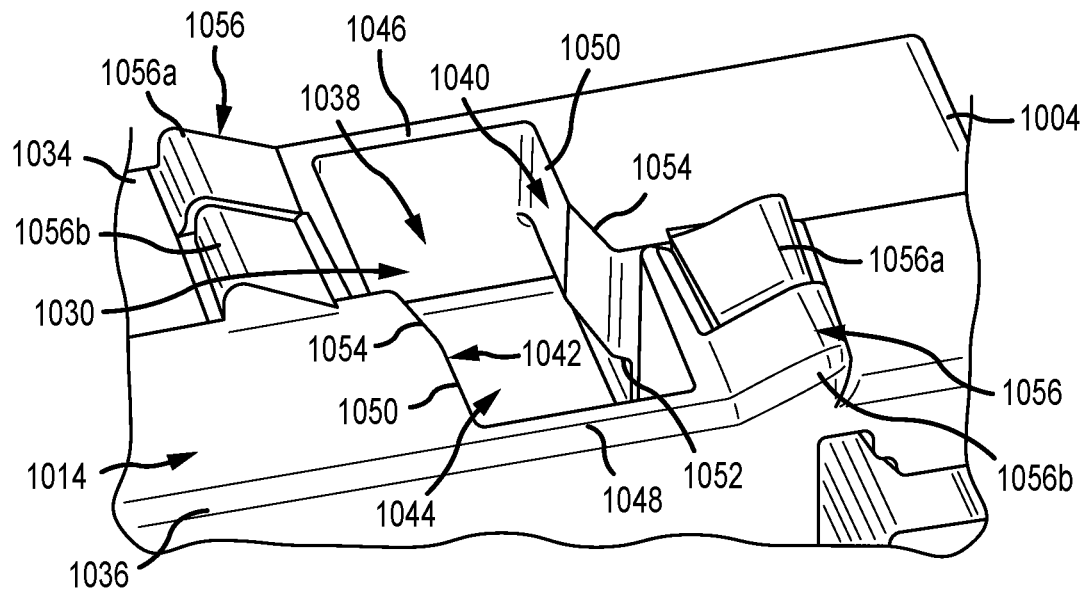
FIG. 11A is a perspective view of a top end of the window balance system shown in FIG. 10.
Figure 11B:
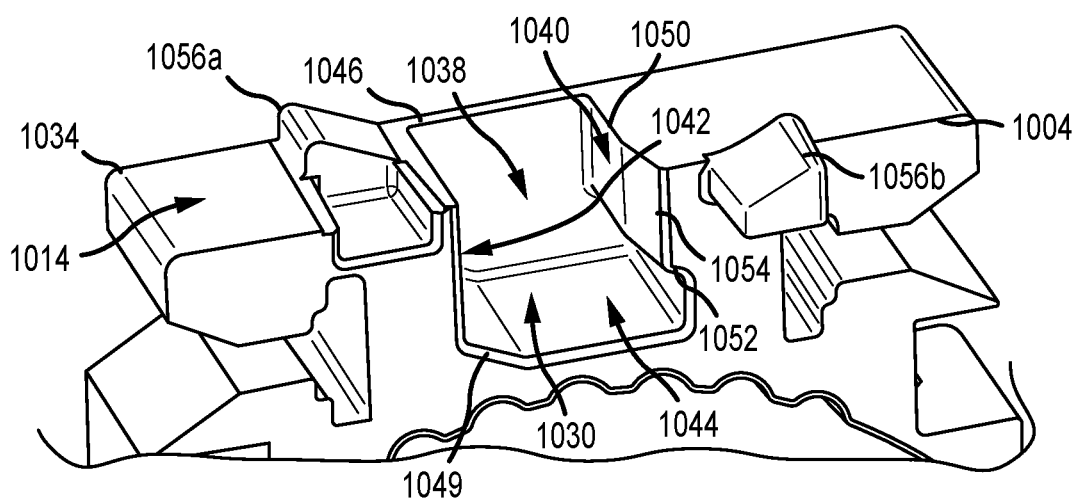
FIG. 11B is a cross-sectional perspective view of the top end taken along a mating plane P shown in FIG. 10.

FIG. 11A is a perspective view of the top end 1014 of the leading housing assembly 1004 of the window balance system 1000 (shown in FIG. 10). FIG. 11B is a cross-sectional perspective view of the top end 1014 taken along the mating plane P (shown in FIG. 10). Referring concurrently to FIGS. 11A and 11B, the leading housing assembly 1004 is formed from the first housing member 1034 connected to the second housing member 1036. The top end 1014 of the leading housing assembly 1004 includes the top receiving element 1030 that is configured to receive a portion of the mounting bracket as described above.

The top receiving element 1030 includes a substantially U-shaped channel 1038 (when viewed in section as in FIG. 12B) defined in the top end 1014. The channel 1038 is defined by two opposing side surfaces 1040, 1042 and a floor surface 1044. The channel 1038 may be bounded by two end walls 1046, 1048, although in other examples, the channel 1038 may be open at one or both of the ends. The floor surface 1044 may include a floor angled surface 1049. Each side surface 1040, 1042 may include a projection 1050 that extends at least partially into the channel 1038 generally higher than and opposite to an uppermost portion of the floor angled surface 1049. The projection 1050 is offset from the floor surface 1044 and includes a projection angled surface 1052 that opposes the floor surface 1044 and the floor angled surface 1049. The floor and projection angled surfaces 1049, 1052 are configured to engage discrete portions of the mounting bracket so as to hold the mounting bracket in place when the window balance system is in the shipping configuration as described below. The projection 1050 also includes an oblique surface 1054. The oblique surface 1054 is configured to facilitate sliding the mounting bracket in relation to the projection 1050 when the mounting bracket slides from a position proximate the first housing member 1034 to a position proximate the second housing member 1036, which is the second installed configuration as described below. Since the first and second housing members 1034, 1036 are identical to one another, the features described above are present on both the first and second housing members 1034, 1036.

A ramp 1056 extends from the top end 1014 of the leading housing assembly 1004. The ramp 1056 is configured to engage a corresponding surface on the jamb mount so as to hold the mounting bracket in place when the window balance system is in the shipping configuration. The ramp 1056 is positioned opposite the projection 1050 and may be formed by ramp sections 1056a, b from both the first and second housing members 1034, 1036.

Figure 12A:
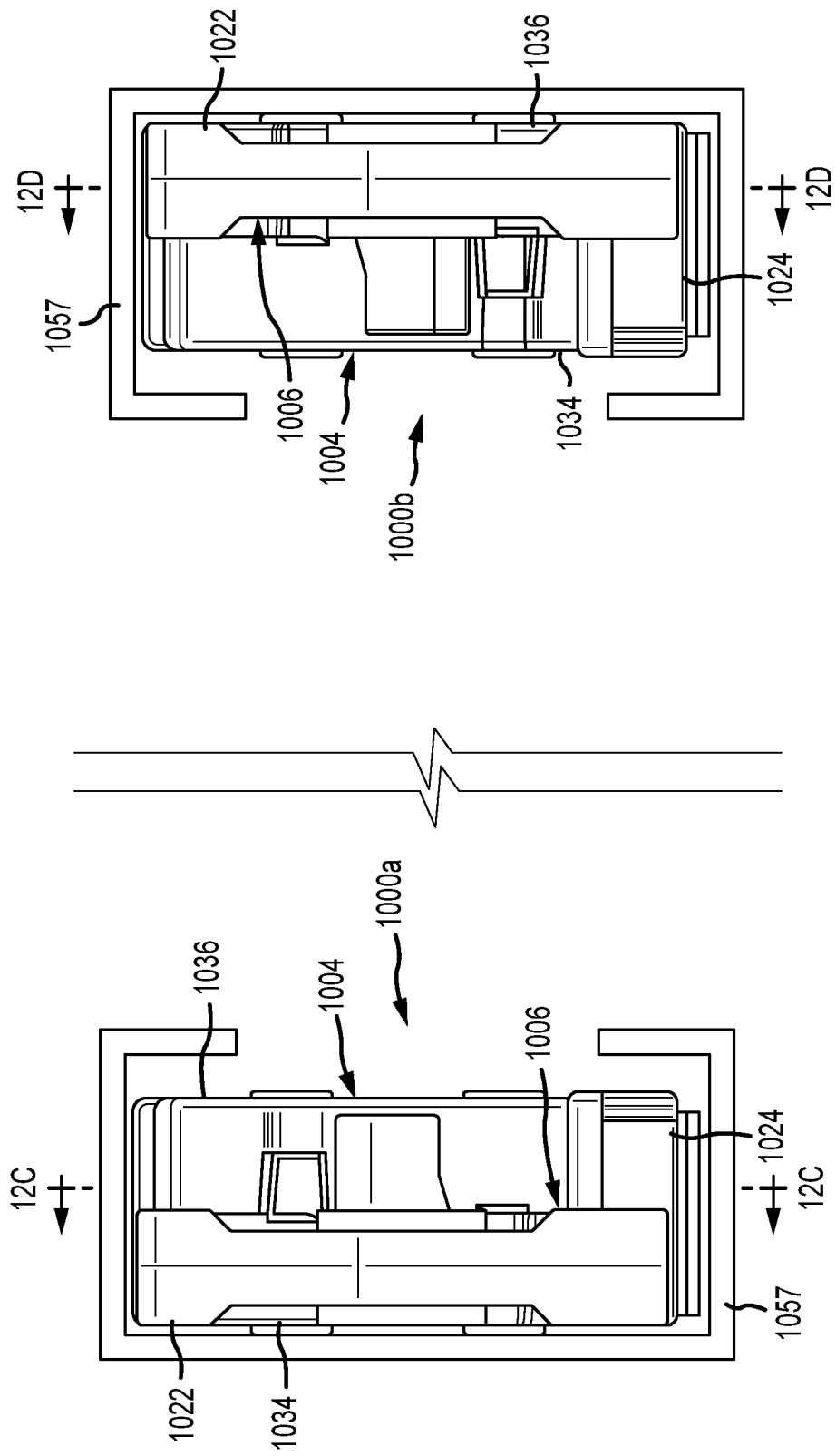
FIG. 12A is a plan view of two window balance systems installed within a window jamb.

FIG. 12A is a plan view of two window balance systems 1000a, b installed within a window jamb 1057. The window balance system 1000a is in a first installed configuration 1070 (described below in reference to FIG. 12C) when the first housing member 1034 is proximate to the window jamb installation surface. The window balance system 1000b is in a second installed configuration 1072 (described below in reference to FIG. 12D) when the second housing member 1036 is proximate to the window jamb installation surface.

Figure 12B:
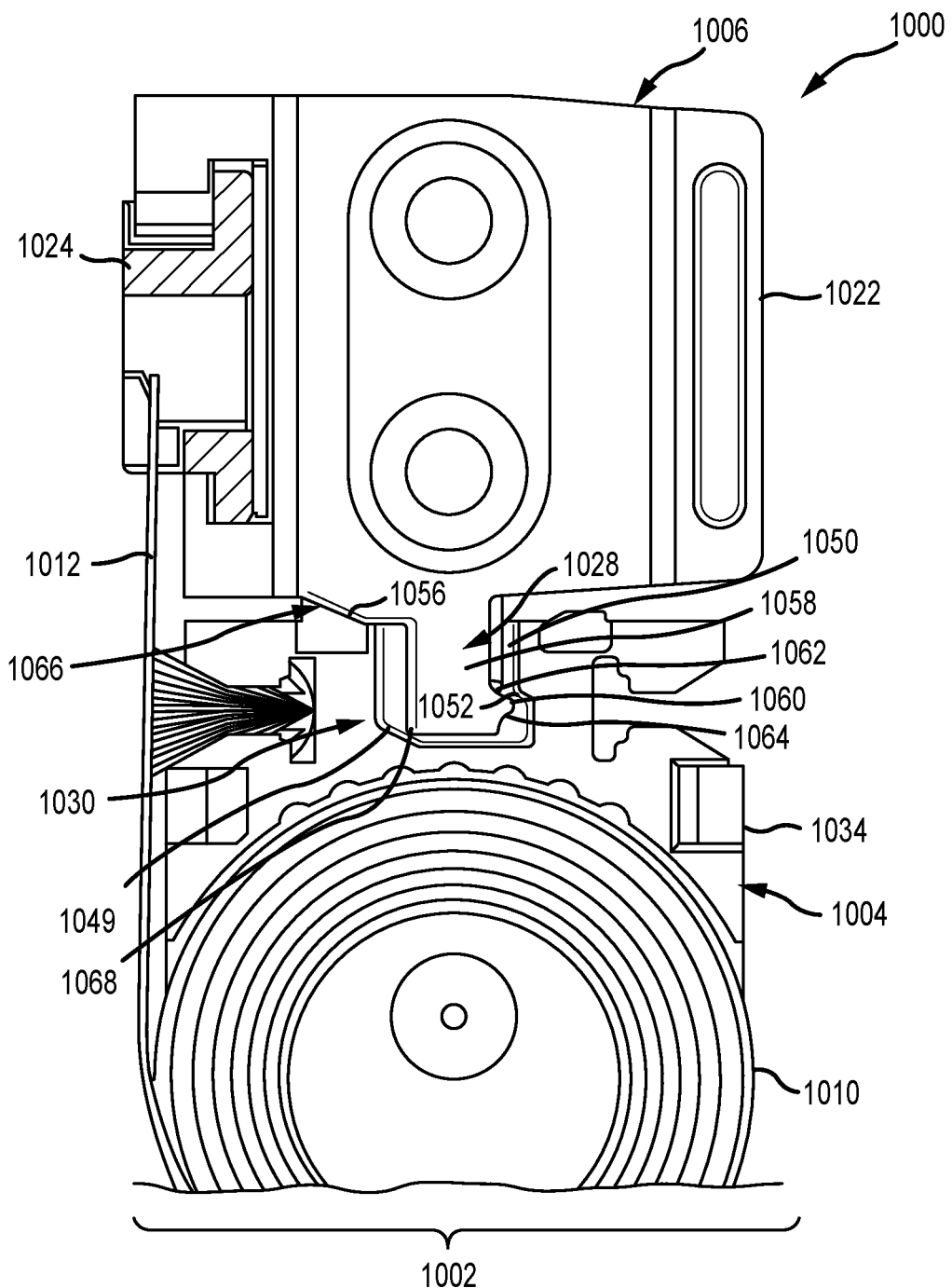
FIG. 12B is a cross-sectional view of the window balance system in a shipping configuration taken along a mating plane P shown in FIG. 10.

FIG. 12B is a cross-sectional view of the window balance system 1000 in the shipping configuration 1002 taken along the mating plane P (shown in FIG. 10). The jamb mount 1022 includes the bottom extension element 1028 that is shaped and sized to engage with the top receiving element 1030 of the leading housing assembly 1004. The bottom extension element 1028 includes a bottom extension arm 1058 having a detent extending therefrom. The detent may be formed as a toe 1060 having two angled surfaces 1062, 1064. In the example, the top angled surface 1062 may correspond to the projection angled surface 1052 of the projection 1050. The jamb mount 1022 also includes a ramp surface 1066 that corresponds to the ramp 1056 extending from the leading housing assembly 1004.

In operation, the free end 1012 of the coil spring 1010 is coupled to the mounting bracket 1006 at the coil spring mount 1024. The coil spring 1010 generates a pull-down force at the coil spring mount 1024. As such, the jamb mount 1022 tilts toward the coil spring mount 1024. This tilting movement frictionally engages the top angled surface 1062 of the toe 1060 with the projection angled surface 1052 of the projection 1050 so that the tilting movement is counteracted and opposed. Furthermore, a heel 1068 of the bottom extension arm 1058 engages the floor angled surface 1049, while the ramp surface 1066 frictionally engages with the ramp 1056. Accordingly, the jamb mount 1022 is secured to the leading housing assembly 1004 in this shipping configuration 1002.

Figure 12C:
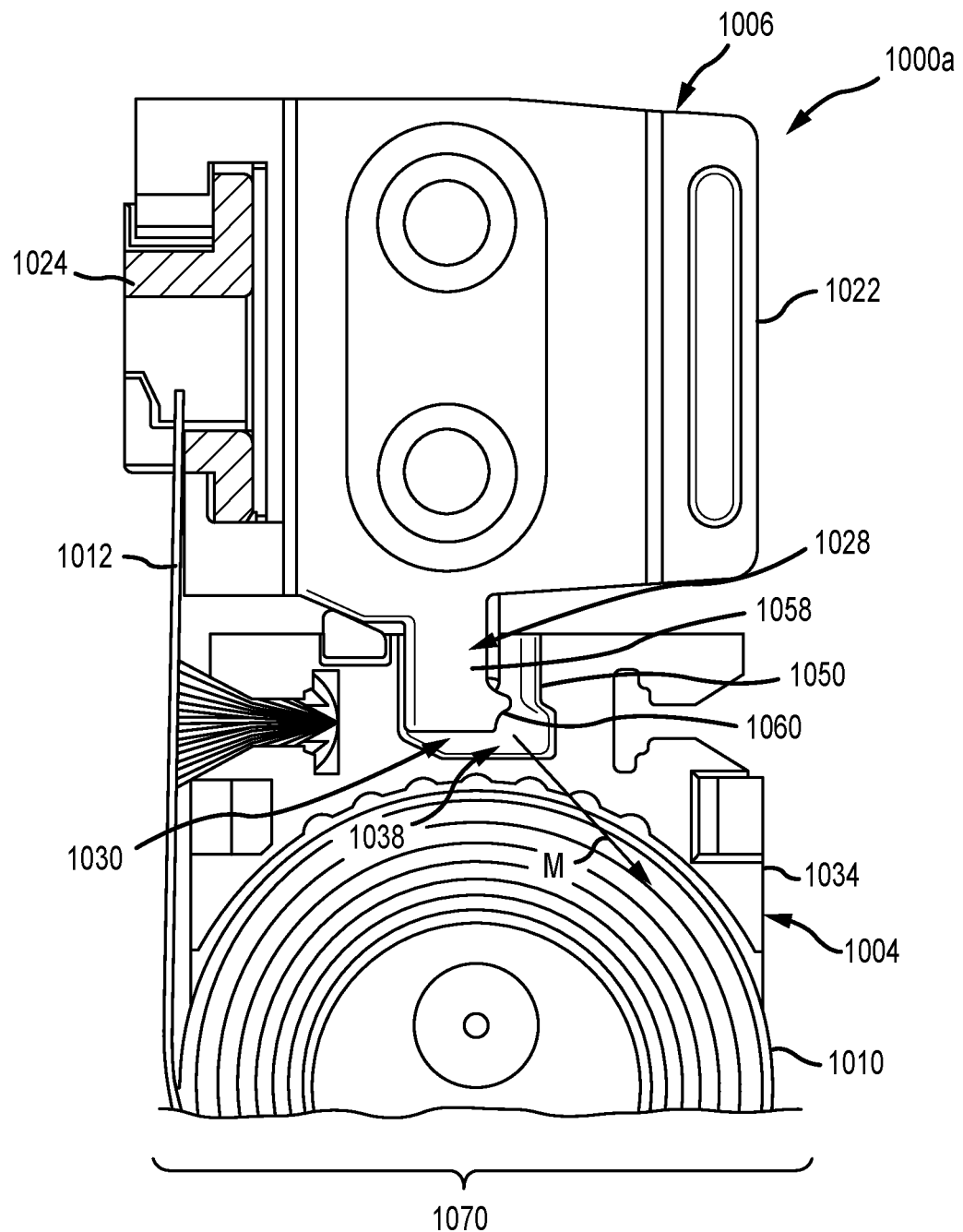
FIG. 12C is a cross-sectional view of the window balance system in a first installed configuration taken along section 12C shown in FIG. 12A.

FIG. 12C is a cross-sectional view of the window balance system 1000a in a first installed configuration 1070 and taken along section 12C shown in FIG. 12A. When the window balance system 1000a is mounted with the first housing member 1034 on the window jamb surface, the jamb mount 1022 is fastened to the window jamb such that the bottom extension element 1028 does not release from the top receiving element 1030. However, once the window sash is loaded on the shoe assembly 1008, the top receiving element 1030 moves in relation to the bottom extension element 1028 and the leading housing assembly 1004 is released from the mounting bracket 1006. This forms the first installed configuration 1070. More specifically, the weight of the window sash moves M the top receiving element 1030 in a downwardly angled direction away from the bottom extension element 1028. This movement may be from the leading housing assembly 1004 sliding, pivoting, twisting, or a combination of two or more of these motions relative to the mounting bracket 1006. This movement M overcomes the toe 1060 being engaged with the projection 1050, and as such, the leading housing assembly 1004 can freely move in a downwardly angled direction and away from the mounting bracket 1006.

In the example, the toe 1060 does not deform when the bottom extension element 1028 disengages from the top receiving element 1030. Once the toe 1060 disengages from the projection 1050, the channel 1038 is sized to allow for the clearance of the bottom extension element 1028 as the leading housing assembly 1004 is moved. For example, the width of the bottom extension arm 1058 may be approximately the width of the channel 1038. After the leading housing assembly 1004 is released, it is then enabled to slide up and down within the window jamb in relation to the mounting bracket 1006. Additionally, when the jamb mount 1022 is fastened to the window jamb, the jamb mount 1022 substantially maintains its position on the coil spring mount 1024. That is, proximate the first side 1035 thereof as depicted in FIG. 12A.

Figure 12D:
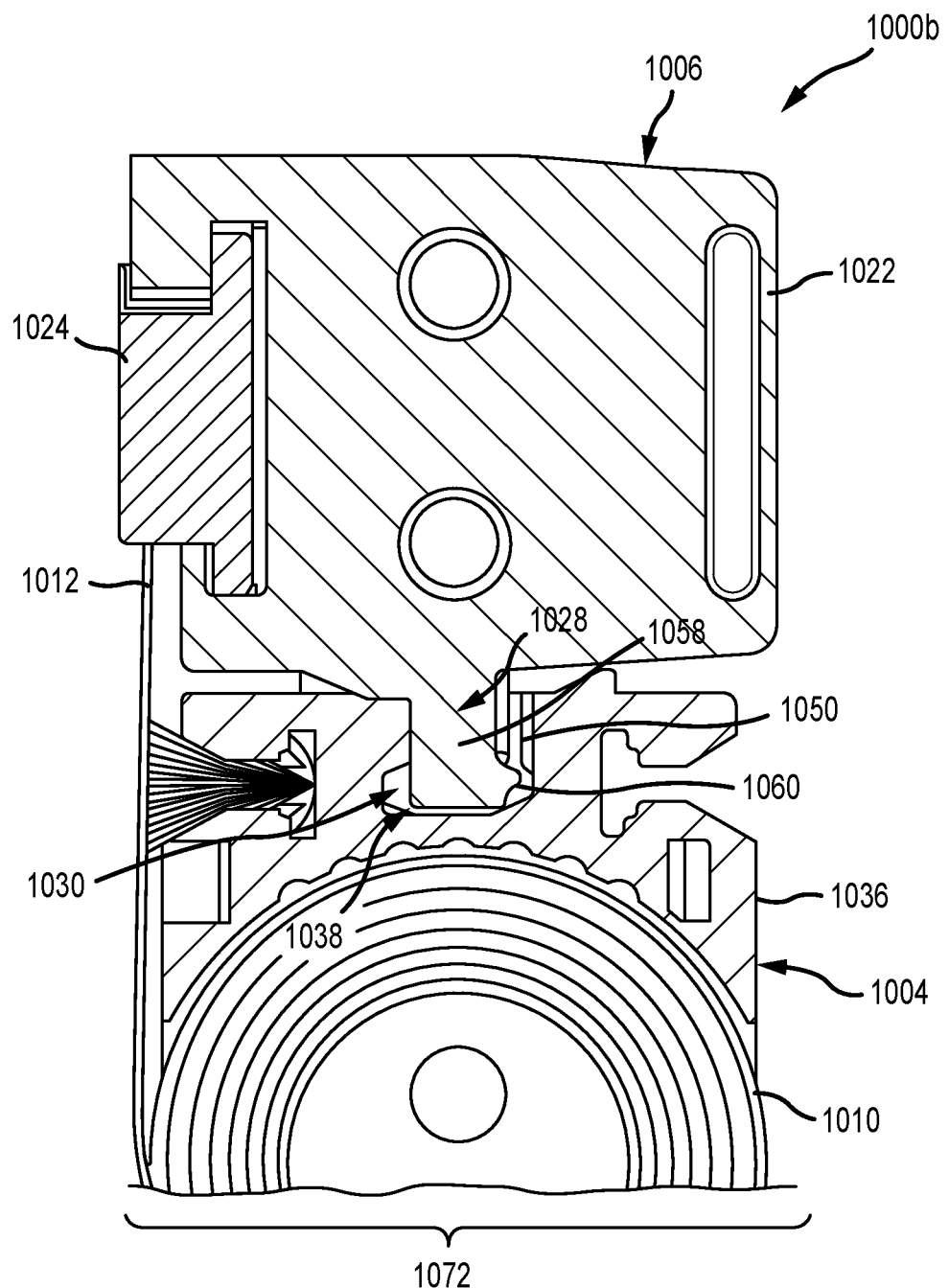
FIG. 12D is a cross-sectional view of the window balance system in a second installed configuration taken along section 12D shown in FIG. 12A.

FIG. 12D is a cross-sectional view of the window balance system 1000b in a second installed configuration 1072 taken along section 12D shown in FIG. 12A. When the window balance system 1000b is mounted with the second housing member 1036 on the window jamb surface, the jamb mount 1022 is fastened to the window jamb such that it moves from a position proximate the first housing member (which is located behind the second housing member 136 in FIG. 12D) across to a position proximate the second housing member 1036 within the channel 1038. This horizontal movement of the jamb mount 1022 releases the bottom extension element 1028 from the top receiving element 1030 and forms the second installed configuration 1072. More specifically, the movement of the jamb mount 1022 moves the toe 1060 substantially orthogonally and out from under the projection 1050 of the first housing member 1034 (which is illustrated in the background in FIG. 12D) so that the leading housing assembly 1004 can freely move in a downwardly direction and away from the jamb mount 1022. This movement may be from the mounting bracket 1006 sliding, pivoting, twisting, or a combination of two or more of these motions relative to the leading housing assembly 1004.

In the example, as the bottom extension arm 1058 moves from the first housing member 1034 towards the second housing member 1036, the oblique surface 1054 (shown in FIGS. 11A and 11B) enables the bottom extension arm 1058 to move along the projection 1050 without interference. The leading housing assembly 1004 is then enabled to slide up and down within the window jamb in relation to the mounting bracket 1006. For example, the width of the bottom extension arm 1058 may be approximately the width of the channel 1038. Additionally, when the jamb mount 1022 moves from the first housing member toward the second housing member 1036, the jamb mount 1022 also slides from the first side of the coil spring mount 1024 to the second side of the coil spring mount 1024. Although the jamb mount 1022 slides across the mating plane P, the coil spring mount 1024 maintains a centered positioned with regards to the leading housing assembly 1004 as illustrated in FIG. 12A.

Figure 13:
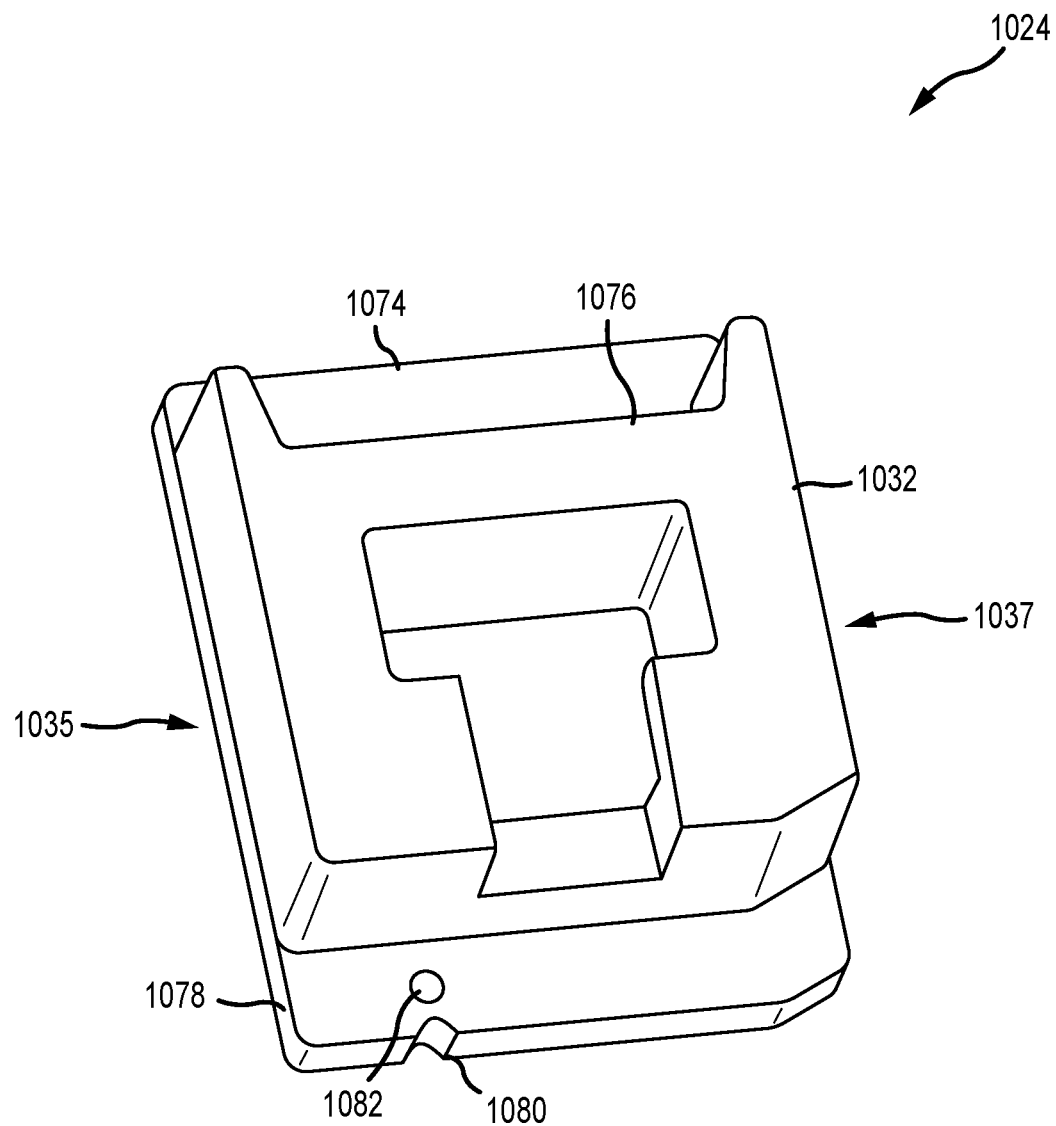
FIG. 13 is a perspective view of a coil spring mount.

FIG. 13 is a perspective view of the coil spring mount 1024 of the window balance system 1000 (shown in FIG. 10). The coil spring mount 1024 includes the body 1032 that has a back wall 1074 and a cage 1076 that extends from the back wall 1074. The body 1032 extends between the first side 1035 and the second side 1037 of the coil spring mount 1024. The back wall 1074 is configured to be received by the jamb mount 1022 (shown in FIG. 10) such that the jamb mount 1022 may horizontally slide there along. A bottom portion 1078 of the back wall 1074 may include a recess 1080 and/or a detent 1082 defined therein. The recess 1080 and/or the detent 1082 are configured to engage with a corresponding detent and/or recess defined on the jamb mount 1022 so as to facilitate securing the mounting bracket in the shipping configuration as described above. In this example, the recess 1080 and/or the detent 1082 may be positioned proximate the first side 1035 of the body 1032 an offset from the center, such that the mounting bracket is secured in the shipping configuration.

The coil spring mount 1024 may be constructed out of a metal material, for example, a zinc die cast or the like. This enables a more durable connection between the coil spring and the mounting bracket and reduces wear from the coil spring on the mounting bracket. Additionally, wear is reduced on the mounting bracket in the event of uncontrolled balance system retraction within the window jamb (e.g., the carrier assembly retracting towards the mounting assembly without the window sash connected).

Figure 14:
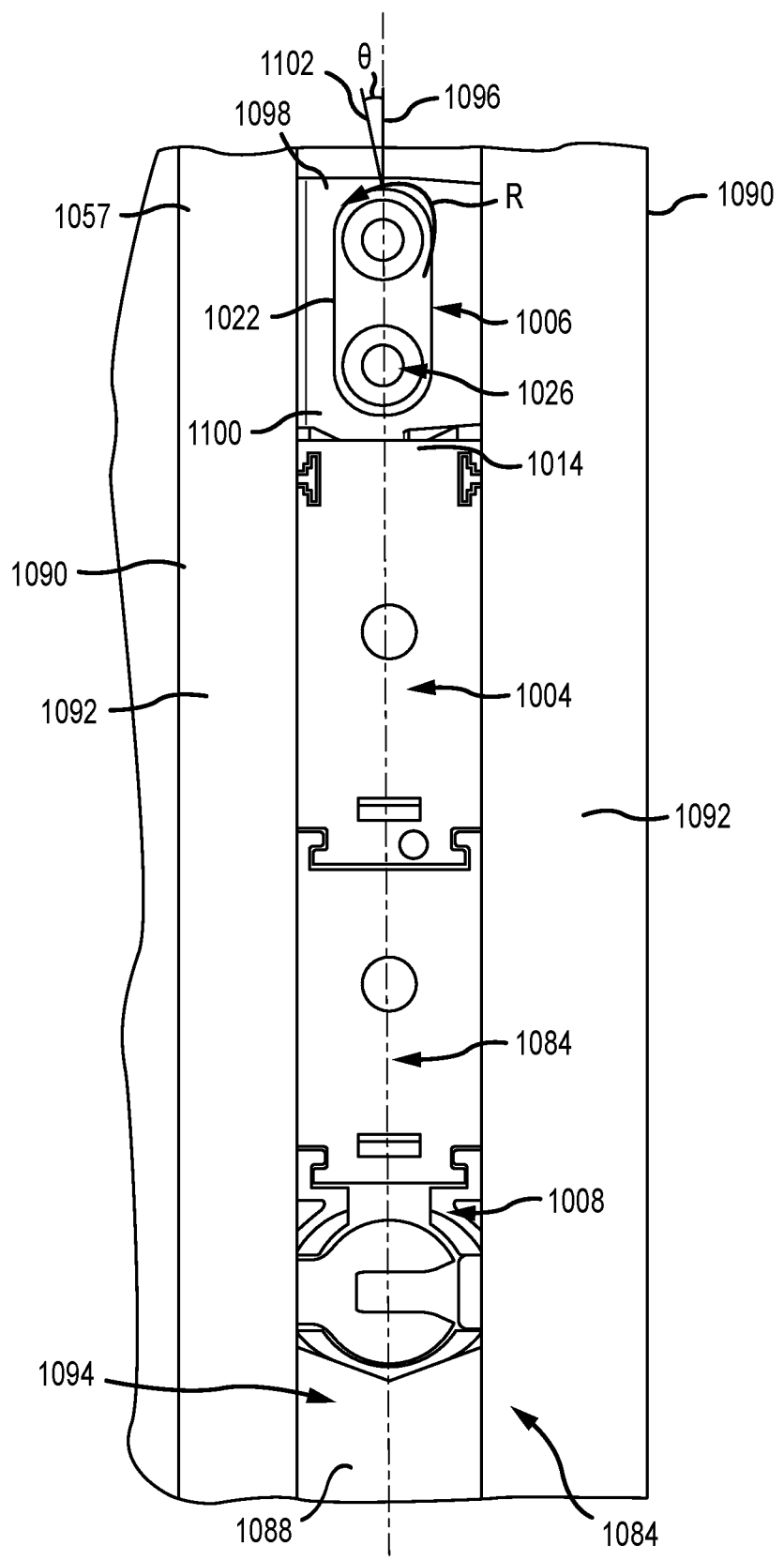
FIG. 14 is a perspective view of the window balance system shown in FIG. 10 in an alternative configuration and disposed within a window jamb.

FIG. 14 is a perspective view of the inverted constant force window balance system 1000 (shown in FIG. 10) in an alternative configuration 1084 and disposed within the window jamb 1057. In this example, the leading housing assembly 1004 is coupled to a trailing housing assembly 1086 as described in detail above in FIGS. 3A-3D. The window jamb 1057 may be a substantially C-shaped channel having a back wall 1088, two opposing side walls 1090, and two front walls 1092 each extending from a respective side wall such that a front opening slot 1094 is defined. When the window balance system 1084 is mounted within the window jamb 1057, the jamb mount 1022 is configured to be secured to the back wall 1088 via one or more fasteners (not shown) that extend through the apertures 1026. The front walls 1092 enclose the window balance system 1084 so as to prevent dislodgment from the window jamb 1057.

When the window balance system 1084 is installed within the window jamb 1057 and is supporting the window sash, the weight of the window sash is supported by a load path that travels through the window balance system 1084 and into the window jamb 1057. For example, the load path within the window balance system 1084 includes the shoe assembly 1008 which is coupled to the window sash via a pivot pin (not shown), the housing assemblies 1004, 1086, the coil spring, and the mounting bracket 1006 which is coupled to the window jamb 1057 via one or more fasteners (not shown but which penetrate apertures 1026). The connection between the coil spring and the mounting bracket 1006 is offset from a longitudinal axis 1096 of the window balance system 1084 (e.g., the free end 1012 of the coil spring 1010 and the coil spring mount 1024 shown in FIG. 10). This offset induces a rotational movement R into the mounting bracket 1006. That is, a top portion 1098 of the jamb mount 1022 rotates toward the direction of the coil spring mount 1024 and a bottom portion 1100 of the jamb mount 1022 rotates the opposite direction and away from the coil spring mount 1024. Accordingly, a longitudinal axis 1102 of the mounting bracket 1006 is rotated into an angular offset position θ in relation to the longitudinal axis 1096 of the carrier assembly.

This rotational movement R induced by the load path through the window balance system 1084 may increase wear on the mounting bracket 1006. For example, wear on the connection between the coil spring and the coil spring mount, wear on the connection between the coil spring mount and the jamb mount 1022, and wear on the connection between the jamb mount 1022 and the window jamb 1057. Additionally, the rotational movement may increase the possibility of the free end of the coil spring disengaging from the coil spring mount and breaking the load path through the window balance system 1084. Accordingly, the mounting bracket described further below is configured to reduce the rotational movement that is induced by the load path through the window balance system 1084.

Figure 15A:
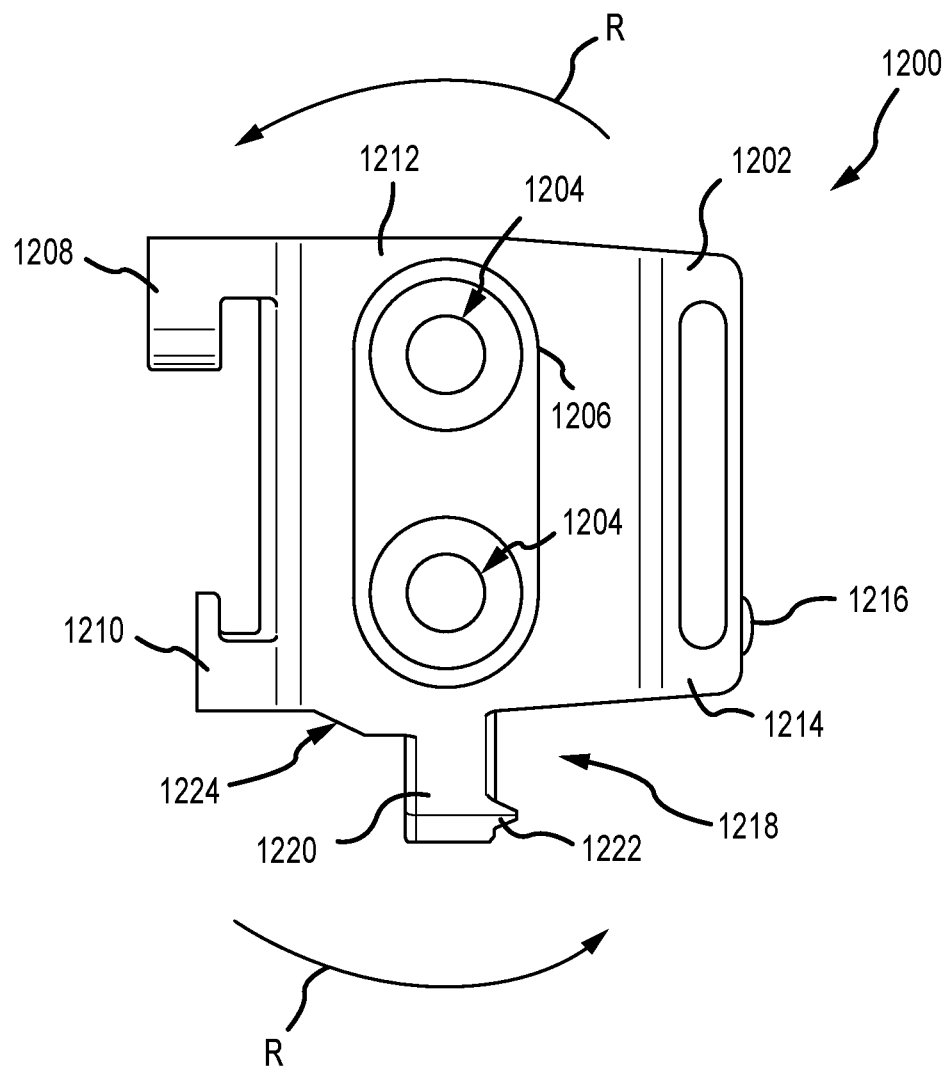
FIG. 15A is a side view of a jamb mount.

FIG. 15A is a side view of a jamb mount 1200 for use with the window balance system 1000 (such as those shown in FIG. 10). The jamb mount 1200 includes a substantially rectangular-shaped body 1202. The body 1202 defines two apertures 1204 that are surrounded by a collar 1206. The apertures 1204 enable a screw or other fastener element to couple the jamb mount 1200 to the window jamb for installation. The collar 1206 is also disposed on the opposite face of jamb mount 1200 and enables the jamb mount 1200 to mount flat against the back wall of the window jamb. On one side of the body 1202, the jamb mount 1200 includes a pair of discrete side extension arms 1208, 1210 for slidingly coupling the coil spring mount 1024 (shown in FIG. 10) to the jamb mount 1200. The side extension arms 1208, 1210 are positioned proximate a top portion 1212 of the body 1202 and a bottom portion 1214 of the body 1202, respectively.

On the other side of the body 1202 and opposite the side extension arms 1208, 1210, a boss 1216 extends from the body 1202 and is disposed proximate the bottom portion 1214. The boss 1216 is configured to contact the side wall of the window jamb. Through the contact between the boss 1216 and the window jamb, the rotational movement R induced by the load path of the window balance system may be reduced or eliminated. Furthermore, by only positioning the boss 1216 at the bottom portion 1214 of the body 1202, the amount of material used to form the jamb mount 1200 is reduced saving weight and material costs. Additionally, since the full two sides of the body 1202 do not extend to the side walls of the window jamb, the window balance system is easier to install within the window jamb, because a gap is formed by the boss 1216.

Additionally, the top side extension arm 1208 extends a greater distance away from the body 1202 than the bottom side extension arm 1210. As such, the top side extension arm 1208 may also be configured to contact the side wall of the window jamb to reduce rotational movement of the jamb mount 1200. As illustrated, the boss 1216 is opposite and opposed from the top side extension arm 1208 (e.g., bottom vs top and right vs left) such that each are in the direction of the rotational movement R of the jamb mount 1200. Accordingly, the boss 1216 and the top side extension arm 1208 may contact opposite side walls of the window jamb.

The jamb mount 1200 also includes the bottom extension element 1218 that extends from the bottom portion 1214 of the body 1202. The bottom extension element 1218 includes a bottom extension arm 1220 having a toe 1222 extending therefrom to releasably couple the jamb mount 1200 to the leading housing assembly as described above. Additionally, a ramp surface 1224 may be formed on the bottom portion 1214 of the jamb mount 1200 as described above.

Figure 15B:
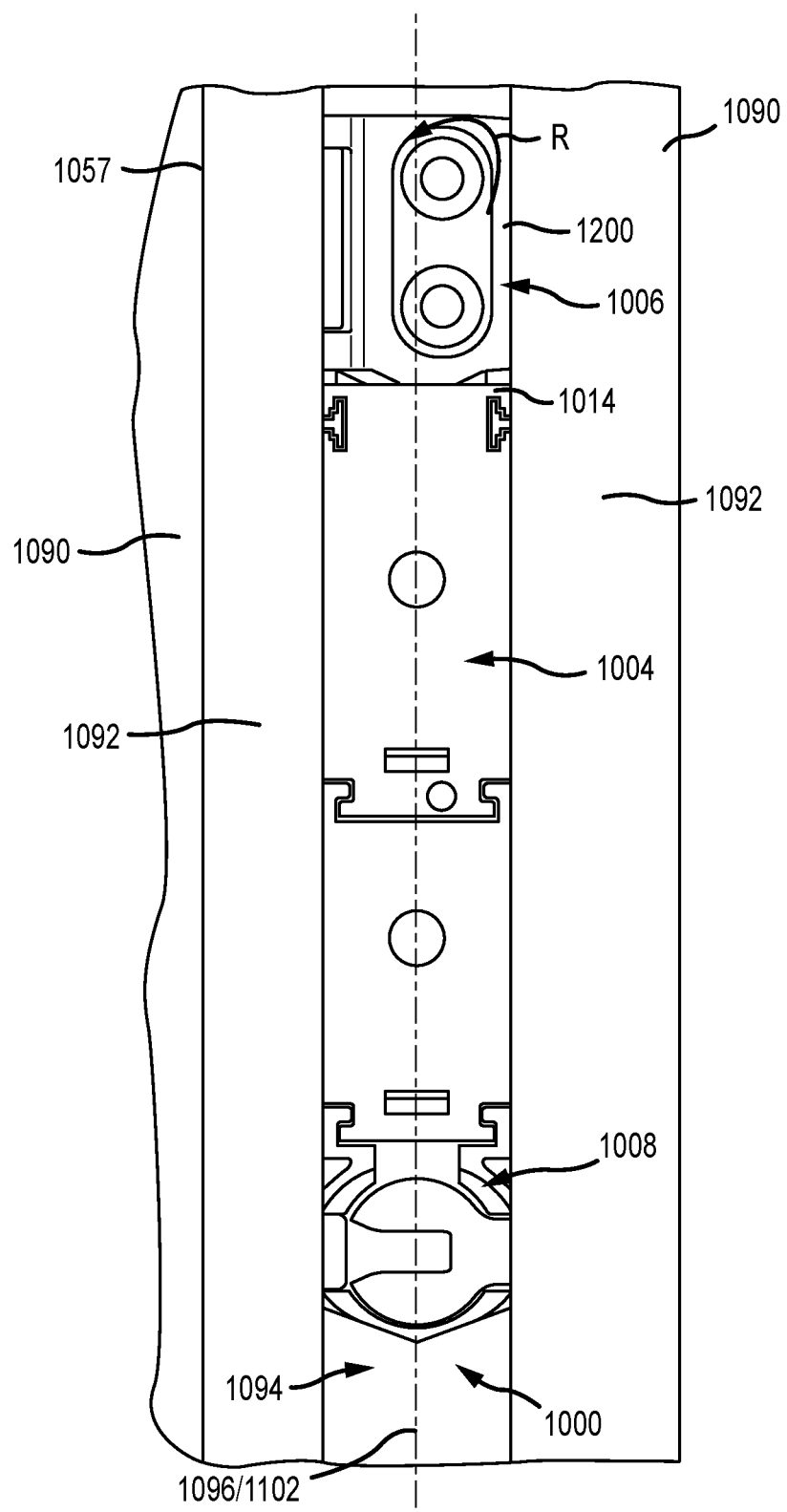
FIG. 15B is a perspective view of the inverted constant force window balance system shown in FIG. 10 with the jamb mount shown in FIG. 15A disposed within a window jamb.

FIG. 15B is a perspective view of the inverted constant force window balance system 1000 (shown in FIG. 10) with the jamb mount 1200 (shown in FIG. 15A) disposed within the window jamb 1057. As described above, the connection between the coil spring and the mounting bracket is offset from a longitudinal axis 1096 of the window balance system 1000 (e.g., the free end 1012 of the coil spring 1010 and the coil spring mount 1024 shown in FIG. 10) and induces a rotational movement R into the mounting bracket. However, because of the boss 1216 described above in FIG. 15A, the rotational movement R of the mounting bracket 1006 is prevented so that the longitudinal axis 1102 of the jamb mount 1200 maintains alignment with the longitudinal axis 1096 of the carrier assembly. By restricting rotational movement of the jamb mount 1200, via the boss, wear on the mounting bracket 1006 is reduced.

Figure 16:
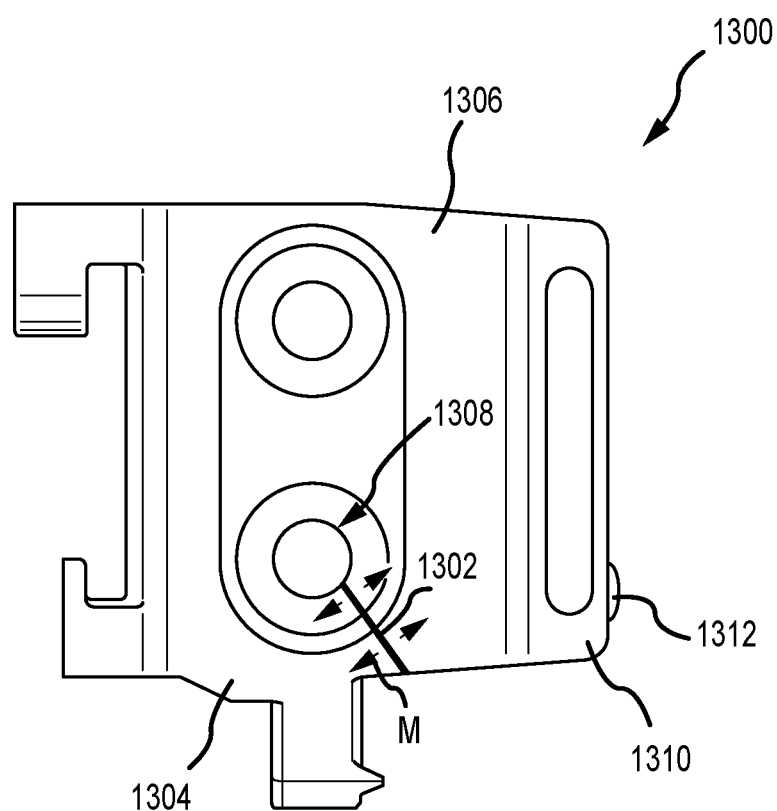
FIG. 16 is a side view of another jamb mount.

FIG. 16 is a side view of another jamb mount 1300 for use with the window balance system 1000 (shown in FIG. 10). Certain components are described above and, as such, are not described further. In this example, the jamb mount 1300 may include a mechanical fuse 1302 positioned at a bottom portion 1304 of a body 1306. The mechanical fuse 1302 extends from a lower aperture 1308 towards the exterior of the body 1306. The mechanical fuse 1302 is configured to shear during a mechanical overload, for example, while securing of the jamb mount 1300 to the window jamb via a fastener. When the body 1306 shears along the mechanical fuse 1302, opposing sides of the fuse are enabled to move M away from each other, and this displaces a bottom outer corner 1310 so as to extend further away from the body 1306. The bottom outer corner 1310 is then configured to contact the side wall of the window jamb and reduce rotational movement of the jamb mount. Additionally, the jamb mount 1300 may include a boss 1312 as described above. In another example, the jamb mount 1300 may be formed with an absence of material at the mechanical fuse location (e.g., a slit or gap in the body of the jamb mount) that enables for movement as described herein.

Figure 17A:
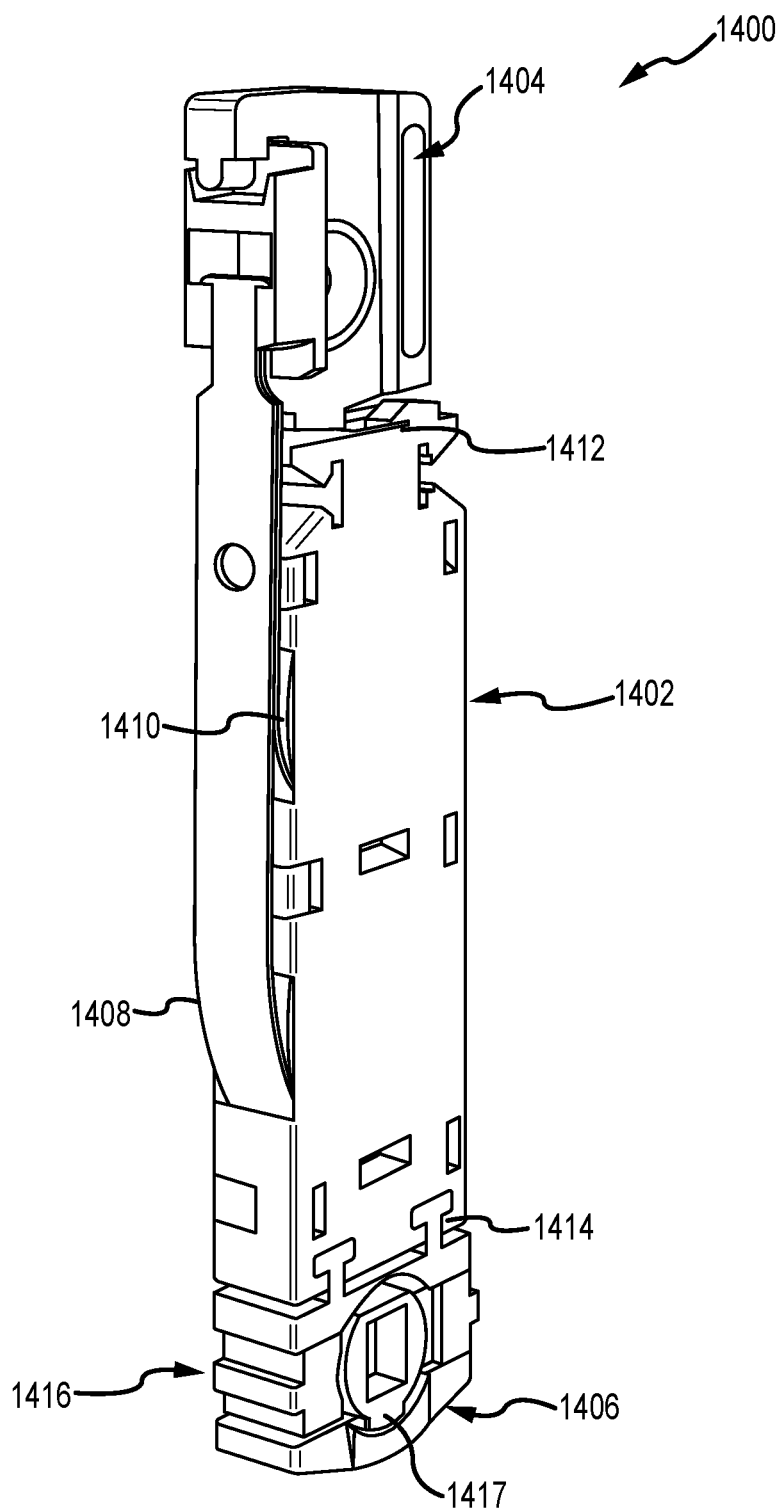
FIG. 17A is a perspective view of another inverted constant force window balance system.
Figure 17B:
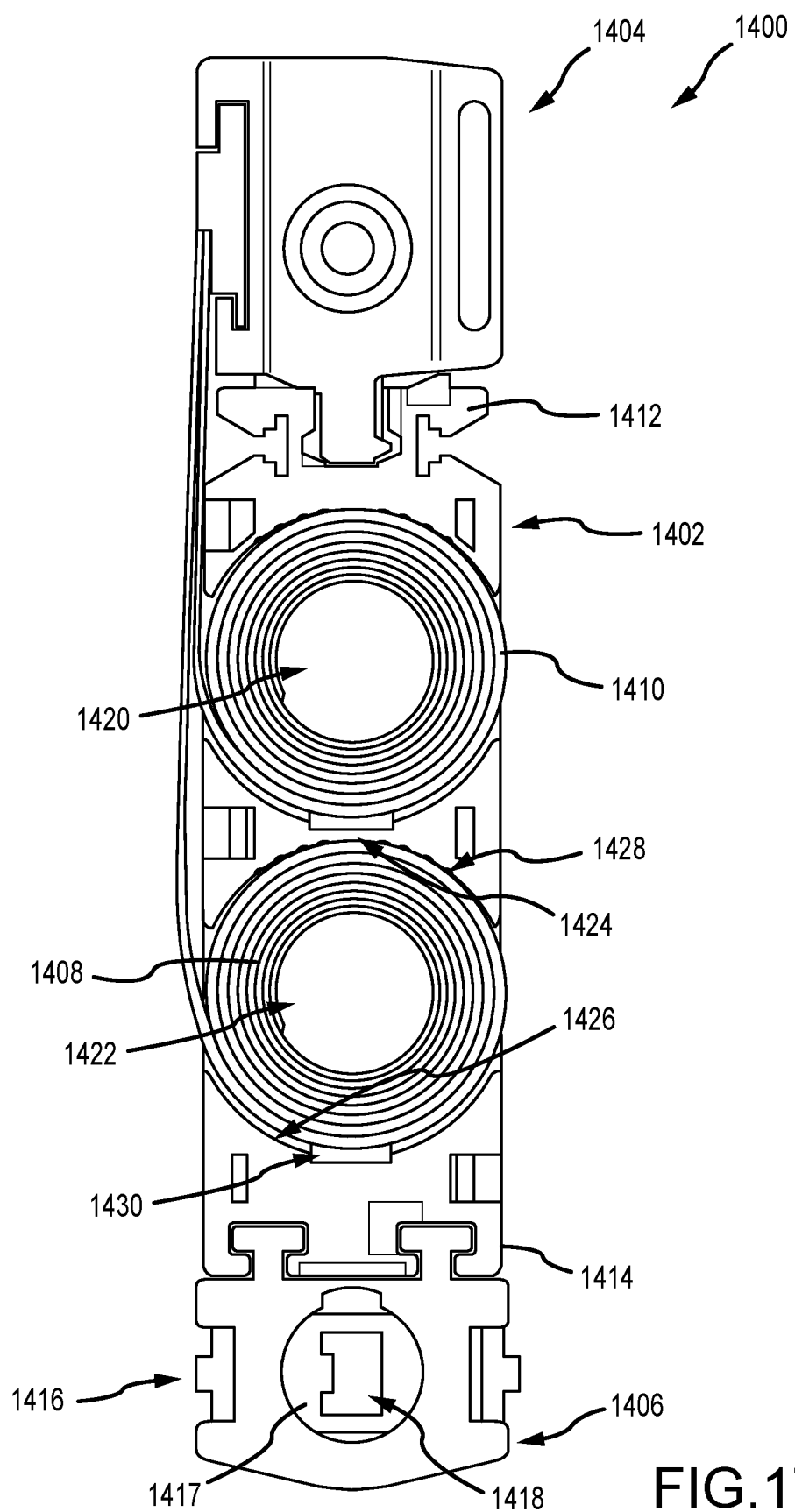
FIG. 17B is an interior view of the window balance system shown in FIG. 17A.

FIG. 17A is a perspective view of another inverted constant force window balance system 1400 that may be used with the hung window frame assembly 10 (shown in FIG. 1A). FIG. 17B is an interior view of the window balance system 1400. Referring concurrently to FIGS. 17A and 17B, the window balance system 1400 is illustrated in a shipping configuration (e.g., the mounting bracket releasably coupled to the leading housing assembly) and includes a leading housing assembly 1402, a mounting bracket 1404, and a shoe assembly 1406. The leading housing assembly 1402 houses a first coil spring 1408 and a second coil spring 1410 that are coupled to the mounting bracket 1404. A top end 1412 of the leading housing assembly 1402 is releasably coupled to the mounting bracket 1404 as described in FIGS. 12A-12D above. A bottom end 1414 of the leading housing assembly 1402 is removably coupled to the shoe assembly 1406. The shoe assembly 1406 includes a lock system 1416 that enables the window balance system 1400 to be secured within a window jamb during operation as described herein. In some examples, the lock system 1416 may include a cam 1417 that has a closed keyhole 1418.

The leading housing assembly 1402 may include an upper interior cavity 1420 that houses the coil spring 1410 and a lower interior cavity 1422 that houses the coil spring 1408. Each interior cavity 1420, 1422 is defined by an upper annular surface 1424 and a lower annular surface 1426. The upper annular surface 1424 may include a plurality of radially extending recesses 1428 that facilitate reducing surface friction of the upper annular surface 1424 when the coil spring rotates therein. The lower annular surface 1426 may include a debris trap 1430 that facilitates removing dirt and debris that may accumulate within the interior cavity. In this example, the leading housing assembly 1402 is configured to house two coil springs 1408, 1410 in separated cavities. In other examples, the upper interior cavity and lower interior cavity may be combined into one larger cavity that houses both coil springs.

Figure 17C:
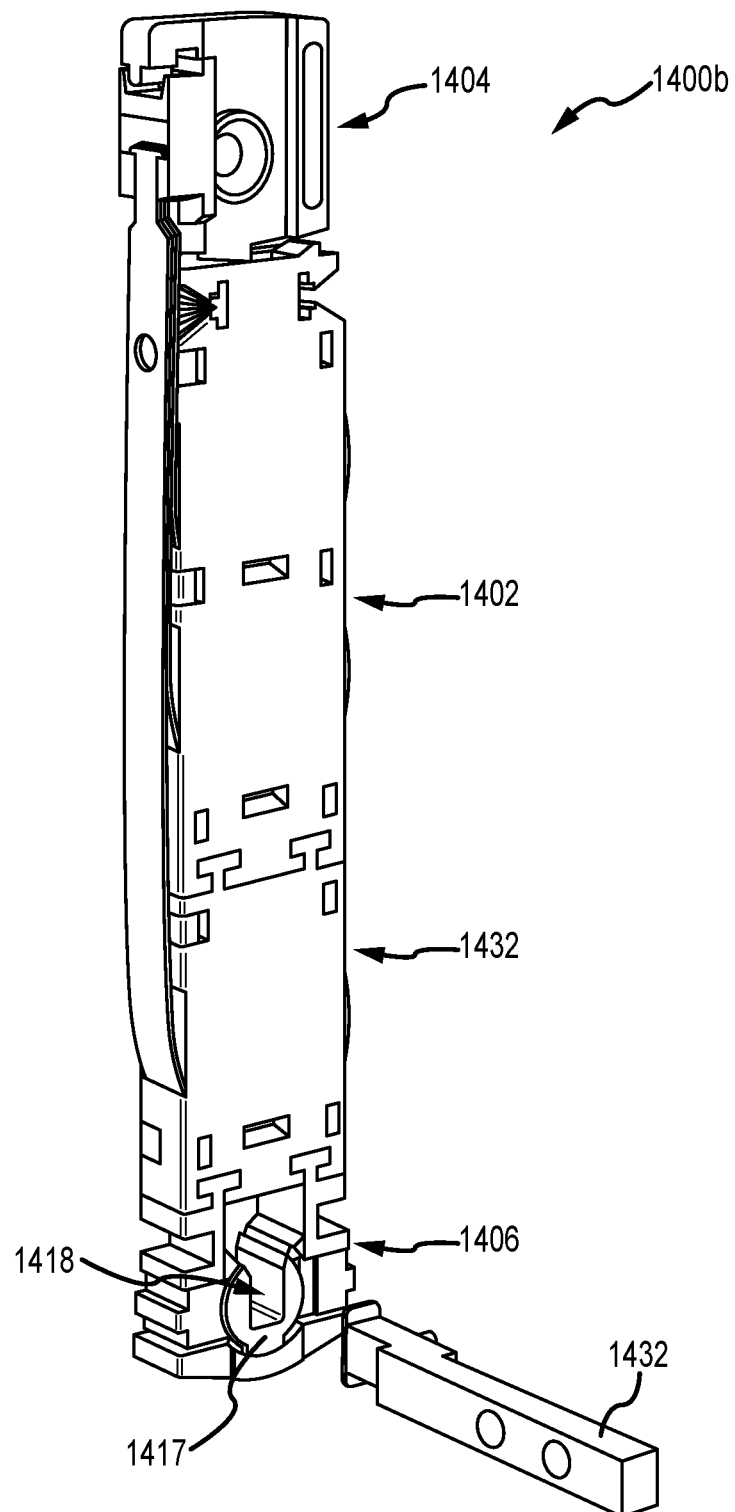
FIG. 17C is a perspective view of the window balance system shown in FIG. 17A in an alternative configuration.

FIG. 17C is a perspective view of the window balance system 1400 shown in FIGS. 17A and 17B in an alternative configuration 1400b. In this configuration, the leading housing assembly 1402 is coupled to a trailing housing assembly 1432. Similar to the alternative configurations of the window balance system 20 illustrated in FIGS. 1E-1G, the window balance system 1400 may be coupled to one or more trailing housing assemblies so that the spring rate and the rated balance weight of the window balance system can be increased as required or desired, thereby enabling operation in larger/heavier window sash sizes. Additionally, in this example, the cam 1417 may have an open keyhole 1418 to receive a pivot bar 1434 as described herein.

Figure 18B:
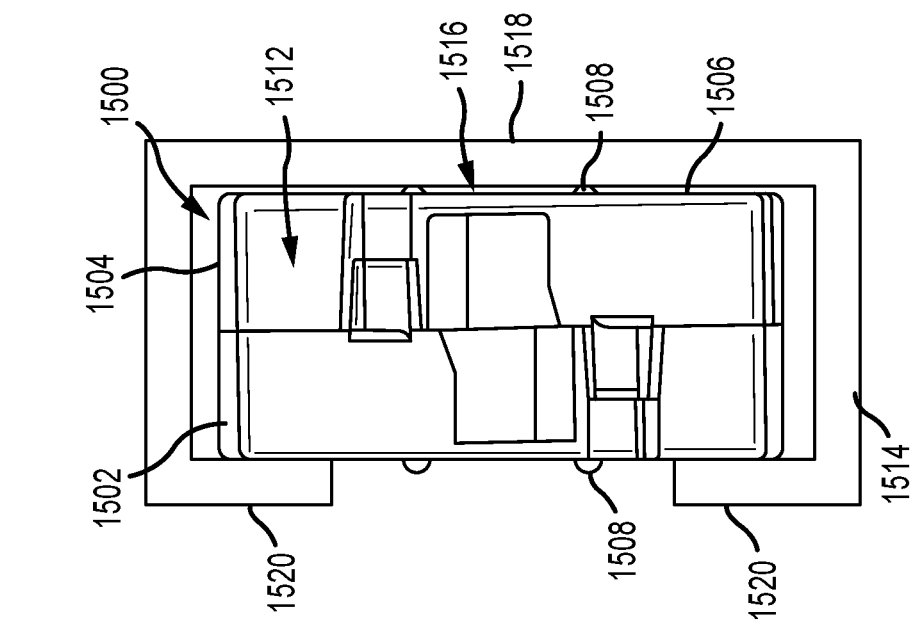
FIG. 18B is a plan view of the leading housing assembly installed in a window jamb.
Figure 18A:
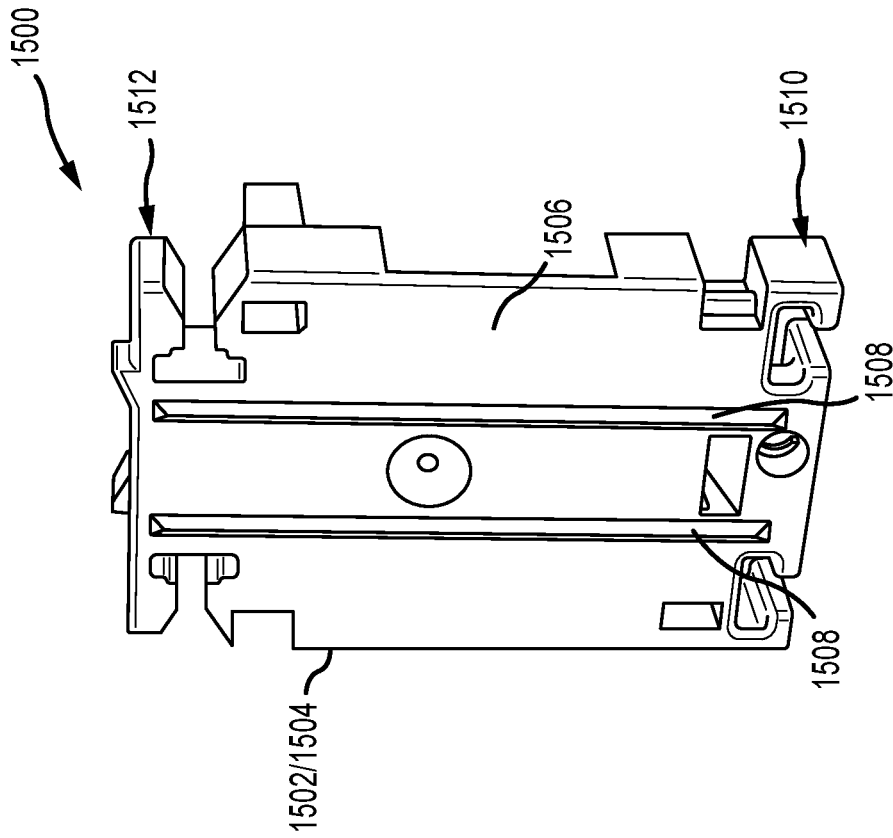
FIG. 18A is a partial perspective view of a portion of a leading housing assembly.

FIG. 18A is a partial perspective view of a portion of a leading housing assembly 1500 for use with the window balance system 1000 (shown in FIG. 10). FIG. 18B is a plan view of the leading housing assembly 1500 installed in a window jamb 1514. Referring concurrently to FIGS. 18A and 18B, the leading housing assembly 1500 is substantially similar to the leading housing assembly 1004 (shown in FIG. 10), and as such, certain components are described above and are not described further. In this example, however, each housing member 1502, 1504 that forms the leading housing assembly 1500 includes an outer wall 1506 that has one or more ribs 1508 extending therefrom.

In this example, the outer wall 1506 includes two ribs 1508 that extend from proximately a lower portion 1510 of the housing member 1502, 1504 to proximately an upper portion 1512 of the housing member 1502, 1504. In one example, the ribs 1508 are spaced approximately 0.5 inches apart, and the ribs themselves are approximately 0.025 inches wide and 0.006 inches high. The ribs 1508 have a substantially domed-shaped profile. In other examples, the ribs 1508 may have any other dimensions, spacing, and/or shape as required or desired. For example, instead of running the approximate entire length of the outer wall 1506 from the lower portion 1510 to the upper portion 1512, the ribs 1508 may be broken out into discrete sections that are spaced along the entire length of the outer wall 1506. Additionally or alternatively, the ribs 1508 may be included on the trailing housing assemblies (e.g., trailing housing assemblies 300, 1086, and 1432 (shown in FIGS. 3A, 14, and 17C, respectively)) or on the other leading housing assemblies as described herein (e.g., leading housing assemblies 100 and 1402 (shown in FIGS. 2A and 17A, respectively)). In another example, the ribs 1508 may have a rectangular, square, or triangular profile.

In operation, the leading housing assembly 1500 substantially encloses the coil spring disposed therein, such that dirt and debris, which are present within a window jamb 1514, are restricted from accumulating on the coil spring. With an enclosed housing system, however, the outer wall 1506 has a large surface that is directly adjacent to and slides against the window jamb 1514, and dirt and debris may bind-up on the outer wall 1506. This dirt and debris accumulation increases the frictional resistance between the window balance system and the window jamb 1514 and decreases the performance of the window balance system. By including ribs 1508 on the outer wall 1506, the surface area of the leading housing assembly 1500 that slides against the window jamb 1514 is decreased, thereby increasing the performance of the window balance system. Additionally, the ribs 1508 generate a gap 1516 between the outer wall 1506 and the window jamb 1514 for dirt and debris to fall through and not bind-up on the outer wall 1506.

In this example, since each housing member 1502, 1504 has the same configuration, the leading housing assembly 1500 when assembled together will have ribs 1508 on both sides (e.g., the side that is adjacent to a back wall 1518 of the window jamb 1514 and the side that is adjacent to front walls 1520 of the window jamb 1514). As such, the ribs 1508 are positioned on the outer wall 1506 so that when installed in the window jamb 1514, the ribs 1508 are located between the front walls 1520 of the window jamb 1514 and do not extend past the thickness of the front walls 1520. In other examples, the ribs 1508 may be positioned on the outer wall 1506 such that the ribs 1508 are adjacent to and slide along the front walls 1520 and the back wall 1518 and ensure that a gap is also formed between the leading housing assembly 1500 and the front walls 1520.

Further, the ribs 1508 also increases the strength of the thin outer wall 1506, e.g., the portion of the housing that defines the interior cavity that houses the coil spring. For example, during shipping when a number of window balances are stacked on top of one another, the weight that the outer wall 1506 can support is increased. In addition, the ribs 1508 make the manufacturing of the housing members 1502, 1504 easier. Because the outer wall 1506 is relatively thin, when molding the housing members 1502, 1504 flow of material along the outer wall 1506 is increased by the addition of the ribs 1508.

Figure 19C:
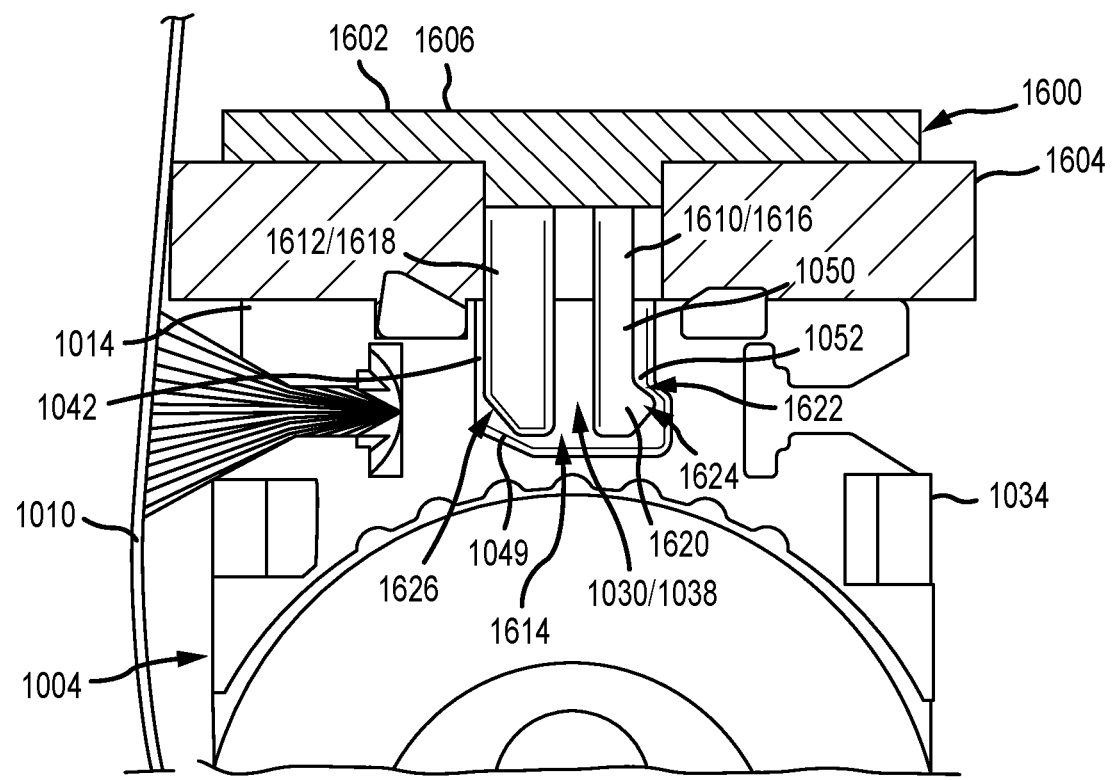
FIG. 19C is a cross-sectional view of the dam.

FIG. 19A is a perspective view of a dam 1600 for use with the window balance system 1000. FIG. 19B is an exploded perspective view of the dam 1600. FIG. 19C is a cross-sectional view of a portion of the window balance system 100, depicting the dam 1600. Certain components of the of the window balance system 1000 are described above with reference to FIG. 10, and as such, are not necessarily described further. Referring concurrently to FIGS. 19A-19C, the dam 1600 may be removably coupled to the top end 1014 of the window balance system 1000. While the dam 1600 is illustrated and described with respect to the window balance system 1000, the dam 1600 may be used with any other window balance system configuration as described herein (e.g., window balance system 20 (shown in FIG. 1B)).

During operation of the window balance system 1000, after the mounting bracket 1006 is released from the leading housing assembly 1004, the top end 1014 of the leading housing assembly 1004 is exposed to dirt and debris within the window jamb. As such, the open channel 1038 on the top end 1014 may accumulate dirt and debris. To prevent this accumulation, the dam 1600 may be removably coupled to the top end 1014 of the leading housing assembly 1004 after the mounting bracket 1006 is released. The dam 1600 includes a clip 1602 and a wiper 1604.

The clip 1602 includes a flat panel base 1606 with a bottom extension element 1608 extending therefrom. The bottom extension element 1608 is shaped and sized to engage with the top receiving element 1030 of the leading housing assembly 1004. The bottom extension element 1608 may include two bottom extension arms 1610, 1612. The bottom extension arms 1610, 1612 may be separated by a gap 1614 extending therebetween. Each bottom extension arm 1610, 1612 includes a toe section 1616 adjacent to a straight section 1618. In the example, the toe section 1616 of the first extension arm 1610 is opposite the straight section 1618 of the second extension arm 1612. This enables the bottom extension element 1608 to correspond to the shape of the channel 1038 as illustrated in FIGS. 11A and 11B with opposing and opposite projections 1050 and side surfaces 1042.

The toe section 1616 has a detent extending therefrom similar to the detent on the mounting bracket 1006 described above in reference to FIG. 12B. The detent may be formed as a toe 1620 having two angled surfaces 1622, 1624. In the example, the top angled surface 1622 may correspond to the projection angled surface 1052 of the projection 1050. In operation, the toe 1620 frictionally engages with the projection 1050 so as to secure the dam 1600 to the leading housing assembly. The straight section 1618 may be sized and shaped to be positioned adjacent to the straight side surface 1042. A tip of the straight section 1618 may also include an oblique surface 1626 to accommodate the floor angled surface 1049 of the channel 1038. In operation, the bottom extension arms 1610, 1612 may be resilient so as to at least partially deflect into the channel 1038 of the leading housing assembly 1004 and engage the projections 1050.

The wiper 1604 is substantially rectangular in shape and includes a hole 1628 defined therein. The hole 1628 enables a portion of the clip 1602 (e.g., the bottom extension element 1608) to extend through the wiper 1604 and couple to the leading housing assembly 1004. This sandwiches the wiper 1604 between the base 1606 and the leading housing assembly 1004. The wiper 1604 is sized to extend out to the window jamb when installed such that dirt and debris can be cleared away from the window jamb surface during the sliding movement of the window balance system. The wiper 1604 is also positioned on the inside of the free end 1012 of the coil spring 1010. One or more channels 1630 may be defined on one or more edge surfaces of the wiper 1604 to help facilitate wiping the window jamb surfaces and channel away the dirt and debris from the leading housing assembly 1004.

FIG. 20A is a perspective view of another jamb mount 1700 for use with the window balance system 1000 (shown in FIG. 10). FIG. 20B is a plan view of the jamb mount 1700. Referring concurrently to FIGS. 20A and 20B, certain components are described above in other examples and, as such, are not described further. The jamb mount 1700 is substantially similar to the jamb mount 1022 described in reference to FIG. 10 and is configured to engage the coil spring mount 1024. In this example, however, a body 1702 of the jamb mount 1700 terminates at a side 1704 that is adjacent to a collar 1706 that surrounds the mounting apertures 1708 and is opposite side extension arms 1710, 1712. The collar 1706 is also disposed on the opposite face of jamb mount 1700. By decreasing a length L of the body 1702, the side 1704 is positioned away from a side wall 1714 of a window jamb 1716 when installed. As such, the jamb mount 1700 can accommodate a jamb cover 1718 that is positionable within the window jamb 1716 and covers the jamb mount 1700 for aesthetic or other purposes.

Figure 21:
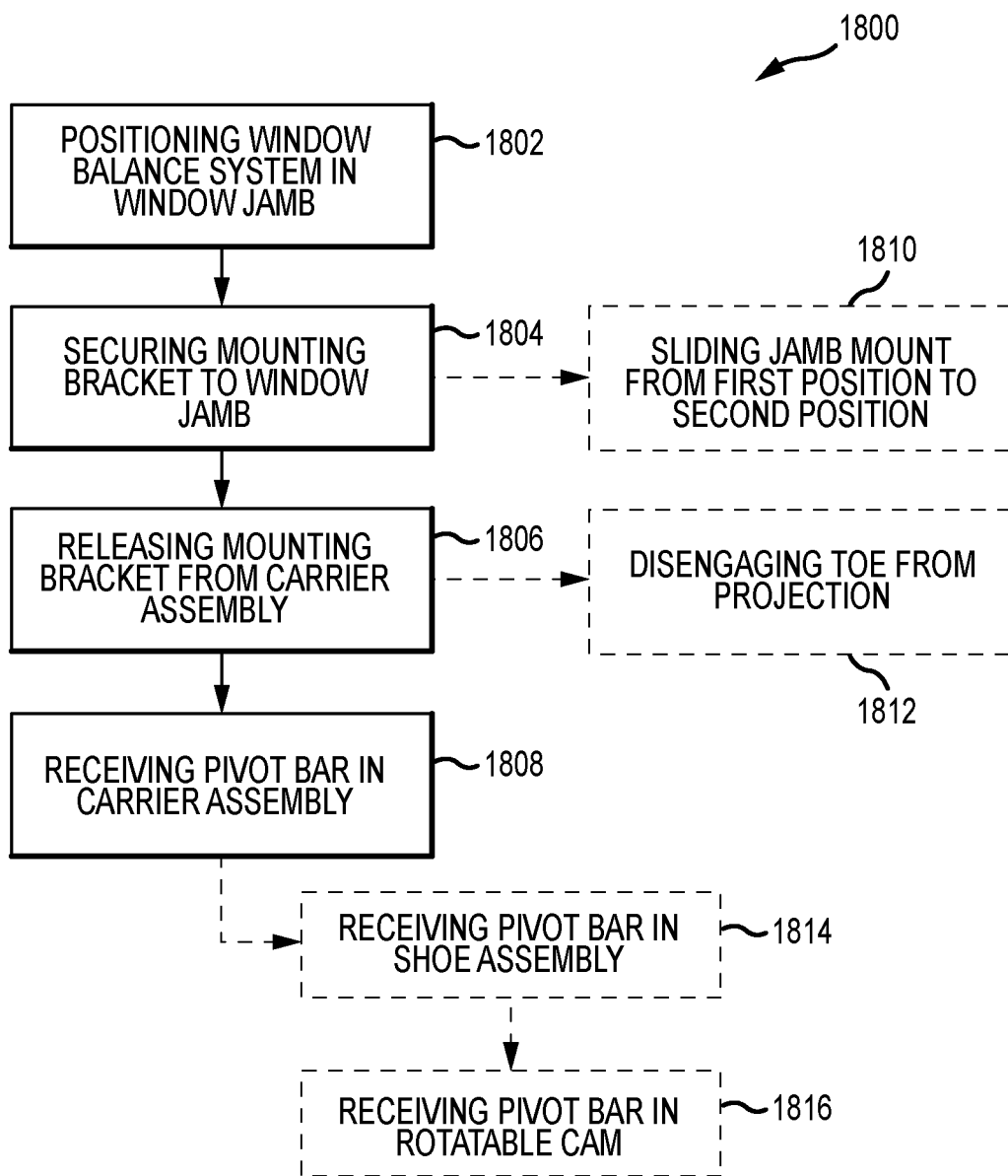
FIG. 21 is a flowchart illustrating an exemplary method of installing a window balance system.

FIG. 21 illustrates an exemplary method 1800 of installing a window balance system, for example, the window balance systems depicted herein, in a window jamb. In this example, the window balance system may include a mounting bracket coupled to a carrier assembly having a coil spring disposed therein. The window balance system is positioned in a window jamb such that the mounting bracket is located above the carrier assembly (operation 1802). Once within the window jamb, the mounting bracket is secured to the window jamb such that at least a portion of the mounting bracket slideably moves in relation to the free end of the coil spring and towards the window jamb (operation 1804). Substantially simultaneously with the securing operation, the mounting bracket is released from the carrier assembly such that the carrier assembly is configured to travel within the widow jamb (operation 1806). The carrier assembly may then receive at least a portion of a pivot bar that is coupled to a window sash (operation 1808).

In some examples, when securing the mounting bracket, the jamb mount slides from a first position to a second position in relation to the coil spring mount (operation 1810), and when releasing the mounting bracket from the carrier assembly the mounting bracket toe disengages from the carrier assembly projection (operation 1812). In other examples, the carrier assembly includes a shoe assembly that receives the pivot bar (operation 1814), and more specifically, a rotatable cam of the shoe assembly may receive the pivot bar (operation 1816).

Figure 22:
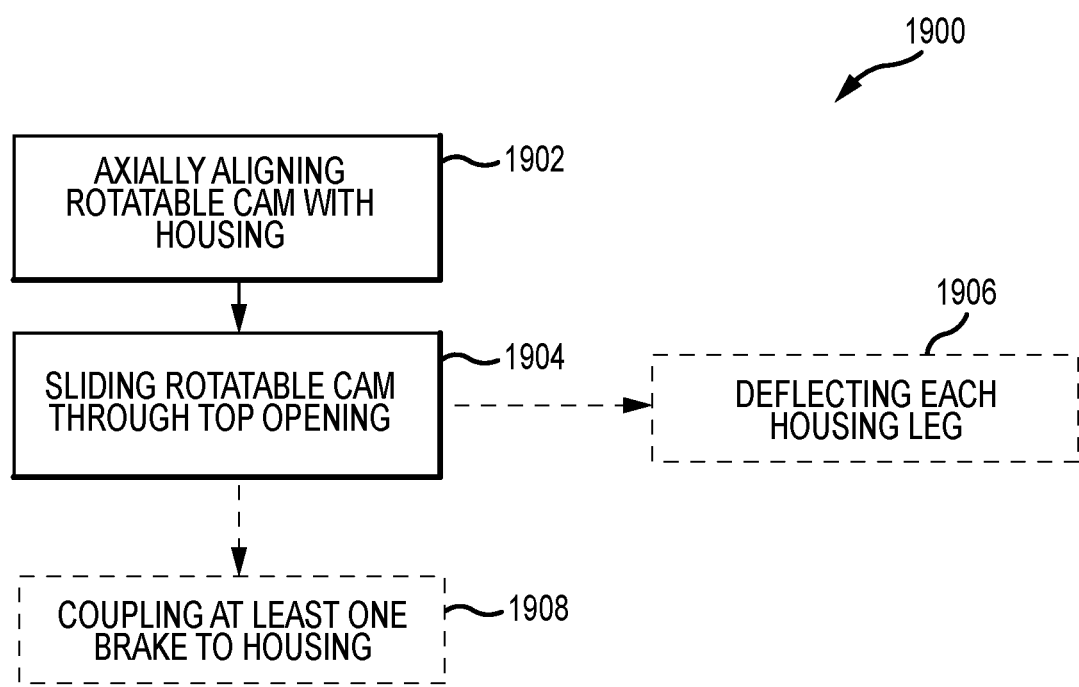
FIG. 22 is a flowchart illustrating an exemplary method of assembling a shoe assembly.

FIG. 22 illustrates an exemplary method 1900 of assembling a shoe assembly, for example, the shoe assemblies depicted herein, for use in an inverted constant force window balance system. The shoe assembly may include a rotatable cam, a housing, and at least one brake. The rotatable cam is axially aligned with the housing (operation 1902) and the rotatable cam is slid through the top opening of the housing and into the cam opening of the housing (operation 1904). In some examples, the sliding of the rotatable cam through the top opening deflects each leg of the housing (operation 1906). In other examples, the at least one brake is coupled to a break receiving section of the housing such that the at least one brake is configured to be engaged by an outer cam surface of the rotatable cam (operation 1908).

The materials utilized in the engagement systems described herein may be those typically utilized for window and window component manufacture. Material selection for most of the components may be based on the proposed use of the window. Appropriate materials may be selected for the sash retention systems used on particularly heavy window panels, as well as on windows subject to certain environmental conditions (e.g., moisture, corrosive atmospheres, etc.). Aluminum, steel, stainless steel, zinc, or composite materials can be utilized (e.g., for the coil spring mount body to prevent separation with the coil spring). Bendable and/or moldable plastics may be particularly useful. For example, the housing and/or the mounting bracket may be unitarily formed with the engagement member and/or the receiving member. While in other examples, the engagement member and/or receiving member may couple to the housing and/or mounting bracket as an accessory for the window balance system.

Any number of the features of the different examples described herein may be combined into one single example and alternate examples having fewer than or more than all of the features herein described are possible. It is to be understood that terminology employed herein is used for the purpose of describing particular examples only and is not intended to be limiting. It must be noted that, as used in this specification, the singular forms "a," "an," and "the" include plural referents unless the context clearly dictates otherwise.

While there have been described herein what are to be considered exemplary and preferred examples of the present technology, other modifications of the technology will become apparent to those skilled in the art from the teachings herein. The particular methods of manufacture and geometries disclosed herein are exemplary in nature and are not to be considered limiting. It is therefore desired to be secured in the appended claims all such modifications as fall within the spirit and scope of the technology. Accordingly, what is desired to be secured by Letters Patent is the technology as defined and differentiated in the following claims, and all equivalents.

What is claimed is:

1. An inverted constant force window balance system comprising:
   a carrier assembly comprising:
      a housing comprising a first member and a second member coupled together at a mating plane; and
      a coil spring at least partially disposed within the housing, wherein the coil spring comprises a free end; and
   a mounting bracket comprising:
      a first portion coupled to the free end of the coil spring; and
      a second portion releasably coupled to the housing and configured to be mounted to a window jamb, wherein the second portion is moveable relative to the housing and the first portion between at least two positions across the mating plane, and wherein in a first position, the second portion is proximate the first member of the housing, and in a second position, the second portion is proximate the second member.

2. The inverted constant force window balance system of claim 1, wherein the first portion of the mounting bracket is substantially centered with respect to the mating plane when the second portion is in the first position and the second position.

3. The inverted constant force window balance system of claim 1, wherein the second portion of the mounting bracket comprises a toe and the housing includes at least one projection, and wherein the toe is engaged with the at least one projection when in the first position and is disengaged from the at least one projection when in the second position.

4. The inverted constant force window balance system of claim 1, wherein the carrier assembly further comprises a lock shoe assembly coupled to the housing opposite the mounting bracket, wherein the lock shoe assembly comprises a rotatable cam having a first end, a second end, and a keyhole sized and shaped to receive a sash pivot member, and wherein the keyhole is open on both the first end and the second end.

5. The inverted constant force window balance system of claim 4, wherein the lock shoe assembly comprises a housing body that forms an opening between the housing and the rotatable cam, and wherein the opening is open proximate both the first member and the second member of the housing.

6. The inverted constant force window balance system of claim 4, wherein the rotatable cam is rotatable about an axis that is substantially orthogonal to the mating plane, and wherein the rotatable cam is rotatable in both directions about the axis.

7. The inverted constant force window balance system of claim 4, wherein the first portion comprises a first detent and/or recess and the second portion comprises a corresponding second detent and/or recess, and wherein when the second portion is in the first position, the first detent and/or recess is engaged with the second detent and/or recess.

8. An inverted constant force window balance system comprising:
   a housing comprising a first member and a second member coupled together at a mating plane;
   a coil spring at least partially disposed within the housing, wherein the coil spring comprises a free end;
   a lock shoe assembly disposed at a bottom end of the housing, wherein the lock shoe assembly comprises a rotatable cam having a first end substantially aligned with the first member, a second end substantially aligned with the second member, and a keyhole configured to receive a sash pivot member from a window sash and extend at least one brake upon rotation of the sash pivot member, and wherein the keyhole is open at both the first end and the second end; and a mounting bracket releasably coupled to a top end of the housing, wherein the mounting bracket comprises a jamb mount configured to be mounted to a window jamb and a coil spring mount coupled to the free end of the coil spring, wherein the jamb mount selectively moves relative to the housing between the first member and the second member across the mating plane, and wherein when the first member is positioned against the window jamb, the jamb mount is proximate the first member and the second end of the rotatable cam receives the sash pivot member, and when the second member is positioned against the window jamb, the jamb mount is proximate the second member and the first end of the rotatable cam receives the sash pivot member.

9. The inverted constant force window balance system of claim 8, wherein the jamb mount selectively moves relative to the coil spring mount.

10. The inverted constant force window balance system of claim 8, wherein the housing further comprises a ramp extending from the top end of the housing, and wherein the ramp selectively engages with at least a portion of the jamb mount when the jamb mount is proximate the first member.

11. The inverted constant force window balance system of claim 8, wherein the jamb mount comprises one or more apertures at least partially surrounded by a collar, and wherein a side of the jamb mount opposite the coil spring mount is adjacent the collar.

12. The inverted constant force window balance system of claim 8, wherein the lock shoe assembly comprises a U-shaped body forming an opening between the bottom end of the housing and the U-shaped body, and wherein the opening extends substantially orthogonal to the mating plane and completely through the inverted constant force window balance.

13. The inverted constant force window balance system of claim 12, wherein the rotatable cam is rotatable between a locked position and an unlocked position, and wherein when the rotatable cam is in the locked position, the keyhole is in communication with the opening and the rotatable cam is engaged with the at least one brake, and when the rotatable cam is in the unlocked position, the rotatable cam disengages with the at least one brake.

14. The inverted constant force window balance system of claim 12, wherein the unlocked position occurs at both rotation directions from the locked position.

15. The inverted constant force window balance system of claim 12, further comprising an adapter configured to couple between the housing and the lock shoe assembly, wherein the adapter comprises a bottom projection that extends within the opening.

16. The inverted constant force window balance system of claim 12, further comprising an extension configured to couple between the housing and the lock shoe assembly, wherein the extension comprise two elongate legs defining an elongated opening, and wherein the elongated opening is in communication with the opening.

17. A method for installing an inverted constant force window balance system in a window jamb, the inverted constant force window balance system includes a housing having a first member and a second member with a coil spring at least partially disposed therein, a mounting bracket having a jamb mount and a coil spring mount, and a lock shoe assembly having a rotatable cam, the method comprising:
  positioning the window balance system in the window jamb with the first member of the housing adjacent the window jamb, wherein the jamb mount is proximate the second member of the housing and the coil spring mount is coupled to a free end of the coil spring;
  securing the mounting bracket to the window jamb, wherein during the securing operation, the jamb mount slides in relation to the coil spring mount and the housing across a mating plane defined between the first member and the second member of the housing and proximate the first member; and
  receiving at least a portion of a sash pivot member coupled to a window sash in the rotatable cam.

18. The method of claim 17, wherein during the securing operation, the coil spring mount remains substantially centered with respect to the mating plane.

19. The method of claim 17, wherein during the securing operation, the jamb mount disengages from the housing.

20. The method of claim 17, further comprising covering at least a portion of the mounting bracket within the window jamb with a jamb cover.

\* \* \* \* \*